United States Patent
Kasha et al.

(10) Patent No.: US 11,481,244 B2
(45) Date of Patent: Oct. 25, 2022

(54) METHODS AND SYSTEMS THAT VERIFY ENDPOINTS AND EXTERNAL TASKS IN RELEASE-PIPELINE PRIOR TO EXECUTION

(71) Applicant: VMware, Inc., Palo Alto, CA (US)

(72) Inventors: Ravi Kasha, Bangalore (IN); Karthikeyan Ramasamy, Bangalore (IN); Bhawesh Ranjan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 277 days.

(21) Appl. No.: 16/936,743

(22) Filed: Jul. 23, 2020

(65) Prior Publication Data

US 2020/0356403 A1 Nov. 12, 2020

Related U.S. Application Data

(63) Continuation of application No. 15/674,583, filed on Aug. 11, 2017, now Pat. No. 10,733,010.

(30) Foreign Application Priority Data

May 11, 2017 (IN) ............................ 2201741016621

(51) Int. Cl.
  *G06F 9/46* (2006.01)
  *G06F 8/71* (2018.01)
  *G06F 9/50* (2006.01)
(52) U.S. Cl.
  CPC .................. *G06F 9/46* (2013.01); *G06F 8/71* (2013.01); *G06F 9/5038* (2013.01)

(58) Field of Classification Search
  CPC ............. G06F 9/46; G06F 8/71; G06F 9/5038
  See application file for complete search history.

(56) References Cited

U.S. PATENT DOCUMENTS

| | | |
|---|---|---|
| 2012/0023487 A1 | 1/2012 | Letca |
| 2012/0060165 A1 | 3/2012 | Clarke |
| 2012/0151358 A1 | 6/2012 | Joanny |
| 2015/0006728 A1 | 1/2015 | Parakh |
| 2015/0049869 A1 | 2/2015 | Petrovykh |
| 2015/0121057 A1* | 4/2015 | Arora .................... G06F 1/3287 713/100 |
| 2015/0295943 A1 | 10/2015 | Malachi |
| 2016/0041852 A1 | 2/2016 | Suarez Gracia |

\* cited by examiner

*Primary Examiner* — Michael W Ayers
(74) *Attorney, Agent, or Firm* — Clayton, McKay & Bailey, PC

(57) ABSTRACT

The current document is directed to automated application-release-management facilities that, in a described implementation, coordinate continuous development and release of cloud-computing applications. The application-release-management process is specified, in the described implementation, by application-release-management pipelines, each pipeline comprising one or more stages, with each stage comprising one or more tasks. The currently described methods and systems check whether endpoints and external tasks are reachable prior to initiating execution of application-release-management pipelines. Automatic reachability checking is scheduled for idle intervals, when the workflow-execution-engine component of the automated application-release-management facility is not executing release pipelines.

20 Claims, 59 Drawing Sheets

| | | |
|---|---|---|
| 1402 — Start Workflow | The starting point of the workflow. All workflows contain this element. A workflow can have only one start element. Start elements have one output and no input, and cannot be removed from the workflow schema. | |
| 1408 — Scriptable task | General purpose tasks you define. You write JavaScript functions in this element. | |
| 1406 — Decision | A boolean function. Decision elements take one input parameters and return either true or false. The type of decision that the element mtakes depends on the type of the input parameter. Decision elements let the workflow branch into different directions, depending on the input parameter the decision element receives. If the received input parameter corresponds to an exepected value, the workflow continues along a certain route. If the input is not the expected value, the workflow continues on an alaternative path. | |
| 1407 — Custom decision | A boolean function. Custom decisions can take several input parameters and process them according to custom scripts. Returns either true or false. | |
| Decision activity | A boolean function. A decision activity runs a workflow and binds its output parameters to a true or a false path. | |
| 1410 — User interaction | Lets users pass new input parameters to the workflow. You can design how the user interaction element presents the request for input parameters and place constraints on the parameters that users can provide. You can set permissions to determine which users can provide the input parameters. When a running workflow arrives at a user interaction element, it enters a passive state and prompts the user for input. You can set a timeout period within which the users must provide input. The workflow resumes according to the data the user passes to it, or returns an exception if the timeout period expires. While it is waiting for the user to respond, the workflow token is in the waiting. | |
| 1412 — Waiting timer | Used by long-running workflows. When a running workflow arrives at a Waiting Timer element, it enters a passive state. You set an abosoulte date at which the workflow resumes running. While it is waiting for the date, the workflow token is in the waiting-signal state. | |
| 1413 — Waiting event | Used in long-running workflows. When a running workflow arrives at a Waiting Event element, it enters a passive state. You define a trigger event that the workflow awaits before it resumes running. While it is waiting for the event, the workflow token is in the waiting-signal state. | |
| 1404 — End workflow | The end point of a workflow. You can have multiple end elements in a schema, to represent the various possible outcomes of the workflow. End elements have one input with no output. When a workflow reaches an End Workflow element, the workflow token enters the completed state. | |

FIG. 14A

| | | | |
|---|---|---|---|
| 1414 | Thrown exception | Creates an exception and stops the workflow. Multiple occurrences of this element can be present in the workflow schema. Exception elements have one input parameters, which can only be of the String type, and have no output parameter. When a workflow reaches an Exception element, the workflow token enters the failed state. | |
| 1426 | Workflow note | Lets you annotate sections of the workflow. You can stretch notes to delineate sections of the workflow. You can change the background color to the notes to differentiate workflow zones. Workflow notes provide only visual information, to help you understand the schema. | |
| 1424 | Action element | Calls on an action from the Orchestrator libraries of action. When a workflow reaches an action element, it calls and runs that action. | |
| 1422 | Workflow element | Starts another workflow synchronously. When a workflow reaches a Workflow element in its schema, it runs that workflow as part of its onwn process. The original workflow continues only after the called workflow completes its run. | |
| 1420 | Foreach element | Runs a workflow on every element from an array. For example, you can run the Rename Virtual Machine workflow on all virtual machines from a folder. | |
| 1423 | Asynchronous workflow | Starts a workflow asynchronously. When a workflow reaches an asynchronous workflow element, it starts that workflow and continues its own run. The original workflow does not wait for the called workflow to complete. | |
| 1428 | Schedule workflow | Create a task to run the workflow at a set time, and then the workflow continues its run. | |
| 1429 | Nested workflows | Starts several workflows simultaneously. You can choose to nest local workflows and remote workflows that are in a different Orchestrator server. You can also run workflows with different credentials. The workflow waits for all the nested workflows to complete before continuing its run. | |
| 1415 | Handle error | Handles an error for a specific workflow element. The workflow can handle the error by creating an exception, calling another workflow, or running a custom script. | |
| 1416 | Default error handler | Handles workflow errors that are not caught by standard error handlers. You can use any available scheme elements to handle errors. | |
| 1418 | Switch | Switches to alternative workflow paths, based on workflow attribute or parameter. | |

FIG. 14B

| Server Role | Inbound Ports | Service/System Outbound Ports |
|---|---|---|
| vCloud Automation Center | | |
| vCenter Single Sign-On | 7444 | LDAP: 389<br>LDAPS: 636<br>vCenter Single Sign-On: 11711, 11712, 12721 |
| vCloud Automation Center virtual Appliance (VA) | 443, 5432*, 5672* | vCenter Single Sign-On Load Balancer: 7444<br><br>vCloud Automation Center virtual appliances (VA): 5432, 5672*<br><br>vCloud Automation Center Infrastructure Web Load Balancer: 443<br><br>vCloud Orchestrator Load Balancer: 8281<br><br>*This is a communication requirement between clustered vCAC virtual appliances. |
| Infrastructure Web Server | 135, 443, 1024-65535* | vCenter Single Sign-On Load Balancer: 7444<br>vCloud Automation Center virtual appliance Load Balancer: 443<br>MSSQL: 135, 1433, 1024-65535* |
| Infrastructure Manager Server | 135, 443, 1024-65535* | vCloud Automation Center Infrastructure Web Load Balancer: 443<br>MSSQL: 135, 1433, 1024-65535* |
| Infrastructure DEM Server | NA | vCenter Single Sign-On Load Balancer: 7444<br><br>vCloud Automation Center virtual appliance Load Balancer: 443<br><br>vCloud Automation Center Infrastructure Web Load Balancer: 443<br><br>vCloud Automation Center Infrastructure Manager Load Balancer: 443 |
| Infrastructure Agent Server | NA | vCloud Automation Center Infrastructure Web Load Balancer: 443<br><br>vCloud Automation Center Infrastructure Manager Load Balancer: 443 |
| MSSQL Database Server | 135, 1433, 1024-65535* | Infrastructure Web Server: 135, 1024-65535*<br><br>Infrastructure Management Server: 135, 1024-65535* |
| | Do not change or block these ports: | |
| vCloud Application Services Server | 8443 HTTPS User Interface connection<br><br>8080 HTTP (legacy port; do not use) | vCenter Single Sign-On: 1433<br><br>vCloud Automation Center virtual appliance Load Balancer: 443<br><br>vCloud Automation Center Infrastructure Web Load Balancer: 443 |
| vFabric RabbitMQ | 5671 AMQP over SSL | |
| External SSH connection | 22 | |
| Content Server | 80 HTTP (used to host OOB content, agent binary, and CLI binary) | |
| IT Business Management Suite Standard Edition Server | | vCenter Single Sign-On: 1433<br><br>vCloud Automation Center virtual appliance Load Balancer: 443<br><br>vCloud Automation Center Infrastructure Web Load Balancer: 443 |
| IT Business Management Suite Standard Edition UI connection | 443 HTTPS | |
| External SSH connection | 22 | |
| Web console access (VAMI) | 5480 | |

FIG. 16B

| Load Balancer | Ports Balanced |
|---|---|
| vCenter Single Sign-On Load Balancer | 7444 |
| vCloud Automation Center virtual appliance Load Balancer | 443 |
| vCloud Automation Center Infrastructure Web Load Balancer | 443 |
| vCloud Automation Center Infrastructure Manager Service Load Balancer | 443 |
| vCloud Orchestrator Load Balancer | 8281 |

FIG. 16C

METHODS AND SYSTEMS THAT VERIFY
ENDPOINTS AND EXTERNAL TASKS IN
RELEASE-PIPELINE PRIOR TO
EXECUTION

RELATED APPLICATION

This application is Continuation of U.S. patent application Ser. No. 15/674,583 entitled "METHODS AND SYSTEMS THAT VERIFY ENDPOINTS AND EXTERNAL TASKS IN RELEASE-PIPELINE PRIOR TO EXECUTION", filed Aug. 11, 2017 which claims benefit under 35 U.S.C. 119(a)-(d) to Foreign Application Serial No. 201741016621 filed in India entitled "METHODS AND SYSTEMS THAT VERIFY ENDPOINTS AND EXTERNAL TASKS IN RELEASE-PIPELINE PRIOR TO EXECUTION", filed on May 11, 2017 by VMware, Inc., both of which are herein incorporated by reference in their entireties for all purposes.

TECHNICAL FIELD

The current document is directed to workflow-based cloud-management systems and, in particular, to an automated-application-release-management subsystem that verifies endpoint and external-task reachability prior to executing release pipelines.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management and administration of, and development of applications within, cloud-computing facilities and other large-scale computer systems.

SUMMARY

The current document is directed to automated application-release-management facilities that, in a described implementation, coordinate continuous development and release of cloud-computing applications. The application-release-management process is specified, in the described implementation, by application-release-management pipelines, each pipeline comprising one or more stages, with each stage comprising one or more tasks. The currently described methods and systems check whether endpoints and external tasks are reachable prior to initiating execution of application-release-management pipelines. Automatic reachability checking is scheduled for idle periods, when the workflow-execution-engine component of the automated application-release-management facility is not executing release pipelines.

BRIEF DESCRIPTION OF THE DRAWINGS

FIGS. 14A-B include a table of different types of elements that may be included in a workflow.

FIGS. 16A-C illustrate an example implementation and configuration of virtual appliances within a cloud-computing facility that implement the workflow-based management and administration facilities of the above-described WFMAD.

DETAILED DESCRIPTION

Figure 1:
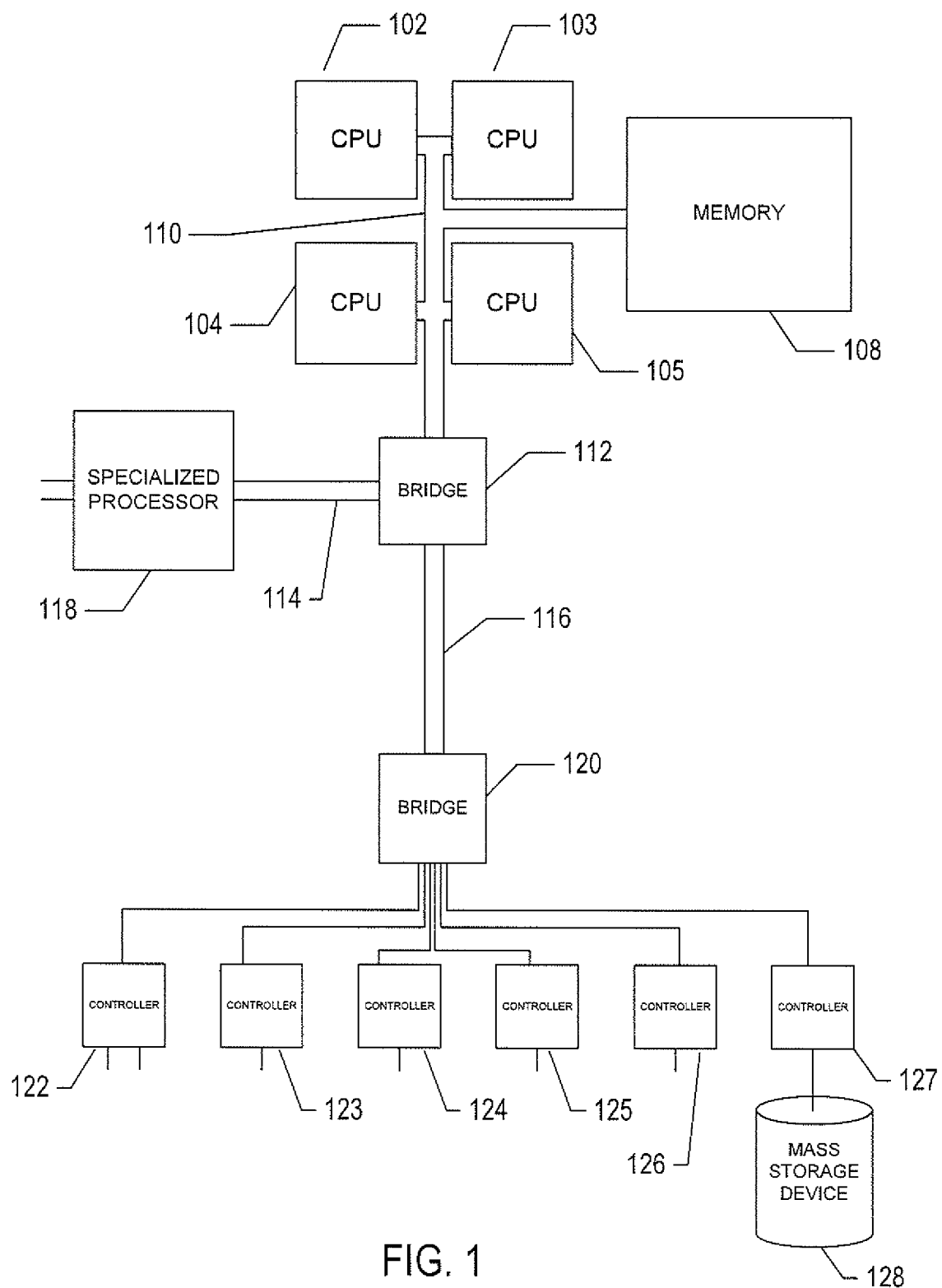
FIG. 1 provides a general architectural diagram for various types of computers.

The current document is directed to an automated-application-release-management subsystem, in a first subsection, below, a detailed description of computer hardware, complex computational systems, and virtualization is provided with reference to FIGS. 1-10. In a second subsection, discussion of a workflow-based cloud-management facility that includes the currently disclosed automated-application-release-management subsystem is provided with reference to FIGS. 11-20B. In a third subsection, the REST Protocol and REST entrypoints are discussed along with use of endpoint resources by application-release-management-pipeline tasks. Finally, in a seventh subsection, methods and systems for checking the reachability and responsiveness of endpoints and external tasks are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
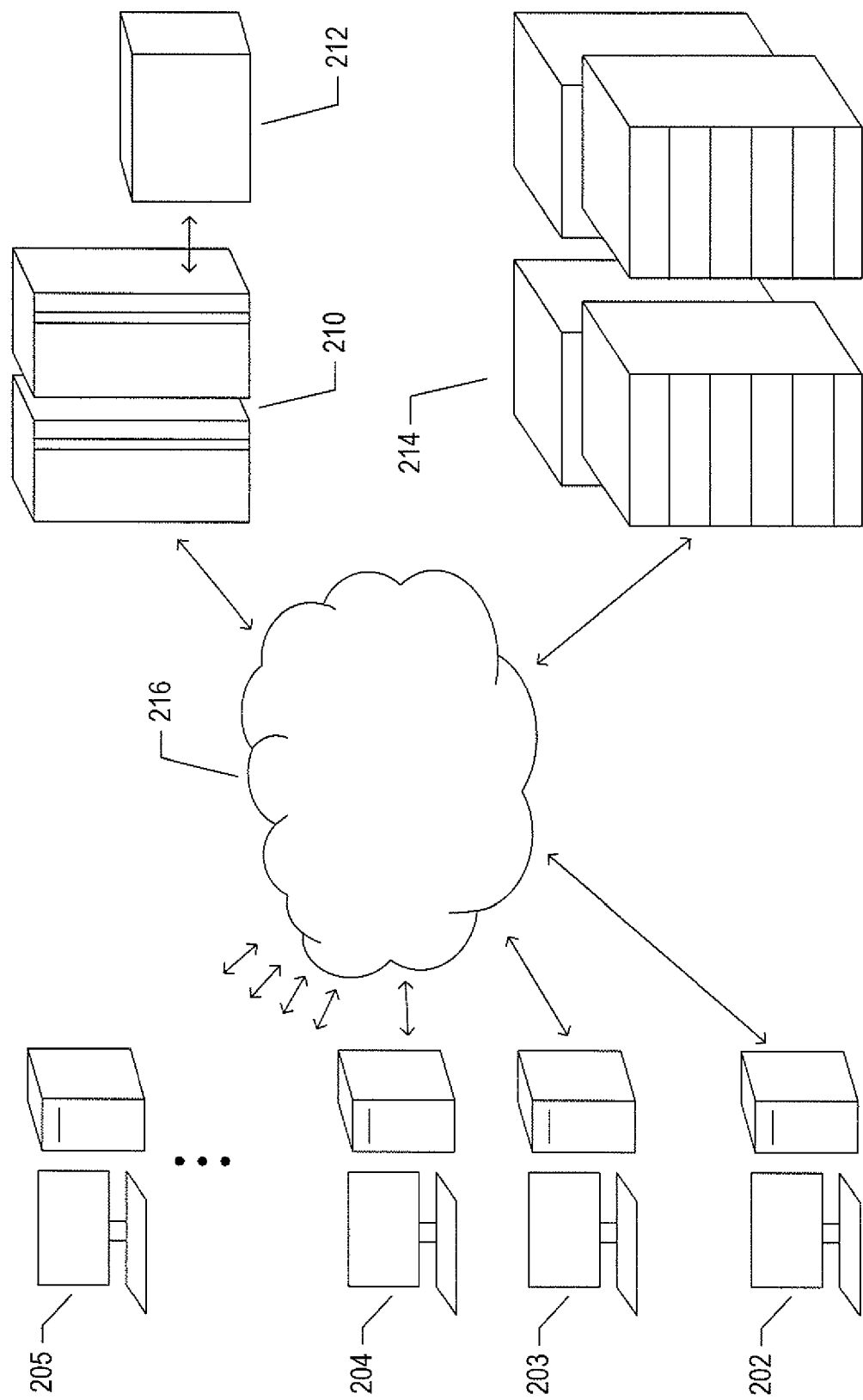
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
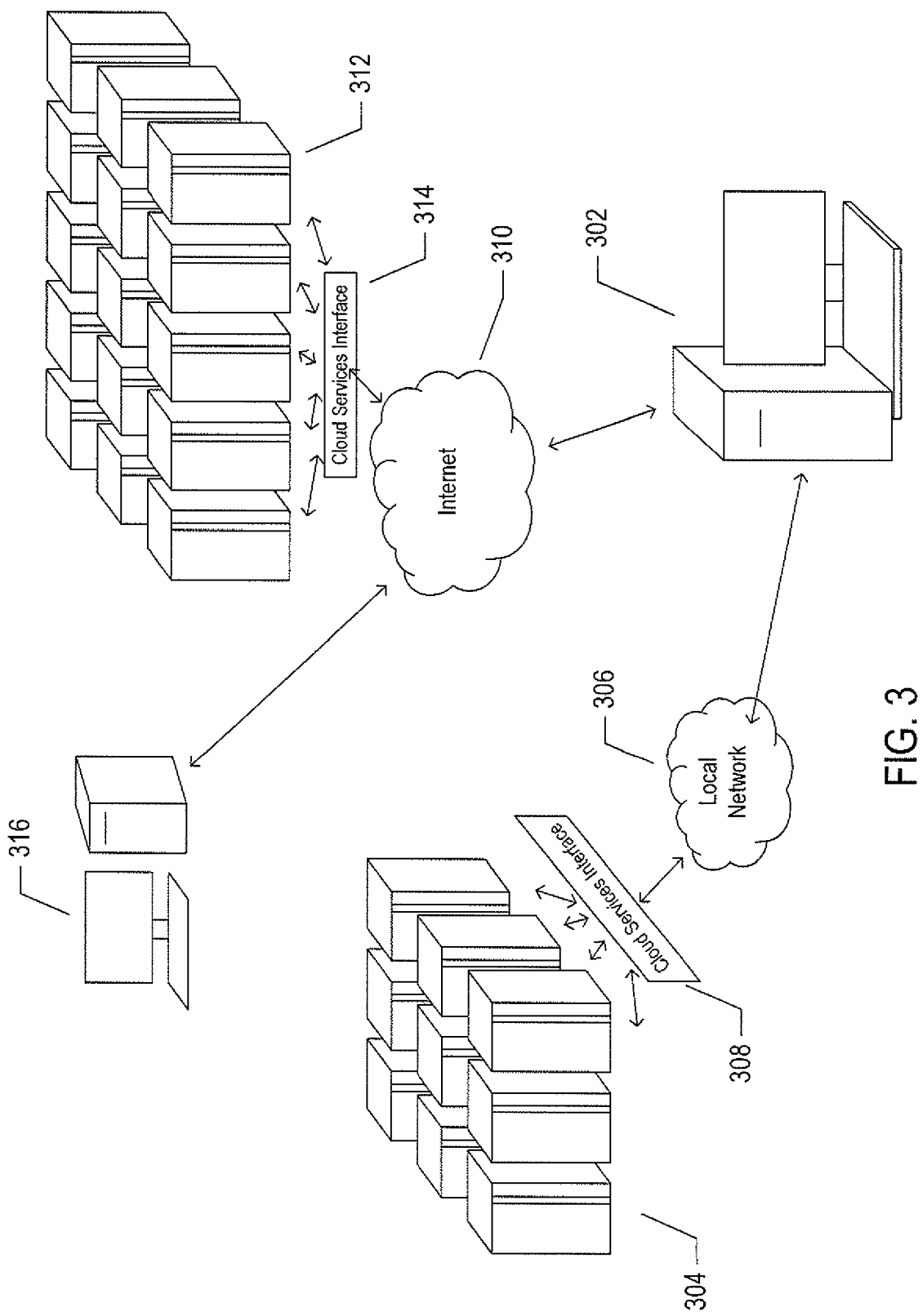
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
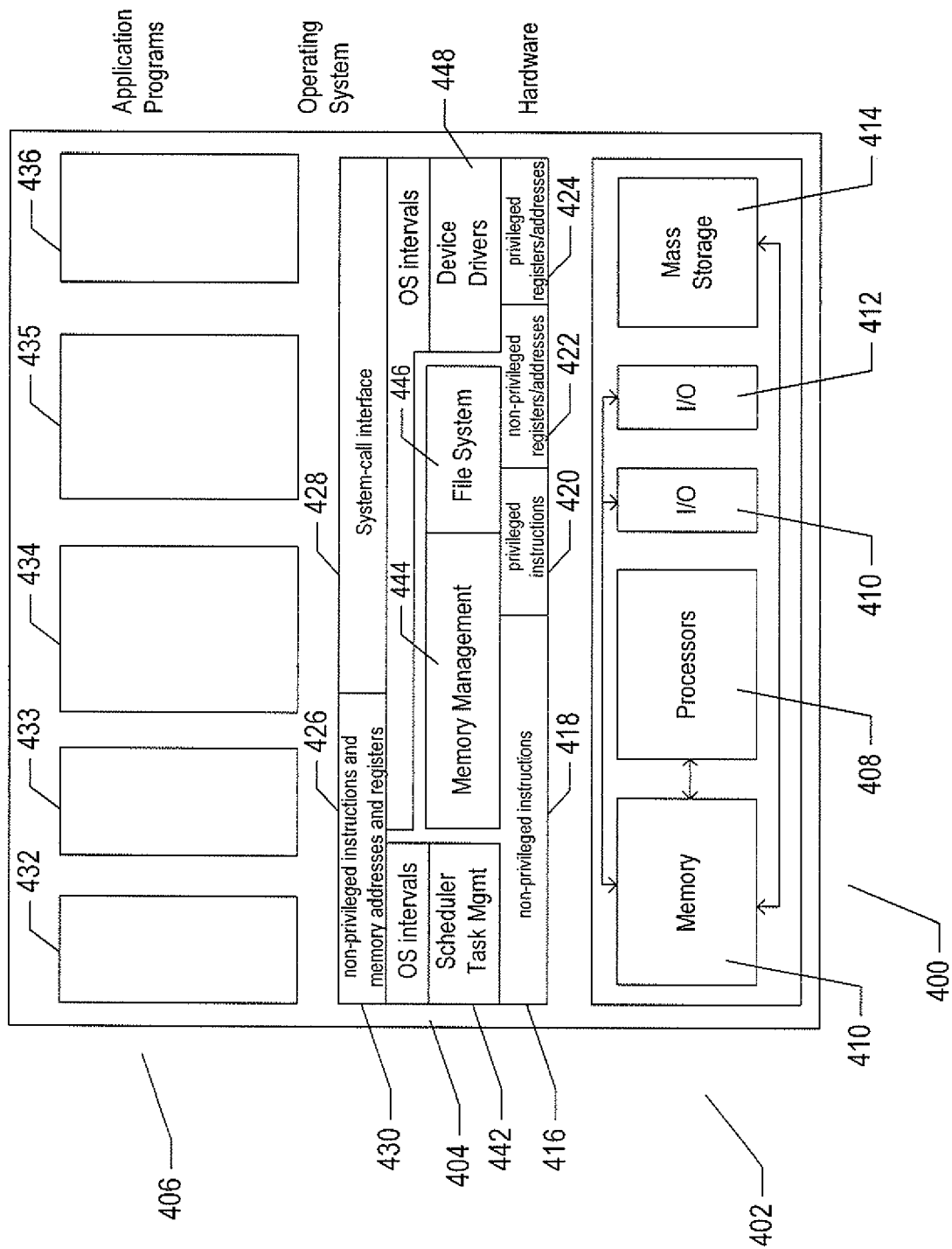
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
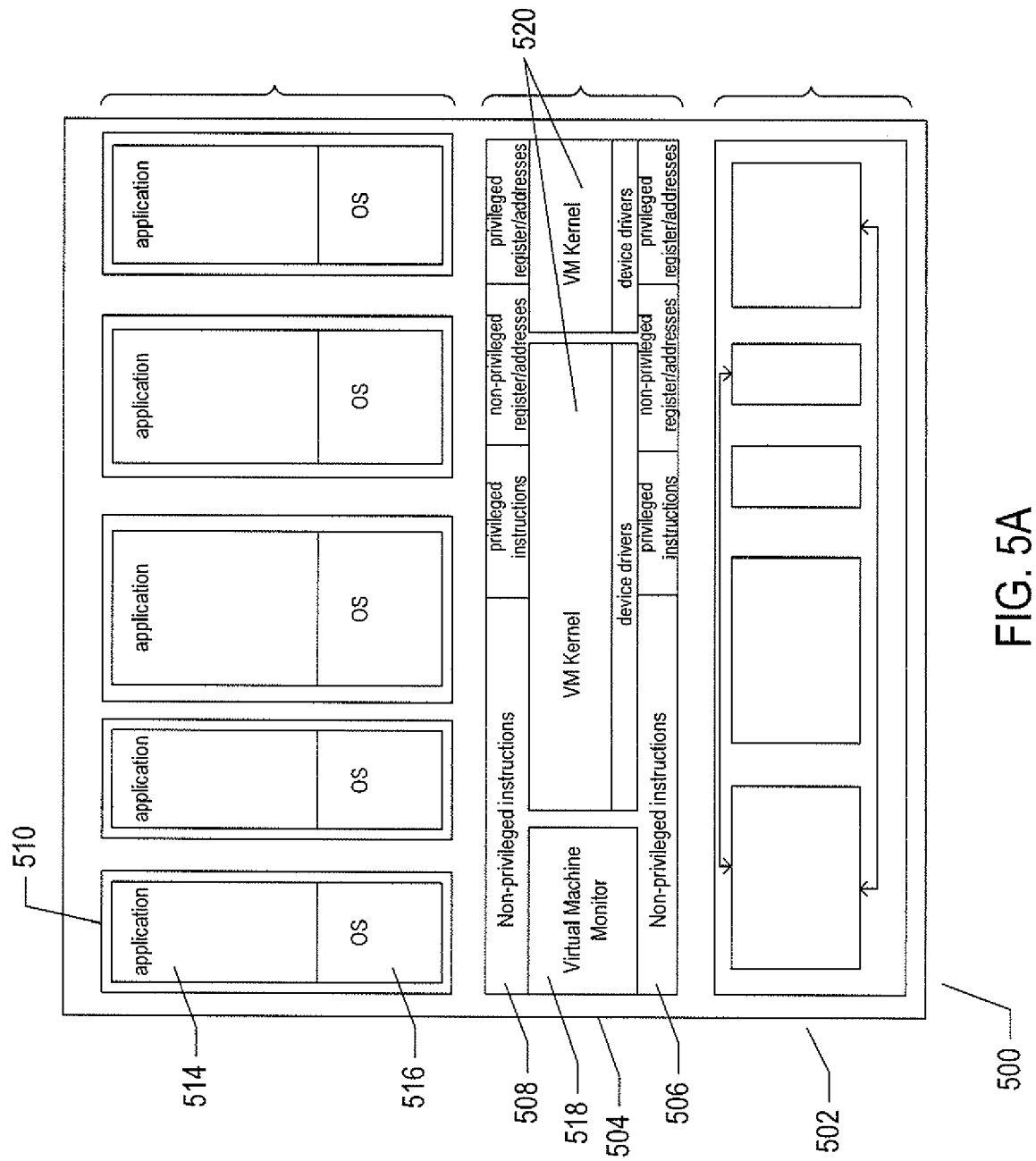
FIGS. 5A-B illustrate two types of virtual machine and virtual-machine execution environments.
Figure 5B:
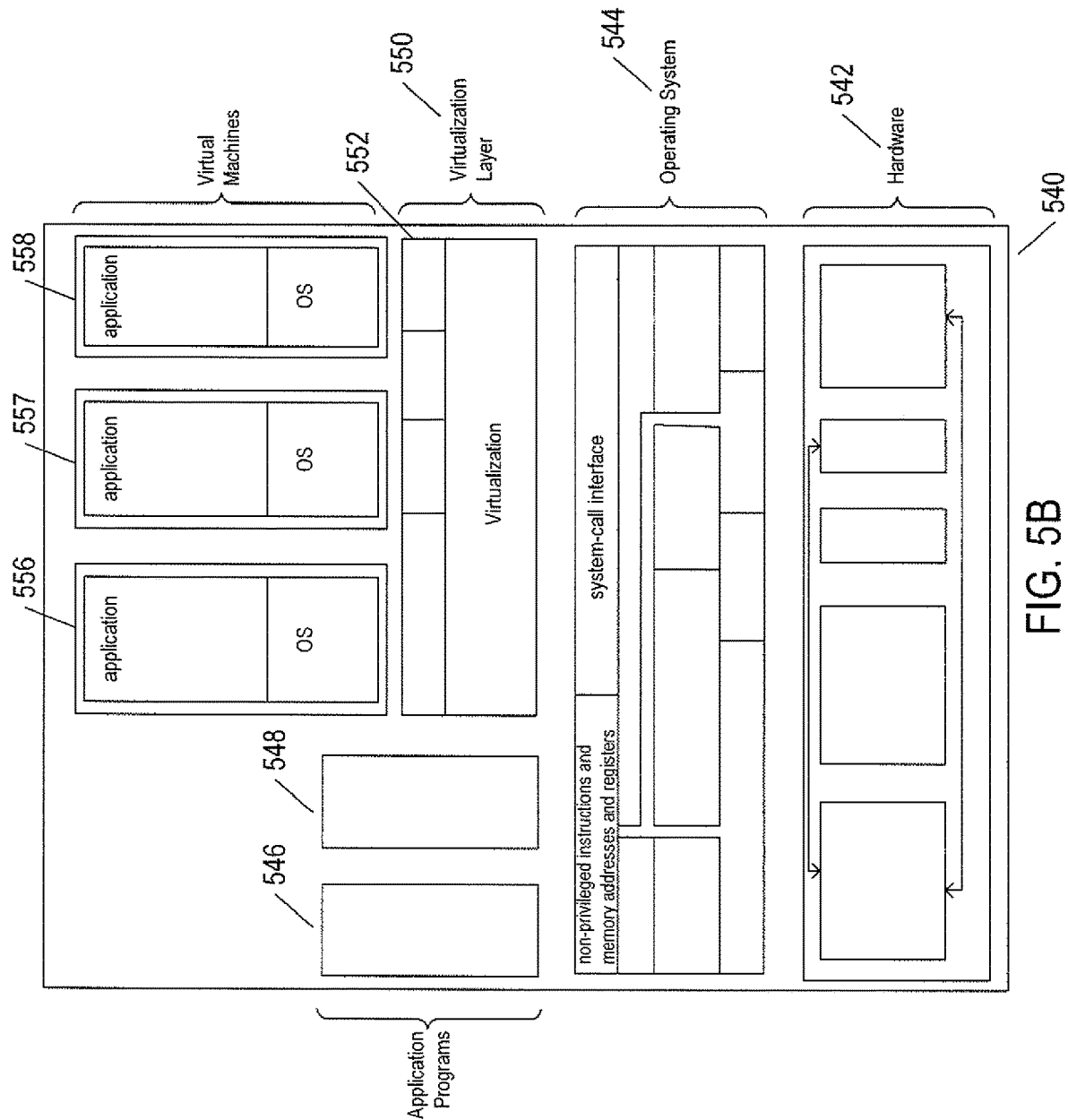

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. Figures 5A-B use the same illustration conventions as used in FIG. 4. Figure 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to Figure 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers processors, busses, and data-storage devices.

Figure 6:
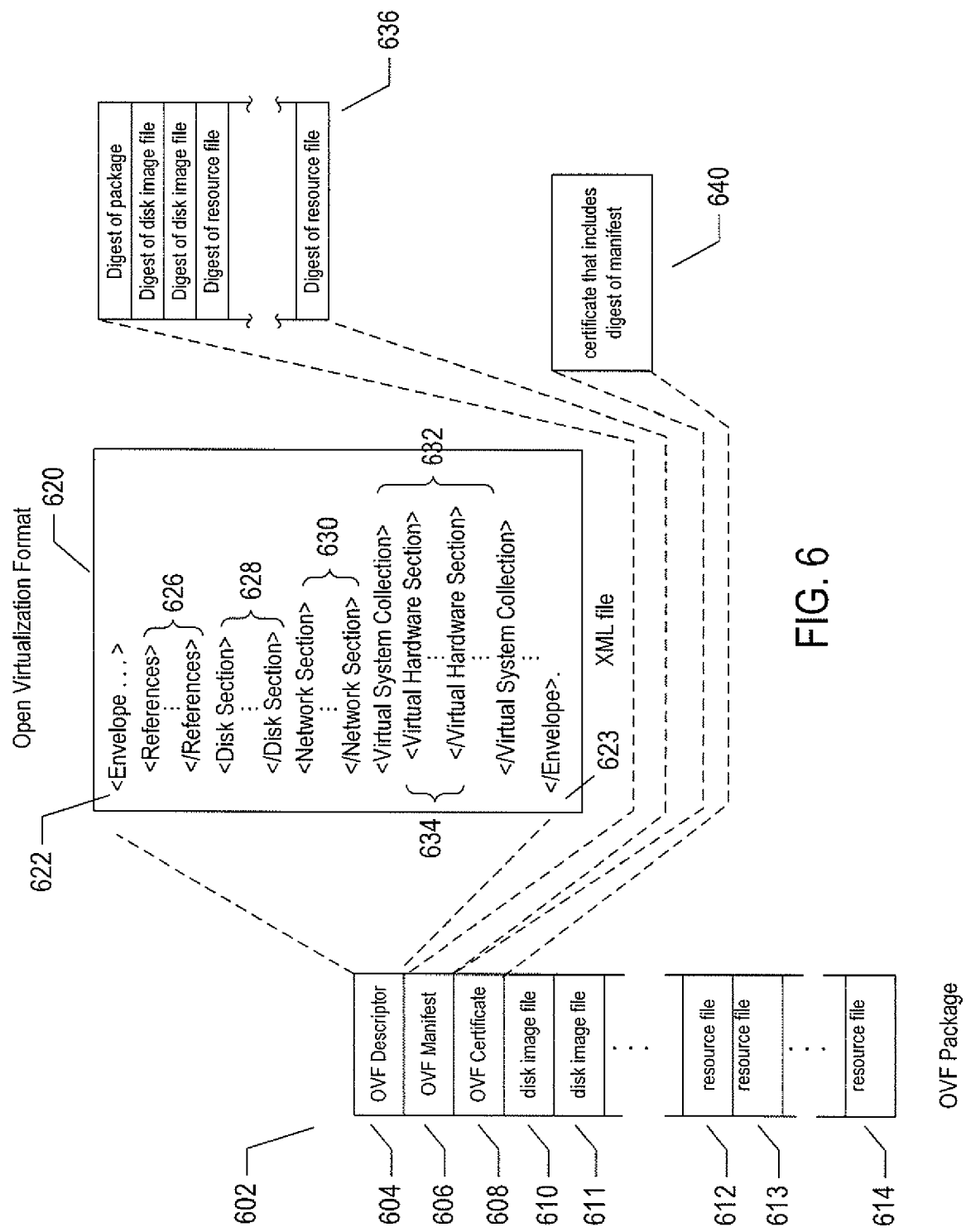
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
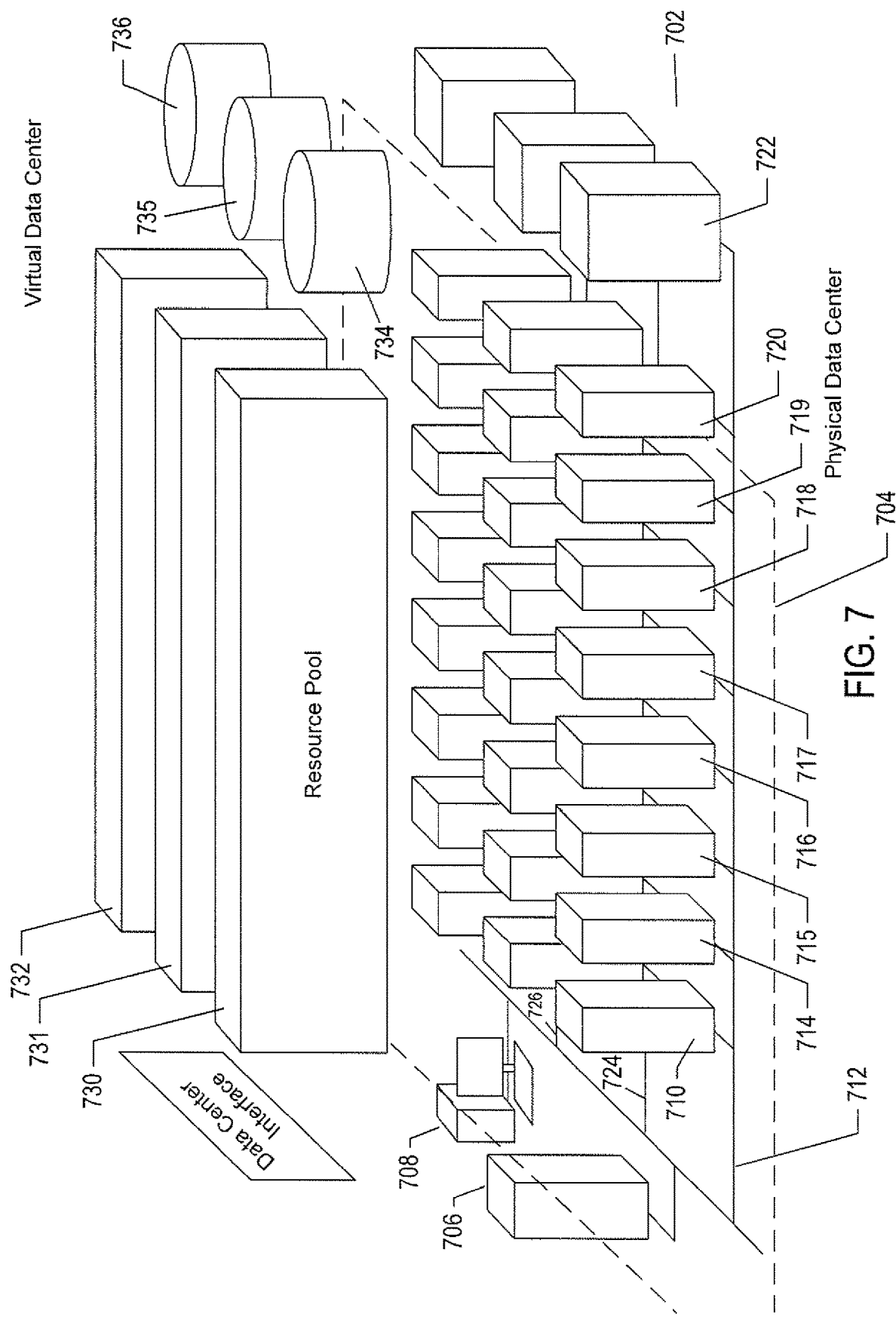
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include may different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
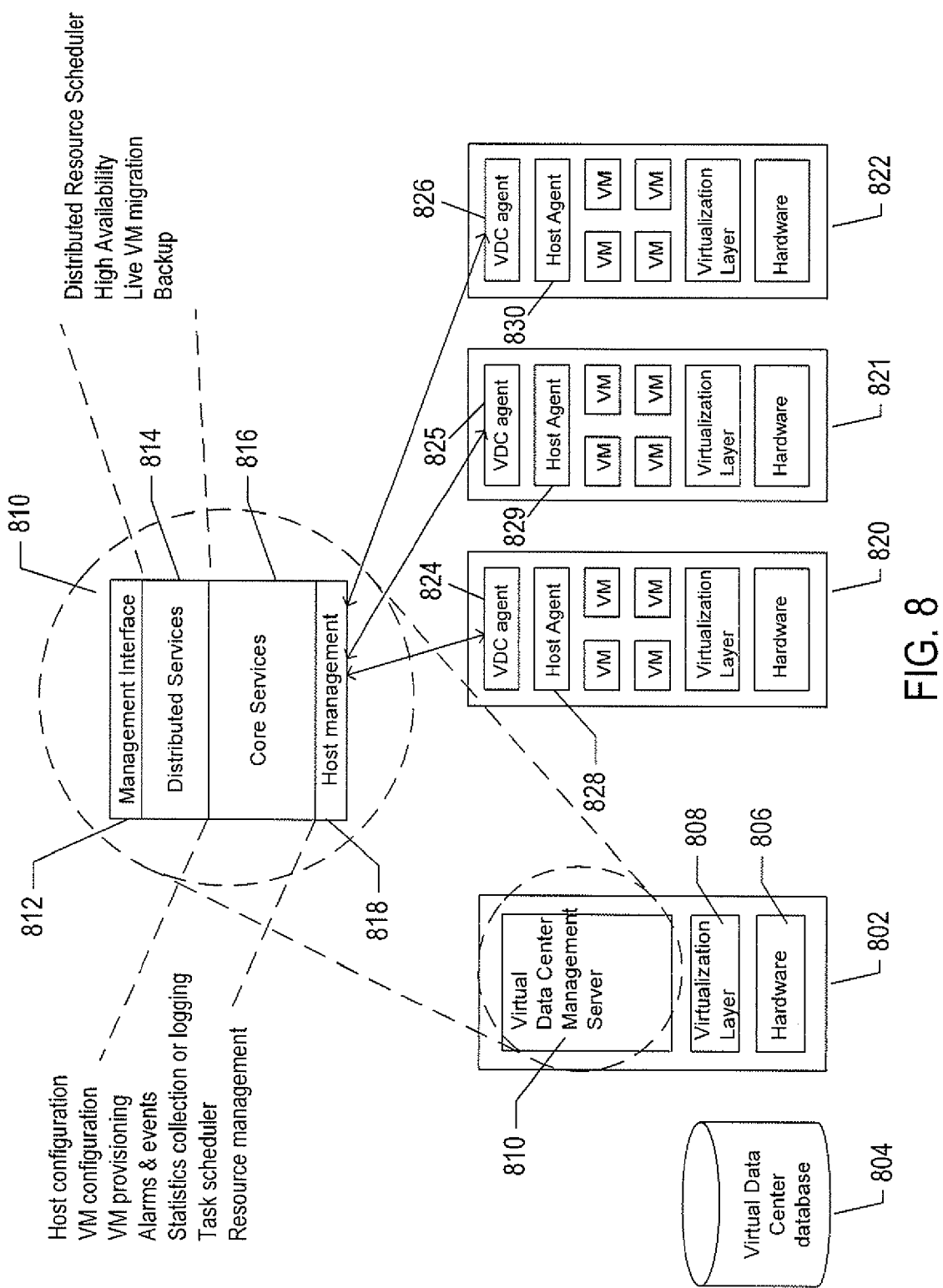
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
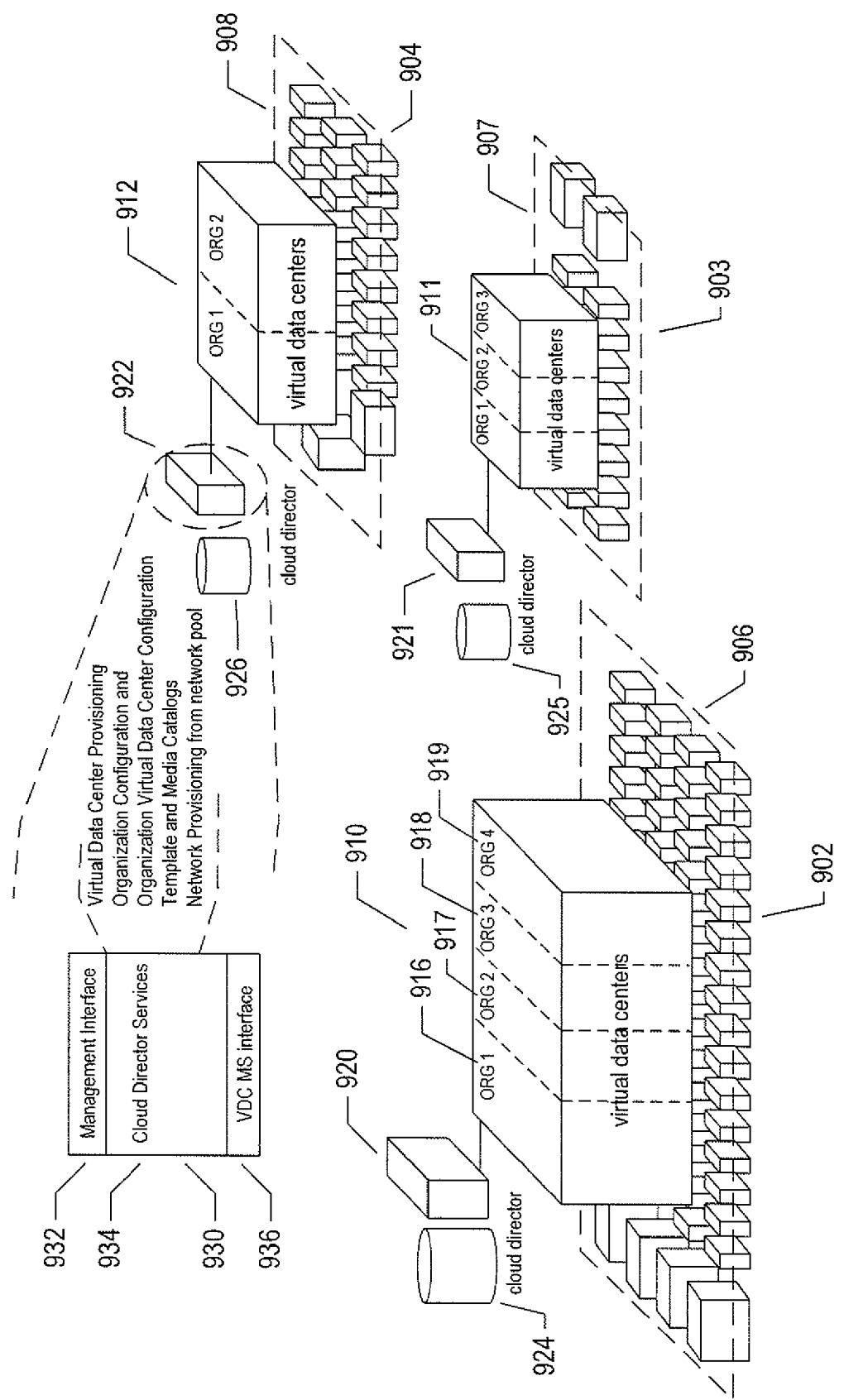
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
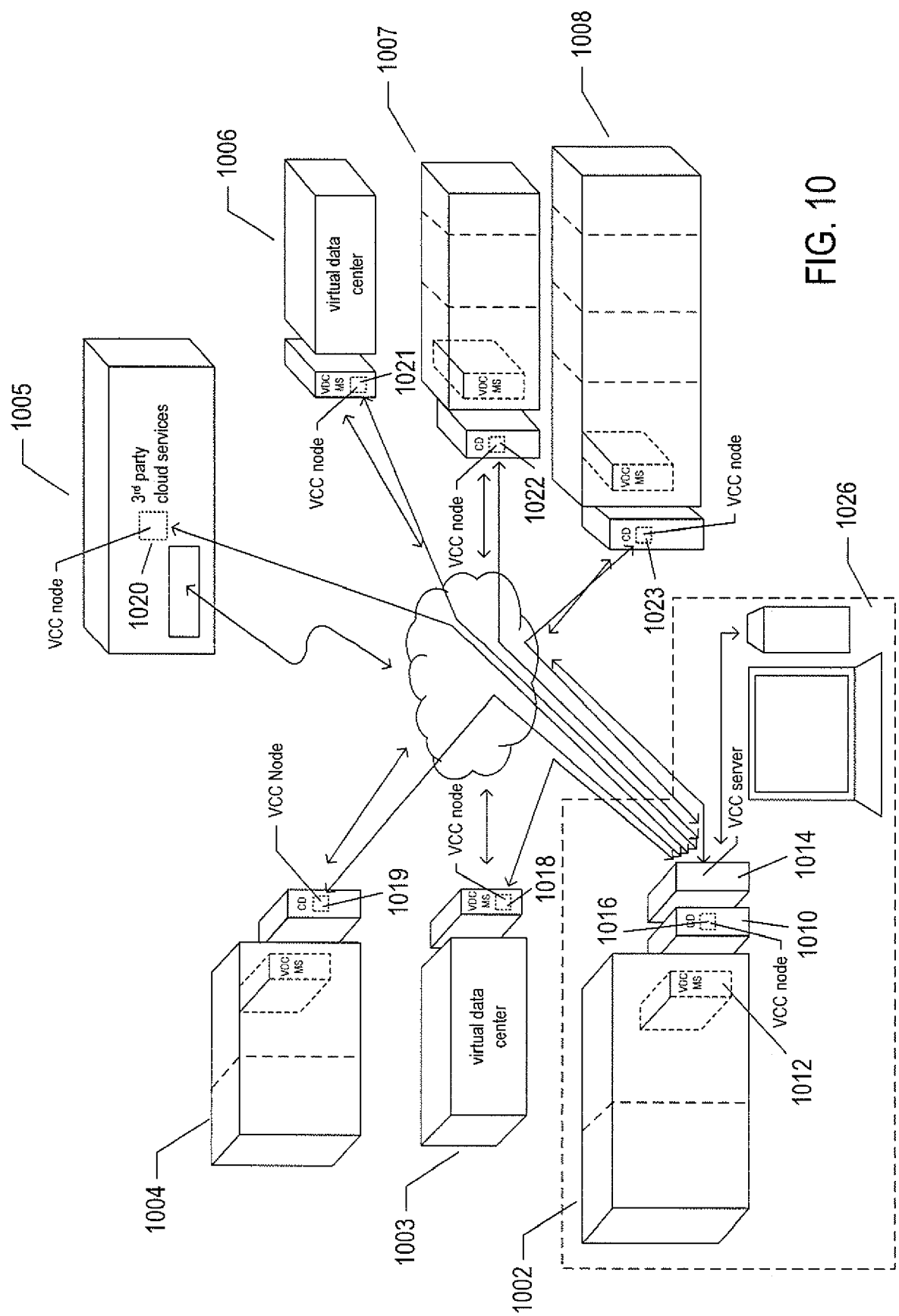
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
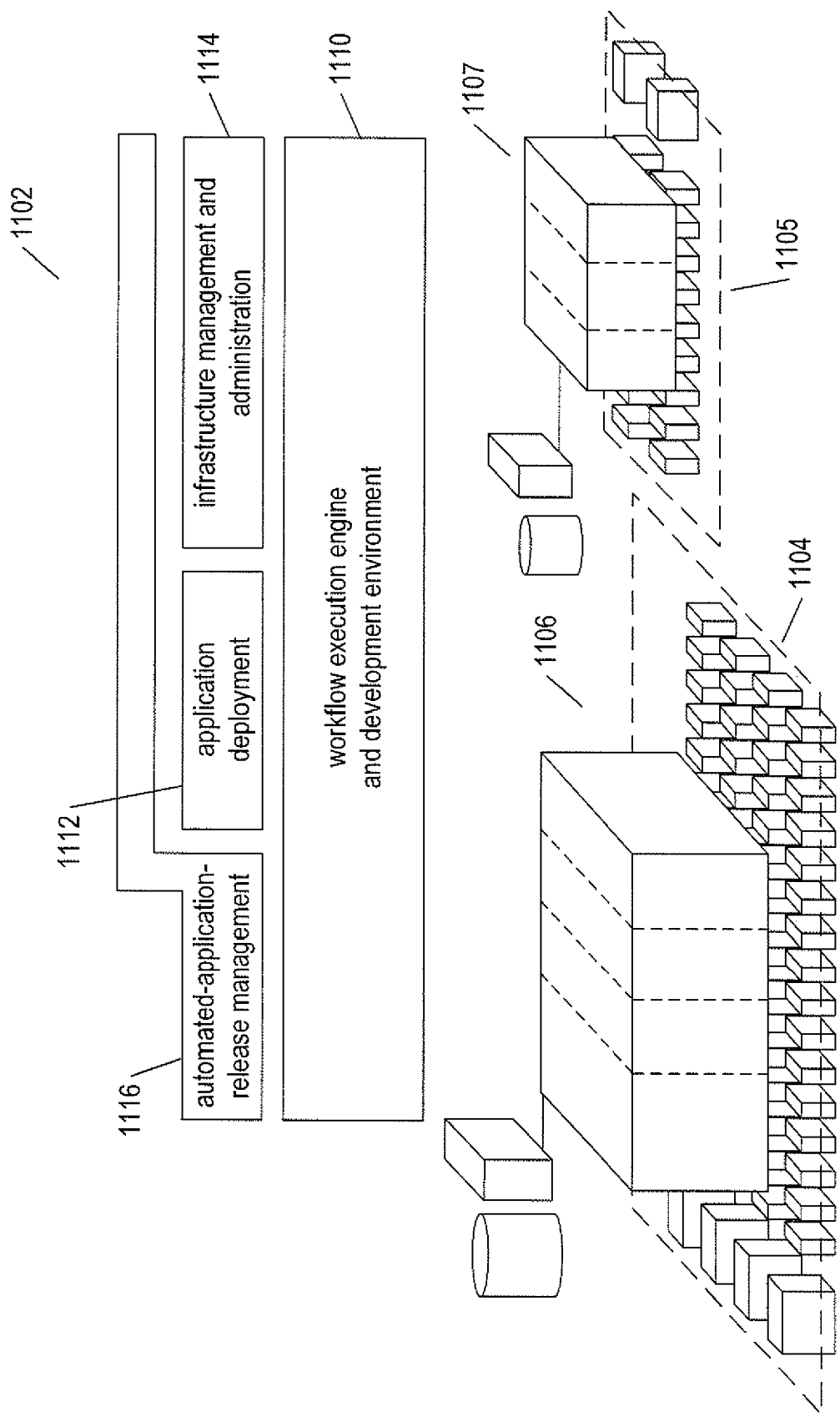
FIG. 11 shows a workflow-based cloud-management facility that has been developed to provide a powerful administrative and development interface to multiple multi-tenant cloud-computing facilities.

Workflow-Based Cloud Management Including an Automated-Application-Release-Management Subsystem FIG. 11 shows workflow-based cloud-management facility that has been developed to provide a powerful administrative and development interface to multiple multi-tenant cloud-computing facilities. The workflow-based management, administration, and development facility ("WFMAD") is used to manage and administer cloud-computing aggregations, such as those discussed above with reference to FIG. 10, cloud-computing aggregations, such as those discussed above with reference to FIG. 9, and a variety of additional types of cloud-computing facilities as well as to deploy applications and continuously and automatically release complex applications on various types of cloud-computing aggregations. As shown in FIG. 11, the WFMAD 1102 is implemented above the physical hardware layers 1104 and 1105 and virtual data centers 1106 and 1107 of a cloud-computing facility or cloud-computing-facility aggregation. The WFMAD includes a workflow-execution engine and development environment 1110, an application-deployment facility 1112, an infrastructure-management-and-administration facility 1114, and an automated-application-release-management facility 1116. The workflow-execution engine and development environment 1110 provides an integrated development environment for constructing, validating, testing, and executing graphically expressed workflows, discussed in detail below. Workflows are high-level programs with many built-in functions, scripting tools, and development tools and graphical interfaces. Workflows provide an underlying foundation for the infrastructure-management-and-administration facility 1114, the application-development facility 1112, and the automated-application-release-management facility 1116. The infrastructure-management-and-administration facility 1114 provides a powerful and intuitive suite of management and administration tools that allow the resources of a cloud-computing facility or cloud-computing-facility aggregation to be distributed among clients and users of the cloud-computing facility or facilities and to be administered by a hierarchy of general and specific administrators. The infrastructure-management-and-administration facility 1114 provides interfaces that allow service architects to develop various types of services and resource descriptions that can be provided to users and clients of the cloud-computing facility or facilities, including many management and administrative services and functionalities implemented as workflows. The application-deployment facility 1112 provides an integrated application-deployment environment to facilitate building and launching complex cloud-resident applications on the cloud-computing facility or facilities. The application-deployment facility provides access to one or more artifact repositories that store and logically organize binary files and other artifacts used to build complex cloud-resident applications as well as access to automated tools used, along with workflows, to develop specific automated application-deployment tools for specific cloud-resident applications. The automated-application-release-management facility 1116 provides workflow-based automated release-management tools that enable cloud-resident-application developers to continuously generate application releases produced by automated deployment, testing, and validation functionalities. Thus, the WFMAD 1102 provides a powerful, programmable, and extensible management, administration, and development platform to allow cloud-computing facilities and cloud-computing-facility aggregations to be used and managed by organizations and teams of individuals.

Figure 12:
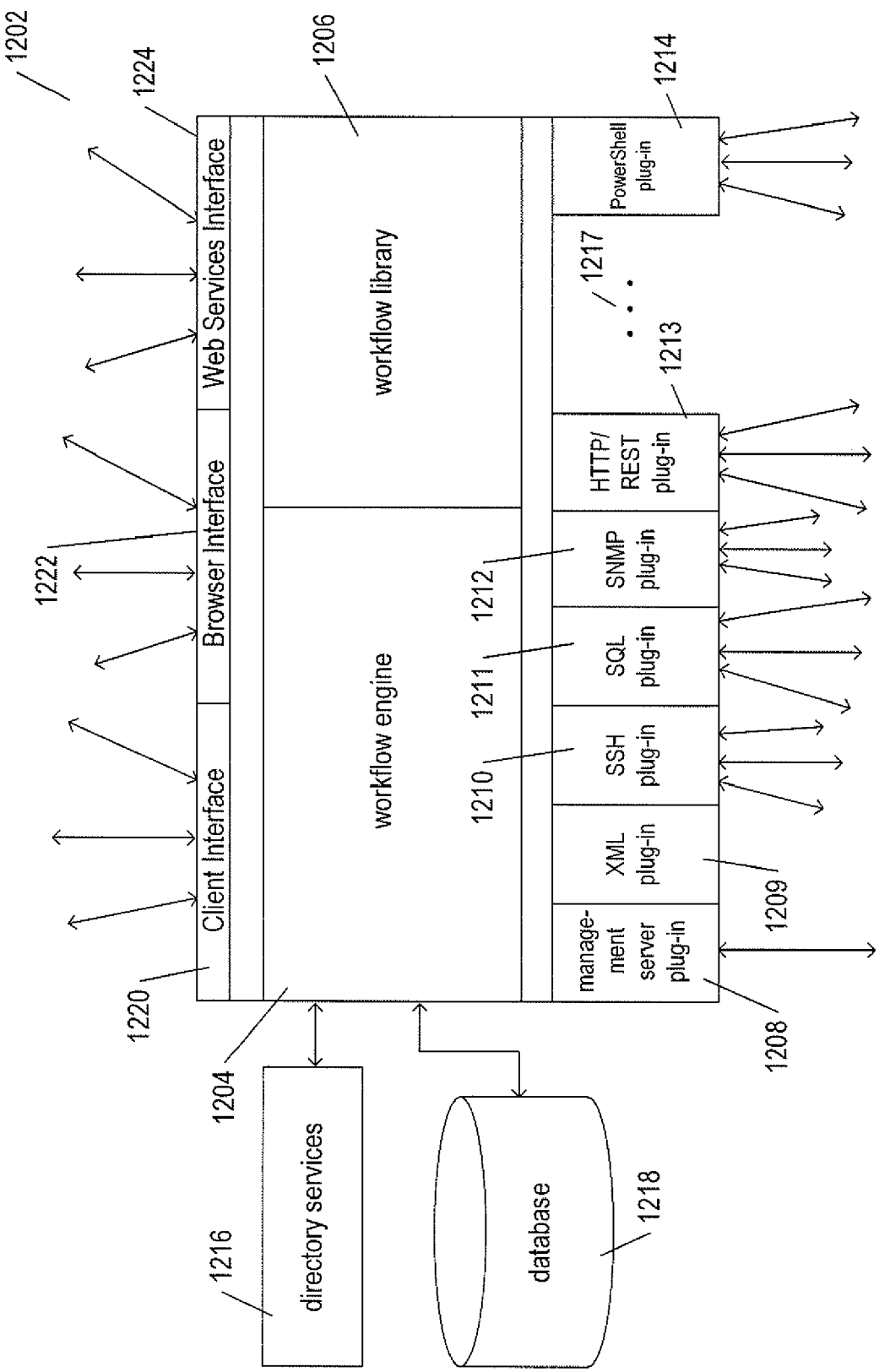
FIG. 12 provides an architectural diagram of the workflow-execution engine and development environment.

Next, the workflow-execution engine and development environment is discussed in greater detail. FIG. 12 provides an architectural diagram of the workflow-execution engine and development environment. The workflow-execution engine and development environment 1202 includes a workflow engine 1204, which executes workflows to carry out the many different administration, management, and development tasks encoded in workflows that comprise the functionalities of the WFMAD. The workflow engine, during execution of workflows, accesses many built-in tools and functionalities provided by a workflow library 1206. In addition, both the routines and functionalities provided by the workflow library and the workflow engine access a wide variety of tools and computational facilities, provided by a wide variety of third-party providers, through a large set of plug-ins 1208-1214. Note that the ellipses 1216 indicate that many additional plug-ins provide, to the workflow engine and workflow-library routines, access to many additional third-party computational resources. Plug-in 1208 provides for access, by the workflow engine and workflow-library routines, to a cloud-computing-facility or cloud-computing-facility-aggregation management server, such as a cloud director (920 in FIG. 9) or VCC server (1014 in FIG. 10). The XML plug-in 1209 provides access to a complete document object model ("DOM") extensible markup language ("XML") parser. The SSH plug-in 1210 provides access to an implementation of the Secure Shell v2 ("SSH-2") protocol. The structured query language ("SQL") plug-in 1211 provides access to a Java database connectivity ("JDBC") API that, in turn, provides access to a wide range of different types of databases. The simple network management protocol ("SNMP") plug-in 1212 provides access to an implementation of the SNMP protocol that allows the workflow-execution engine and development environment to connect to, and receive information from, various SNMP-enabled systems and devices. The hypertext transfer protocol ("HTTP")/representational state transfer ('REST") plug-in 1213 provides access to REST web services and hosts. The PowerShell plug-in 1214 allows the workflow-execution engine and development environment to manage PowerShell hosts and run custom PowerShell operations. The workflow engine 1204 additionally accesses directory services 1216, such as a lightweight directory access protocol ("LDAP") directory, that maintain distributed directory information and manages password-based user login. The workflow engine also accesses a dedicated database 1218 in which workflows and other information are stored. The workflow-execution engine and development environment can be accessed by clients running a client application that interfaces to a client interface 1220, by clients using web browsers that interface to a browser interface 1222, and by various applications and other executables running on remote computers that access the workflow-execution engine and development environment using a REST or small-object-access protocol ("SOAP") via a web-services interface 1224. The client application that runs on a remote computer and interfaces to the client interface 1220 provides a powerful graphical user interface that allows a client to develop and store workflows for subsequent execution by the workflow engine. The user interface also allows clients to initiate workflow execution and provides a variety of tools for validating and debugging workflows. Workflow execution can be initiated via the browser interface 1222 and web-services interface 1224. The various interfaces also provide for exchange of data output by workflows and input of parameters and data to workflows.

Figure 13A:
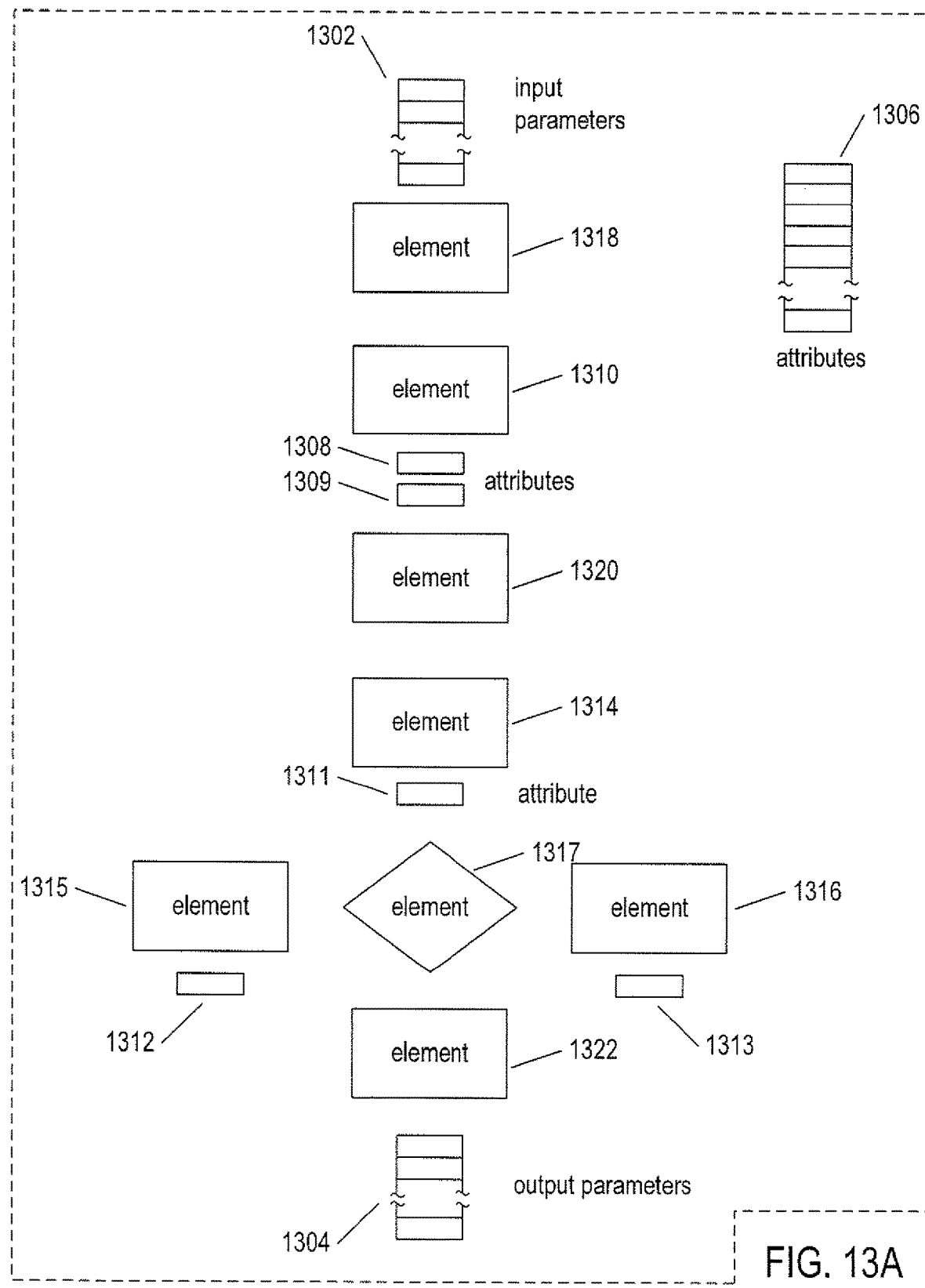
FIGS. 13A-C illustrate the structure of a workflow.
Figure 13B:
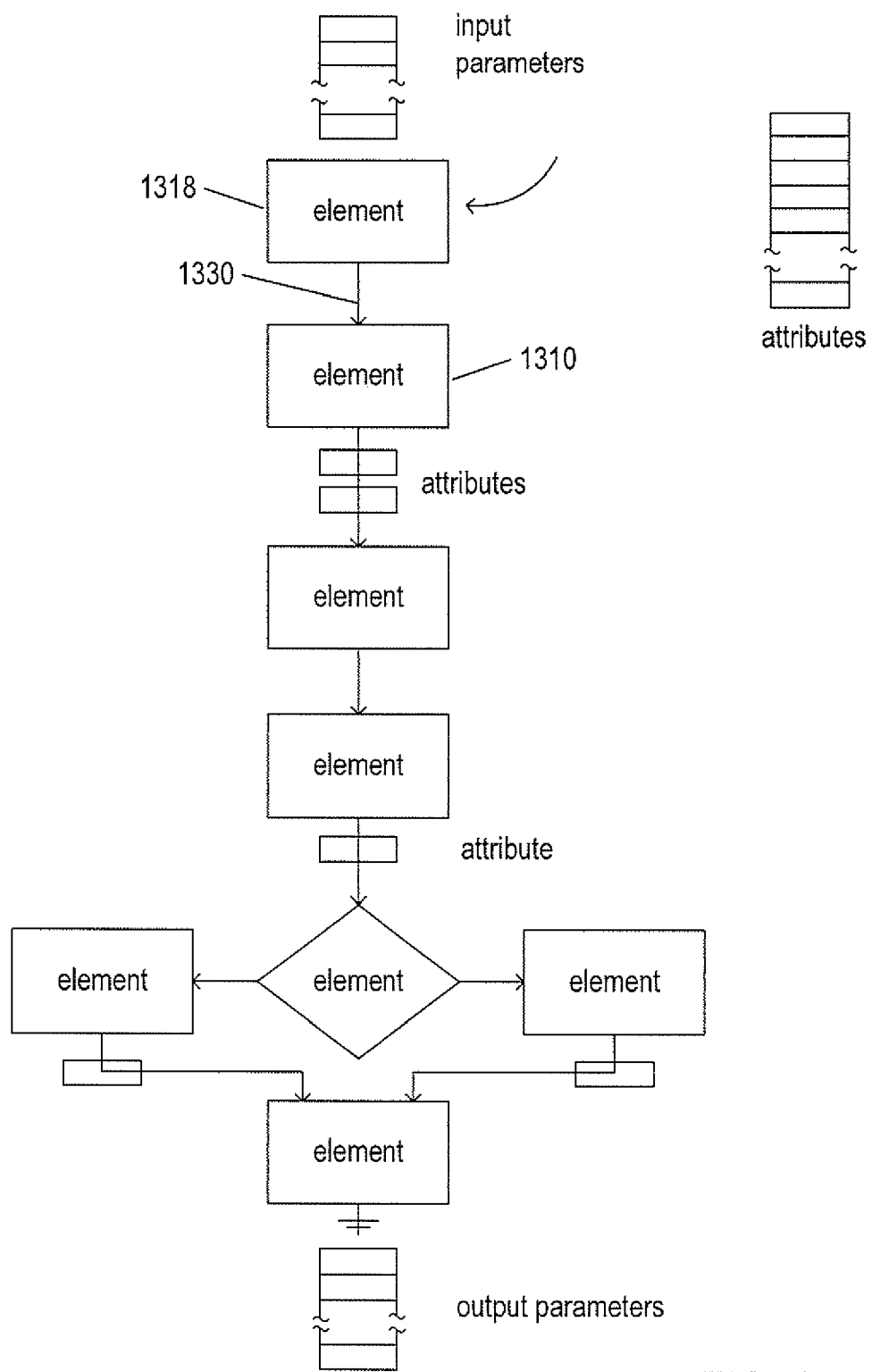
Figure 13C:
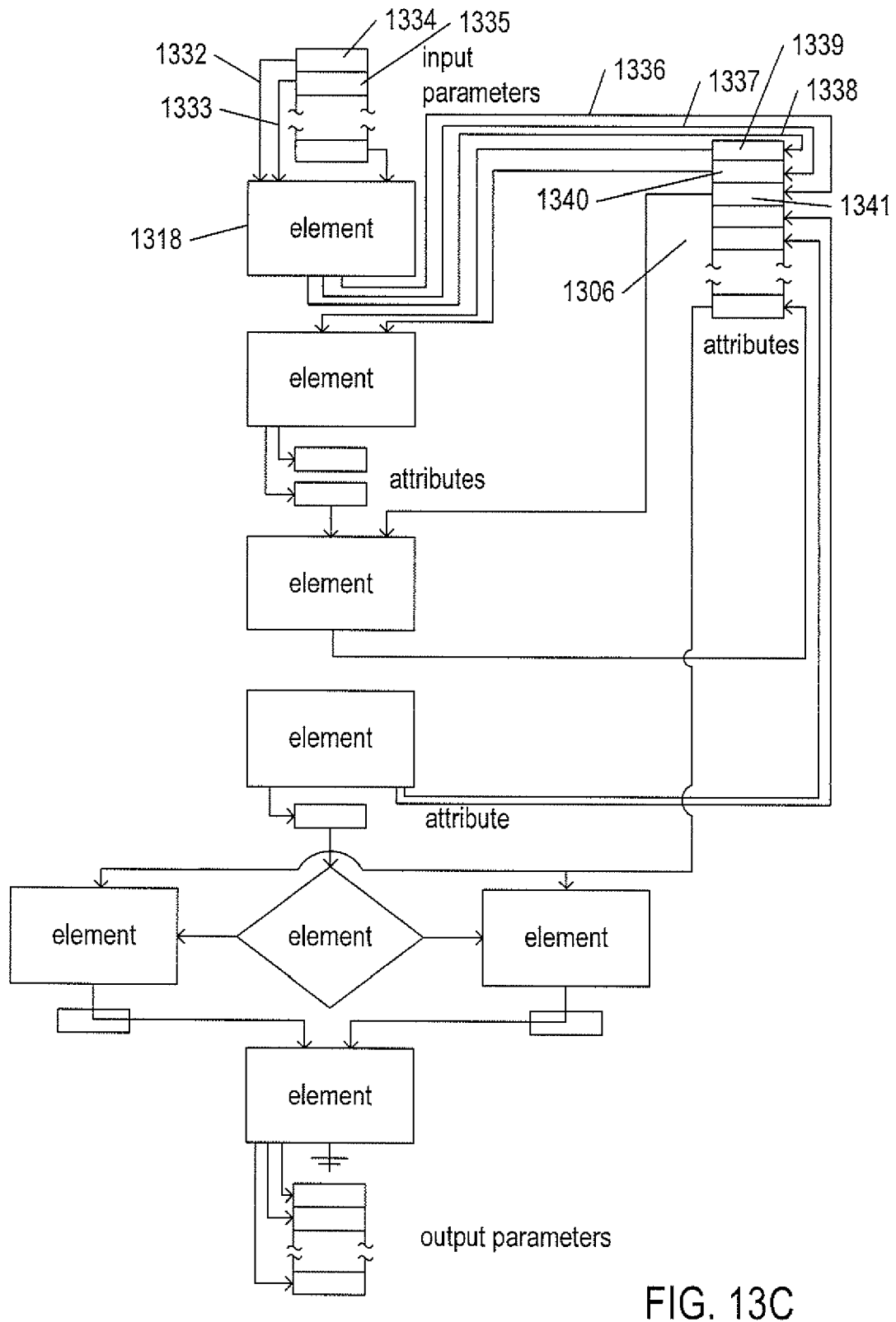

FIGS. 13A-C illustrate the structure of a workflow. A workflow is a graphically represented high-level program. FIG. 13A shows the main logical components of a workflow. These components include a set of one or more input parameters 1302 and a set of one or more output parameters 1304. In certain cases, a workflow may not include input and/or output parameters, but, in general, both input parameters and output parameters are defined for each workflow. The input and output parameters can have various different data types, with the values for a parameter depending on the data type associated with the parameter. For example, a parameter may have a string data type, in which case the values for the parameter can include any alphanumeric string or Unicode string of up to a maximum length. A workflow also generally includes a set of parameters 1306 that store values manipulated during execution of the workflow. This set of parameters is similar to a set of global variables provided by many common programming languages. In addition, attributes can be defined within individual elements of a workflow, and can be used to pass values between elements. In FIG. 13A, for example, attributes 1308-1309 are defined within element 1310 and attributes 1311, 1312, and 1313 are defined within elements 1314, 1315, and 1316, respectively. Elements, such as elements 1318, 1310, 1320, 1314-1316, and 1322 in FIG. 13A, are the execution entities within a workflow. Elements are equivalent to one or a combination of common constructs in programming languages, including subroutines, control structures, error handlers, and facilities for launching asynchronous and synchronous procedures. Elements may correspond to script routines, for example, developed to carry out an almost limitless number of different computational tasks. Elements are discussed, in greater detail, below.

As shown in FIG. 13B, the logical control flow within a workflow is specified by links, such as link 1330 which indicates that element 1310 is executed following completion of execution of element 1318. In FIG. 13B, links between elements are represented as single-headed arrows. Thus, links provide the logical ordering that is provided, in a common programming language, by the sequential ordering of statements. Finally, as shown in FIG. 13C, bindings that bind input parameters, output parameters, and attributes to particular roles with respect to elements specify the logical data flow in a workflow. In FIG. 13C, single-headed arrows, such as single-headed arrow 1332, represent bindings between elements and parameters and attributes. For example, bindings 1332 and 1333 indicate that the values of the first input parameters 1334 and 1335 are input to element 1318. Thus, the first two input parameters 1334-1335 play similar roles as arguments to functions in a programming language. As another example, the bindings represented by arrows 1336-1338 indicate that element 1318 outputs values that are stored in the first three attributes 1339, 1340, and 1341 of the set of attributes 1306.

Thus, a workflow is a graphically specified program, with elements representing executable entities, links representing logical control flow, and bindings representing logical data flow. A workflow can be used to specific arbitrary and arbitrarily complex logic, in a similar fashion as the specification of logic by a compiled, structured programming language, an interpreted language, or a script language.

FIGS. 14A-B include a table of different types of elements that may be included in a workflow. Workflow elements may include a start-workflow element 1402 and an end-workflow element 1404, examples of which include elements 1318 and 1322, respectively, in FIG. 13A. Decision workflow elements 1406-1407, an example of which is element 1317 in FIG. 13A, function as an if-then-else construct commonly provided by structured programming languages. Scriptable-task elements 1408 are essentially script routines included in a workflow. A user-interaction element 1410 solicits input from a user during workflow execution. Waiting-timer and waiting-event elements 1412-1413 suspend workflow execution for a specified period of time or until the occurrence of a specified event. Thrown-exception elements 1414 and error-handling elements 1415-1416 provide functionality commonly provided by throw-catch constructs in common programming languages. A switch element 1418 dispatches control to one of multiple paths, similar to switch statements in common programming languages, such as C and C++. A for each element 1420 is a type of iterator. External workflows can be invoked from a currently executing workflow by a workflow element 1422 or asynchronous-workflow element 1423. An action element 1424 corresponds to a call to a workflow-library routine. A workflow-note element 1426 represents a comment that can be included within a workflow. External workflows can also be invoked by schedule-workflow and nested-workflows elements 1428 and 1429.

Figure 15A:
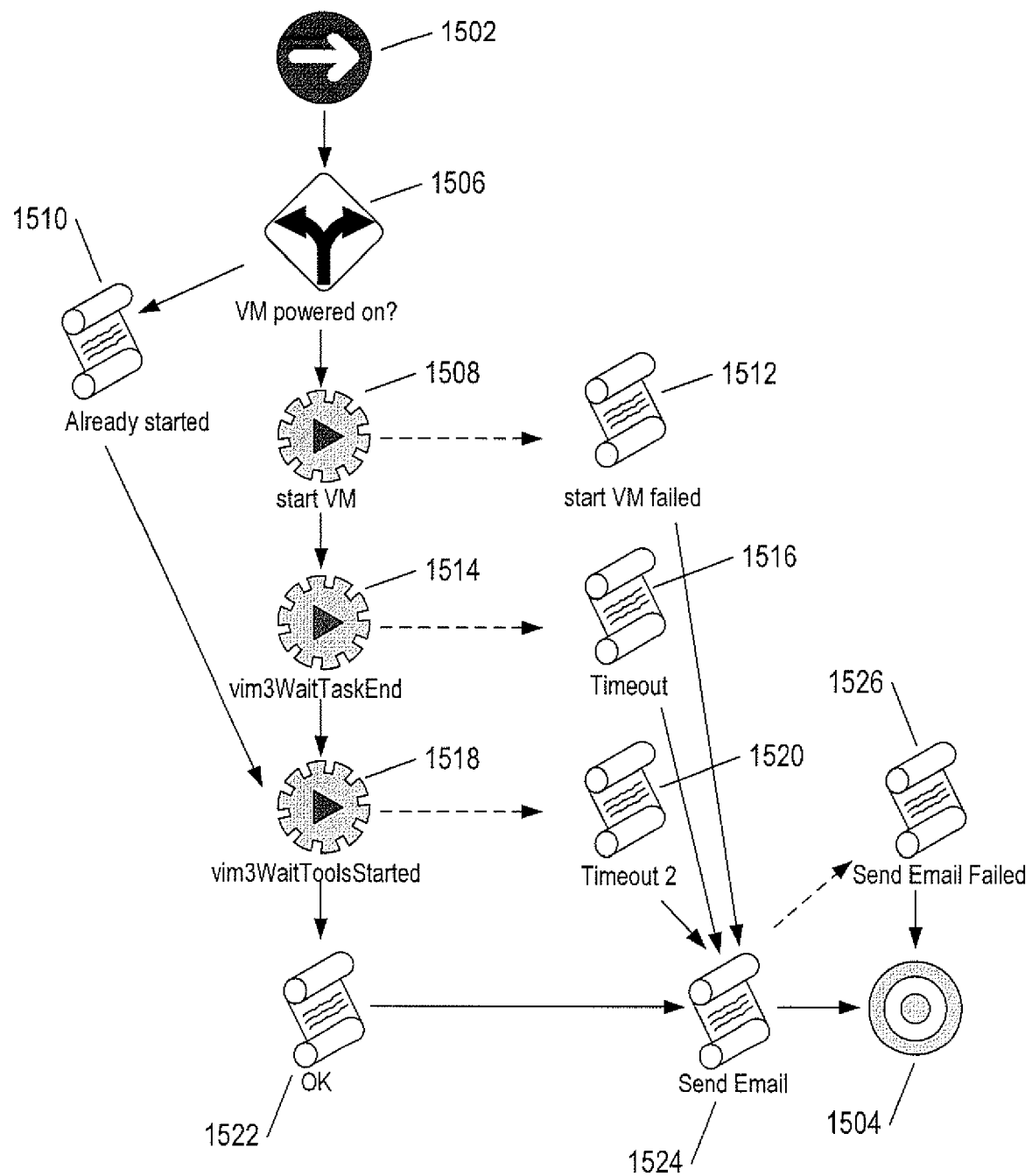
FIGS. 15A-B show an example workflow.
Figure 15B:
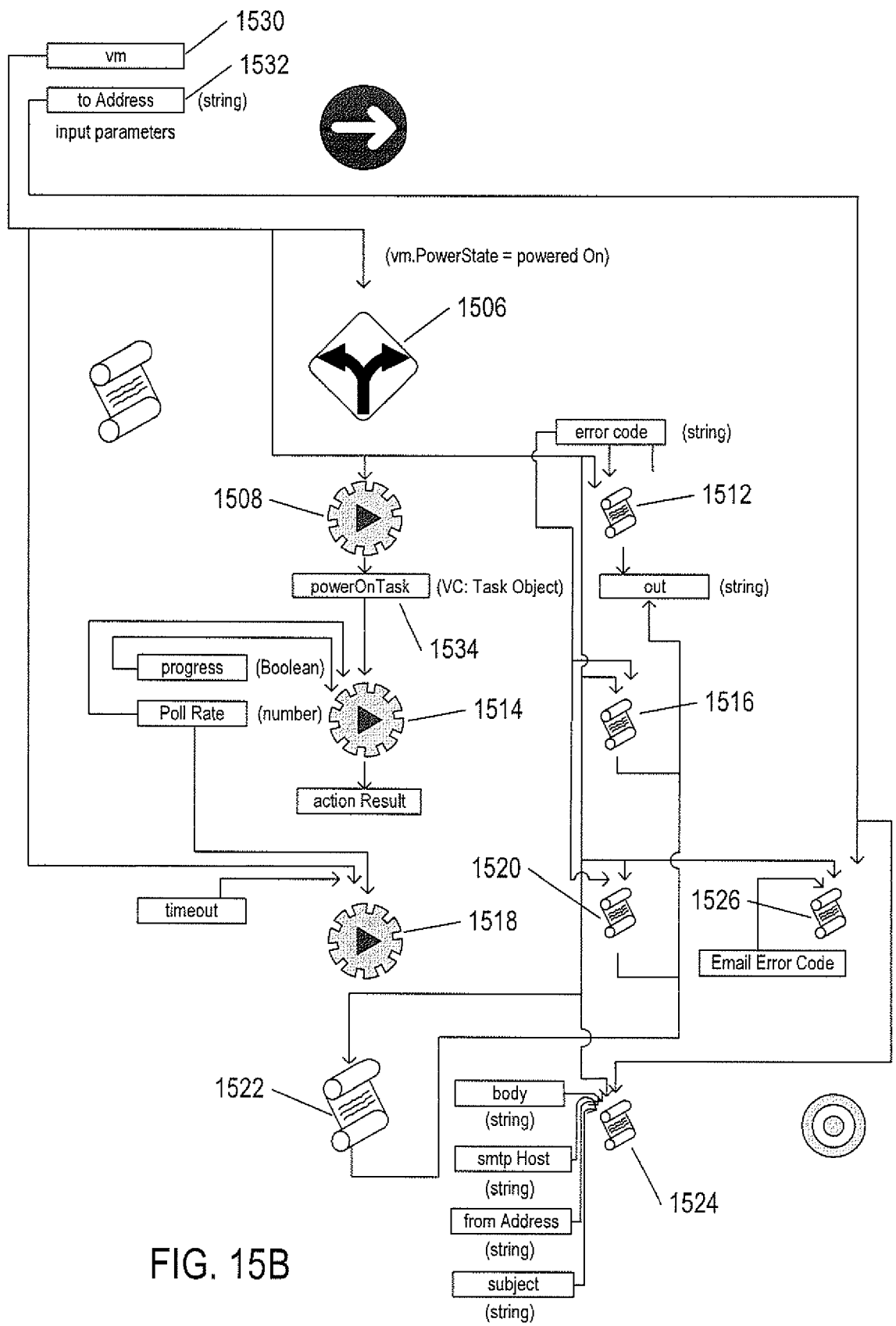

FIGS. 15A-B show an example workflow. The workflow shown in FIG. 15A is a virtual-machine-starting workflow that prompts a user to select a virtual machine to start and provides an email address to receive a notification of the outcome of workflow execution. The prompts are defined as input parameters. The workflow includes a start-workflow element 1502 and an end-workflow element 1504. The decision element 1506 checks to see whether or not the specified virtual machine is already powered on. When the VM is not already powered on, control flows to a start-VM action 1508 that calls a workflow-library function to launch the VM. Otherwise, the fact that the VM was already powered on is logged, in an already-started scripted element 1510. When the start operation fails, a start-VM-failed scripted element 1512 is executed as an exception handler and initializes an email message to report the failure. Otherwise, control flows to a vim3WaitTaskEnd action element 1514 that monitors the VM-starting task. A timeout exception handler is invoked when the start-VM task does not finish within a specified time period. Otherwise, control flows to a vim3WaitToolsStarted task 1518 which monitors starting of a tools application on the virtual machine. When the tools application fails to start, then a second timeout exception handler is invoked 1520. When all the tasks successfully complete, an OK scriptable task 1522 initializes an email body to report success. The email that includes either an error message or a success message is sent in the send-email scriptable task 1524. When sending the email fails, an email exception handler 1526 is called. The already-started, OK, and exception-handler scriptable elements 1510, 1512, 1516, 1520, 1522, and 1526 all log entries to a log file to indicate various conditions and errors. Thus, the workflow shown in FIG. 15A is a simple workflow that allows a user to specify a VM for launching to run an application.

FIG. 15B shows the parameter and attribute bindings for the workflow shown in FIG. 15A. The VM to start and the address to send the email are shown as input parameters 1530 and 1532. The VM to start is input to decision element 1506, start-VM action element 1508, the exception handlers 1512, 1516, 1520, and 1526, the send-email element 1524, the OK element 1522, and the vim3WaitToolsStarted element 1518. The email address furnished as input parameter 1532 is input to the email exception handler 1526 and the send-email element 1524. The VM-start task 1508 outputs an indication of the power on task initiated by the element in attribute 1534 which is input to the vim3WaitTaskEnd action element 1514. Other attribute bindings, input, and outputs are shown in FIG. 15B by additional arrows.

Figure 16A:
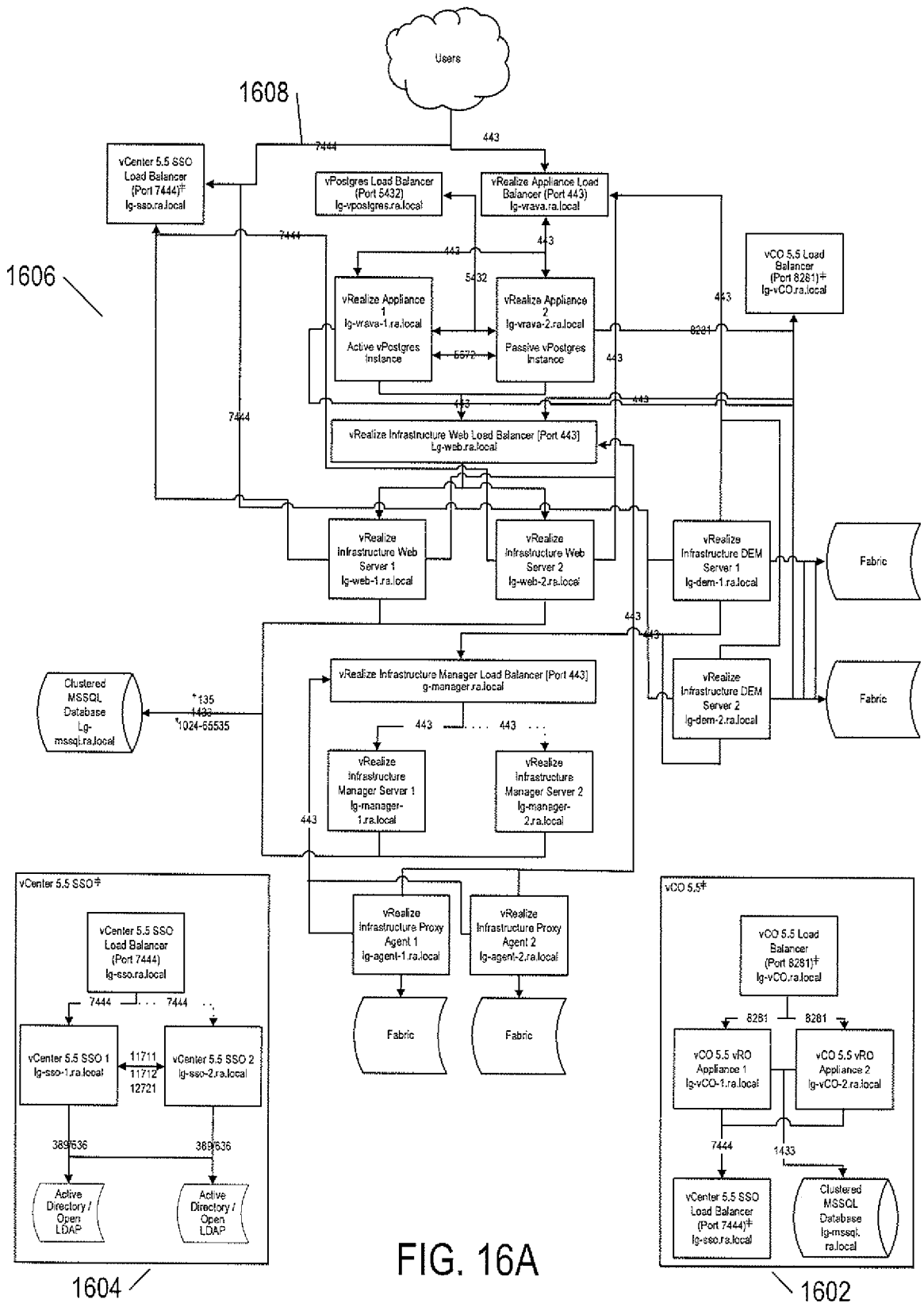

FIGS. 16A-C illustrate an example implementation and configuration of virtual appliances within a cloud-computing facility that implement the workflow-based management and administration facilities of the above-described WFMAD. FIG. 16A shows a configuration that includes the workflow-execution engine and development environment 1602, a cloud-computing facility 1604, and the infrastructure-management-and-administration facility 1606 of the above-described WFMAD. Data and information exchanges between components are illustrated with arrows, such as arrow 1608, labeled with port numbers indicating inbound and outbound ports used for data and information exchanges. FIG. 16B provides a table of servers, the services provided by the server, and the inbound and outbound ports associated with the server. Table 16C indicates the ports balanced by various load balancers shown in the configuration illustrated in FIG. 16A. It can be easily ascertained from FIGS. 16A-C that the WFMAD is a complex, multi-virtual-appliance/virtual-server system that executes on many different physical devices of a physical cloud-computing facility.

Figure 16D:
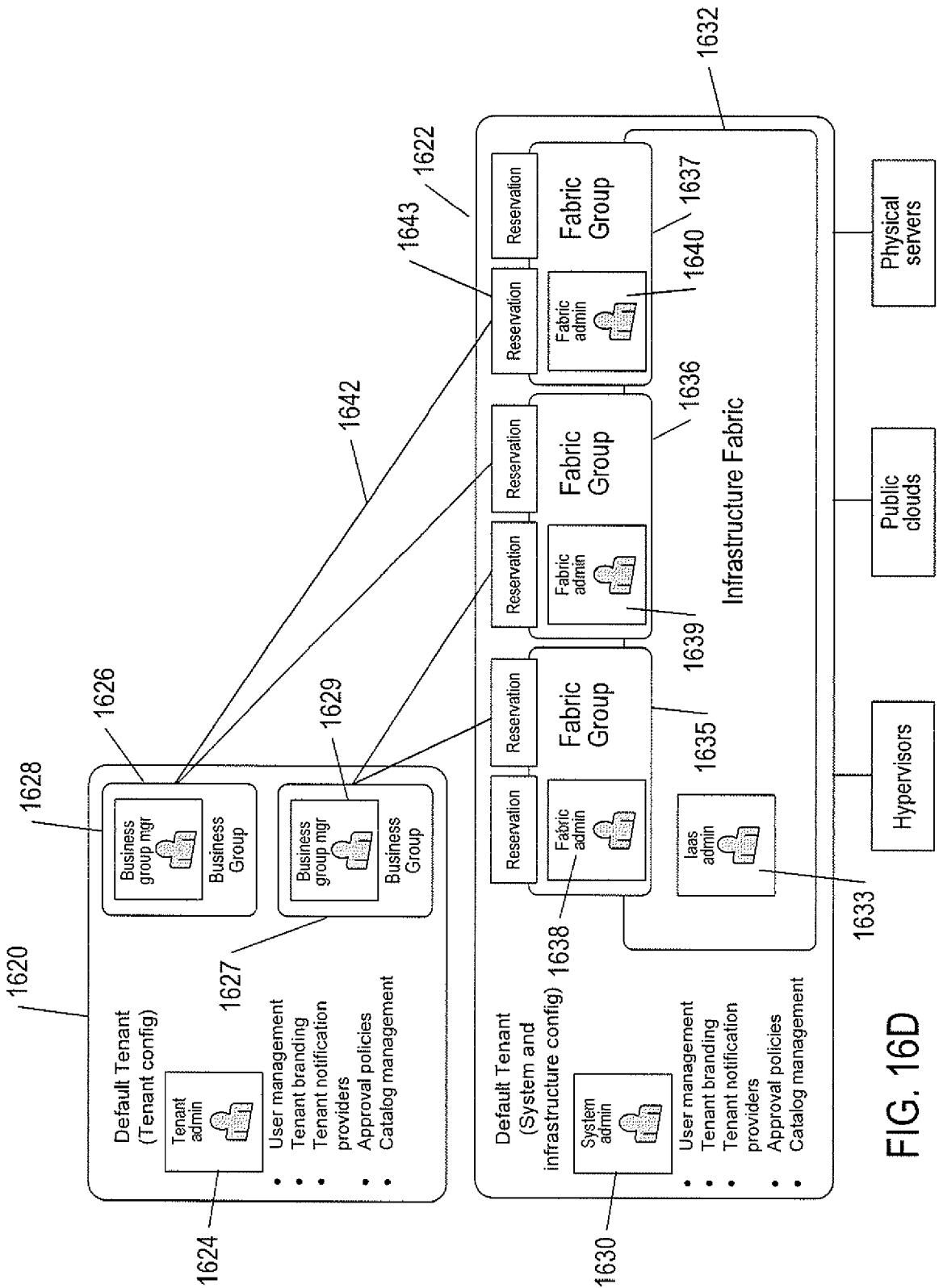
FIGS. 16D-F illustrate the logical organization of users and user roles with respect to the infrastructure-management-and-administration facility of the WFMAD.
Figure 16E:
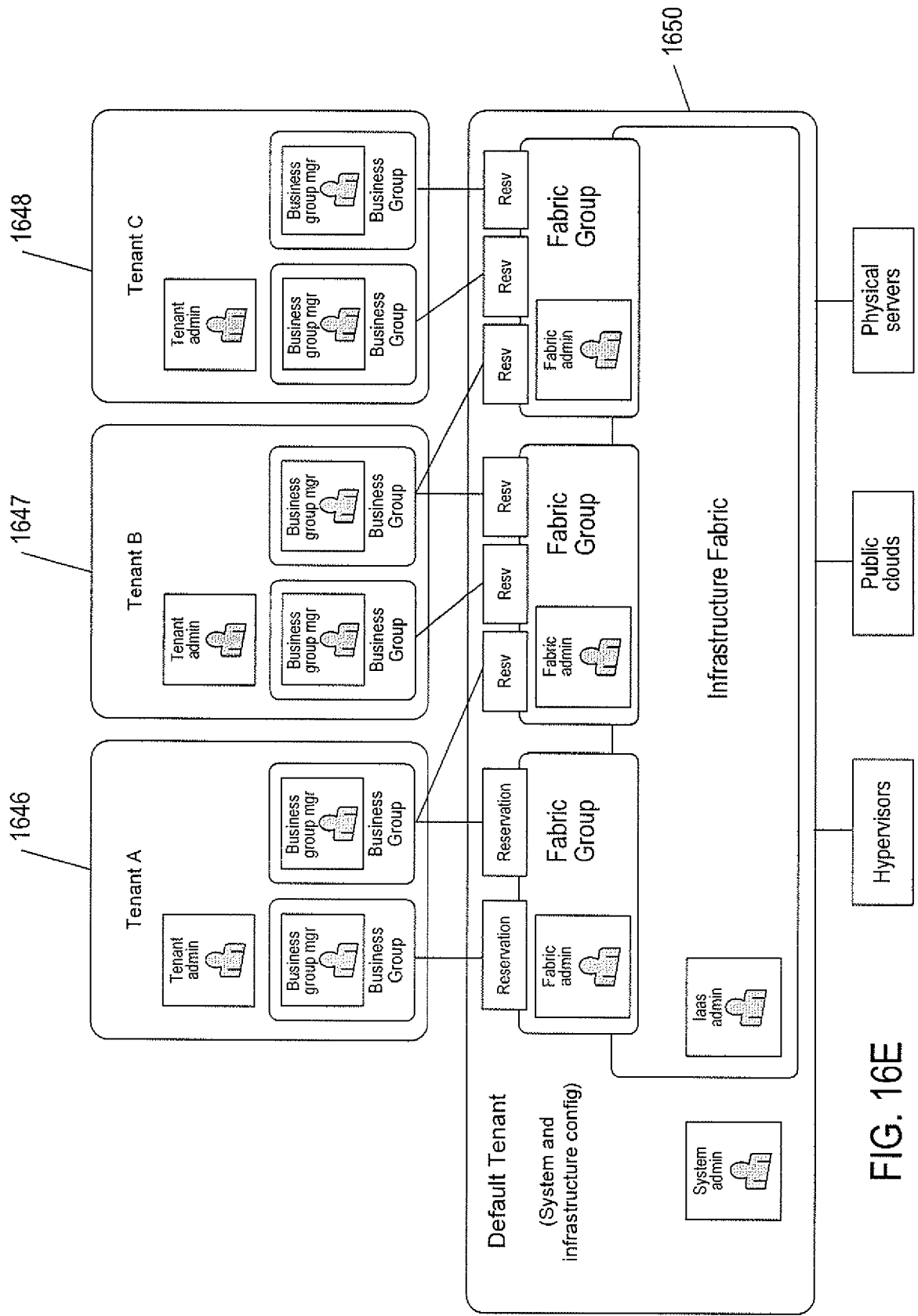
Figure 16F:
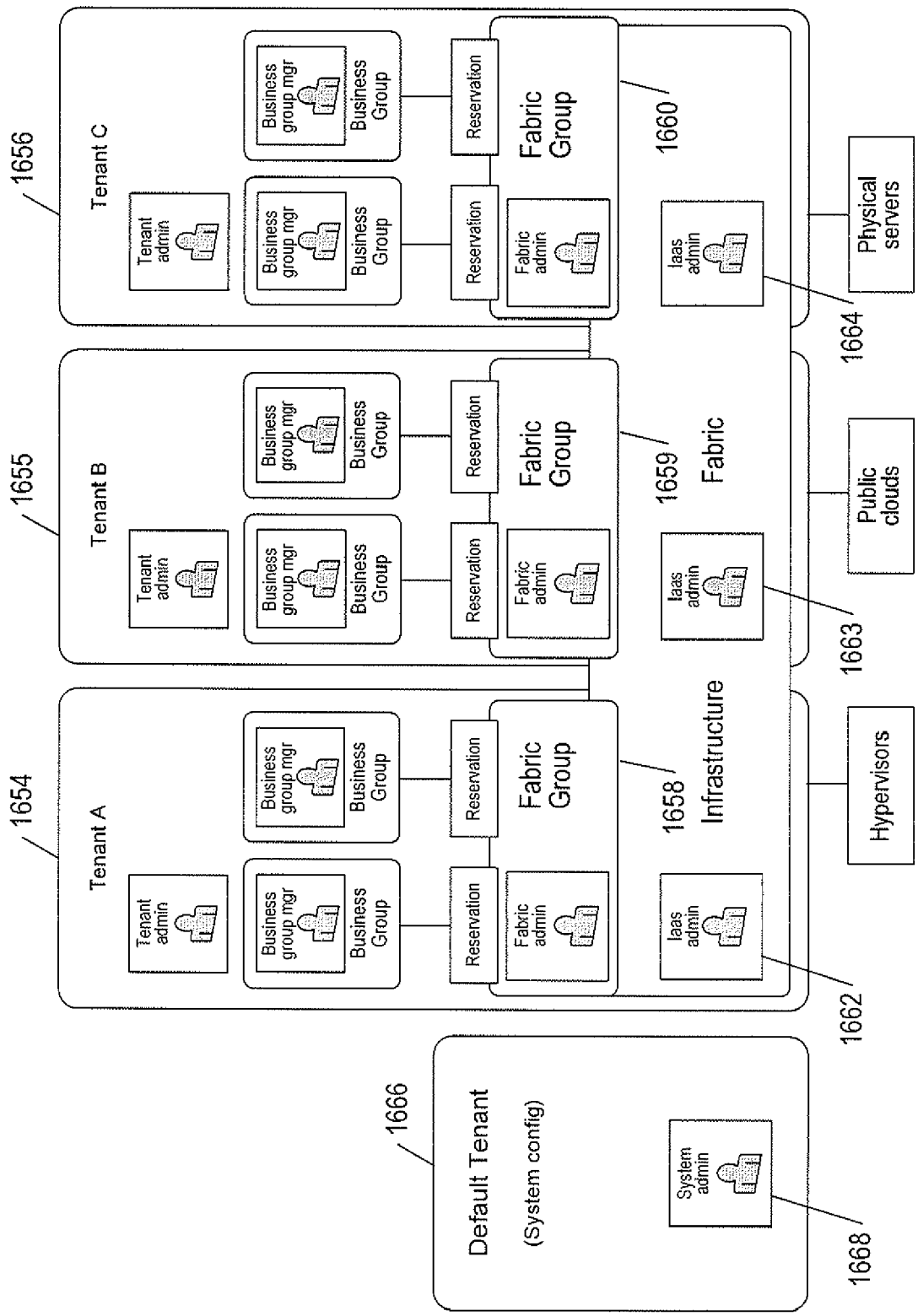

FIGS. 16D-F illustrate the logical organization of users and user roles with respect to the infrastructure-management-and-administration facility of the WFMAD (1114 in FIG. 11). FIG. 16D shows a single-tenant configuration, FIG. 16E shows a multi-tenant configuration with a single default-tenant infrastructure configuration, and FIG. 16F shows a multi-tenant configuration with a multi-tenant infrastructure configuration. A tenant is an organizational unit, such as a business unit in an enterprise or company that subscribes to cloud services from a service provider. When the infrastructure-management-and-administration facility is initially deployed within a cloud-computing facility or cloud-computing-facility aggregation, a default tenant is initially configured by a system administrator. The system administrator designates a tenant administrator for the default tenant as well as an identity store, such as an active-directory server, to provide authentication for tenant users, including the tenant administrator. The tenant administrator can then designate additional identity stores and assign roles to users or groups of the tenant, including business groups, which are sets of users that correspond to a department or other organizational unit within the organization corresponding to the tenant. Business groups are, in turn, associated with a catalog of services and infrastructure resources. Users and groups of users can be assigned to business groups. The business groups, identity stores, and tenant administrator are all associated with a tenant configuration. A tenant is also associated with a system and infrastructure configuration. The system and infrastructure configuration includes a system administrator and an infrastructure fabric that represents the virtual and physical computational resources allocated to the tenant and available for provisioning to users. The infrastructure fabric can be partitioned into fabric groups, each managed by a fabric administrator. The infrastructure fabric is managed by an infrastructure-as-a-service ("IAAS") administrator. Fabric-group computational resources can be allocated to business groups by using reservations.

FIG. 16D shows a single-tenant configuration for an infrastructure-management-and-administration facility deployment within a cloud-computing facility or cloud-computing-facility aggregation. The configuration includes a tenant configuration 1620 and a system and infrastructure configuration 1622. The tenant configuration 1620 includes a tenant administrator 1624 and several business groups 1626-1627, each associated with a business-group manager 1628-1629, respectively. The system and infrastructure configuration 1622 includes a system administrator 1630, an infrastructure fabric 1632 managed by an IAAS administrator 1633, and three fabric groups 1635-1637, each managed by a fabric administrator 1638-1640, respectively. The computational resources represented by the fabric groups are allocated to business groups by a reservation system, as indicated by the lines between business groups and reservation blocks, such as line 1642 between reservation block 1643 associated with fabric group 1637 and the business group 1626.

FIG. 16E shows a multi-tenant single-tenant-system-and-infrastructure-configuration deployment for an infrastructure-management-and-administration facility of the WFMAD. In this configuration, there are three different tenant organizations, each associated with a tenant configuration 1646-1648. Thus, following configuration of a default tenant, a system administrator creates additional tenants for different organizations that together share the computational resources of a cloud-computing facility or cloud-computing-facility aggregation. In general, the computational resources are partitioned among the tenants so that the computational resources allocated to any particular tenant are segregated from and inaccessible to the other tenants. In the configuration shown in FIG. 16F, there is a single default-tenant system and infrastructure configuration 1650, as in the previously discussed configuration shown in FIG. 16D.

FIG. 16F shows a multi-tenant configuration in which each tenant manages its own infrastructure fabric. As in the configuration shown in FIG. 16E, there are three different tenants 1654-1656 in the configuration shown in FIG. 16F. However, each tenant is associated with its own fabric group 1658-1660, respectively, and each tenant is also associated with an infrastructure-fabric IAAS administrator 1662-1664, respectively. A default-tenant system configuration 1666 is associated with a system administrator 1668 who administers the infrastructure fabric, as a whole.

System administrators, as mentioned above, generally install the WFMAD within a cloud-computing facility or cloud-computing-facility aggregation, create tenants, manage system-wide configuration, and are generally responsible for insuring availability of WFMAD services to users, in general, IAAS administrators create fabric groups, configure virtualization proxy agents, and manage cloud service accounts, physical machines, and storage devices. Fabric administrators manage physical machines and computational resources for their associated fabric groups as well as reservations and reservation policies through which the resources are allocated to business groups. Tenant administrators configure and manage tenants on behalf of organizations. They manage users and groups within the tenant, organization, track resource usage, and may initiate reclamation of provisioned resources. Service architects create blueprints for items stored in user service catalogs which represent services and resources that can be provisioned to users. The infrastructure-management-and-administration facility defines many additional roles for various administrators and users to manage provision of services and resources to users of cloud-computing facilities and cloud-computing facility aggregations.

Figure 17:
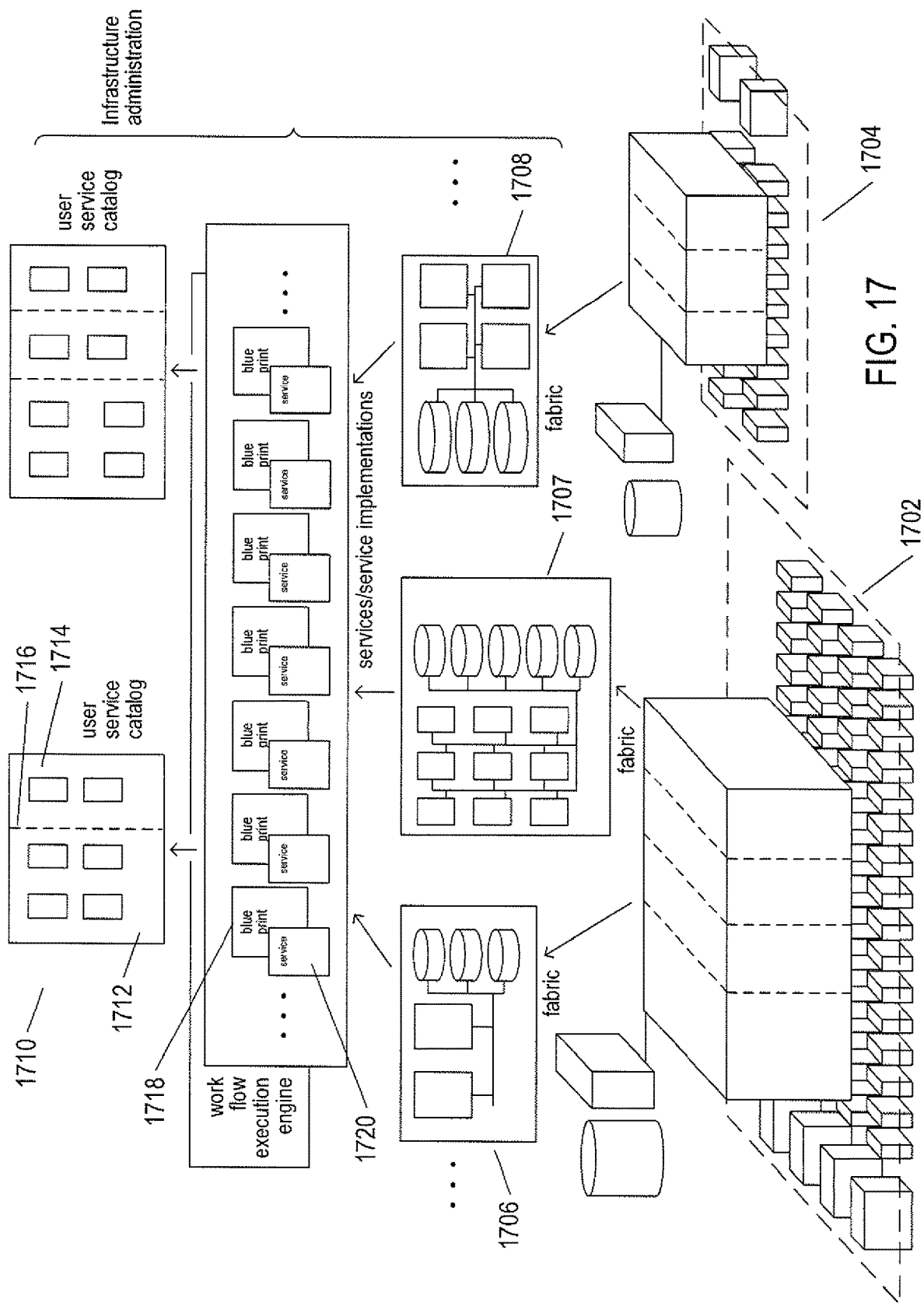
FIG. 17 illustrates the logical components of the infrastructure-management-and-administration facility of the WFMAD.

FIG. 17 illustrates the logical components of the infrastructure-management-and-administration facility (1114 in FIG. 11) of the WFMAD. As discussed above, the WFMAD is implemented within, and provides a management and development interface to, one or more cloud-computing facilities 1702 and 1704. The computational resources provided by the cloud-computing facilities, generally in the form of virtual servers, virtual storage devices, and virtual networks, are logically partitioned into fabrics 1706-1708. Computational resources are provisioned from fabrics to users. For example, a user may request one or more virtual machines running particular applications. The request is serviced by allocating the virtual machines from a particular fabric on behalf of the user. The services, including computational resources and workflow-implemented tasks, which a user may request provisioning of, are stored in a user service catalog, such as user service catalog 1710, that is associated with particular business groups and tenants. In FIG. 17, the items within a user service catalog are internally partitioned into categories, such as the two categories 1712 and 1714 and separated logically by vertical dashed line 1716. User access to catalog items is controlled by entitlements specific to business groups. Business group managers create entitlements that specify which users and groups within the business group can access particular catalog items. The catalog items are specified by service-architect-developed blueprints, such as blueprint 1718 for service 1720. The blueprint is a specification for a computational resource or task-service and the service itself is implemented by a workflow that is executed by the workflow-execution engine on behalf of a user.

FIGS. 18-20B provide a high-level illustration of the architecture and operation of the automated-application-release-management facility (1116 in FIG. 11) of the WFMAD. The application-release management process involves storing, logically organizing, and accessing a variety of different types of binary files and other files that represent executable programs and various types of data that are assembled into complete applications that are released to users for running on virtual servers within cloud-computing facilities. Previously, releases of new version of applications may have occurred over relatively long time intervals, such as biannually, yearly, or at even longer intervals. Minor versions were released at shorter intervals. However, more recently, automated application-release management has provided for continuous release at relatively short intervals in order to provide new and improved functionality to clients as quickly and efficiently as possible.

Figure 18:
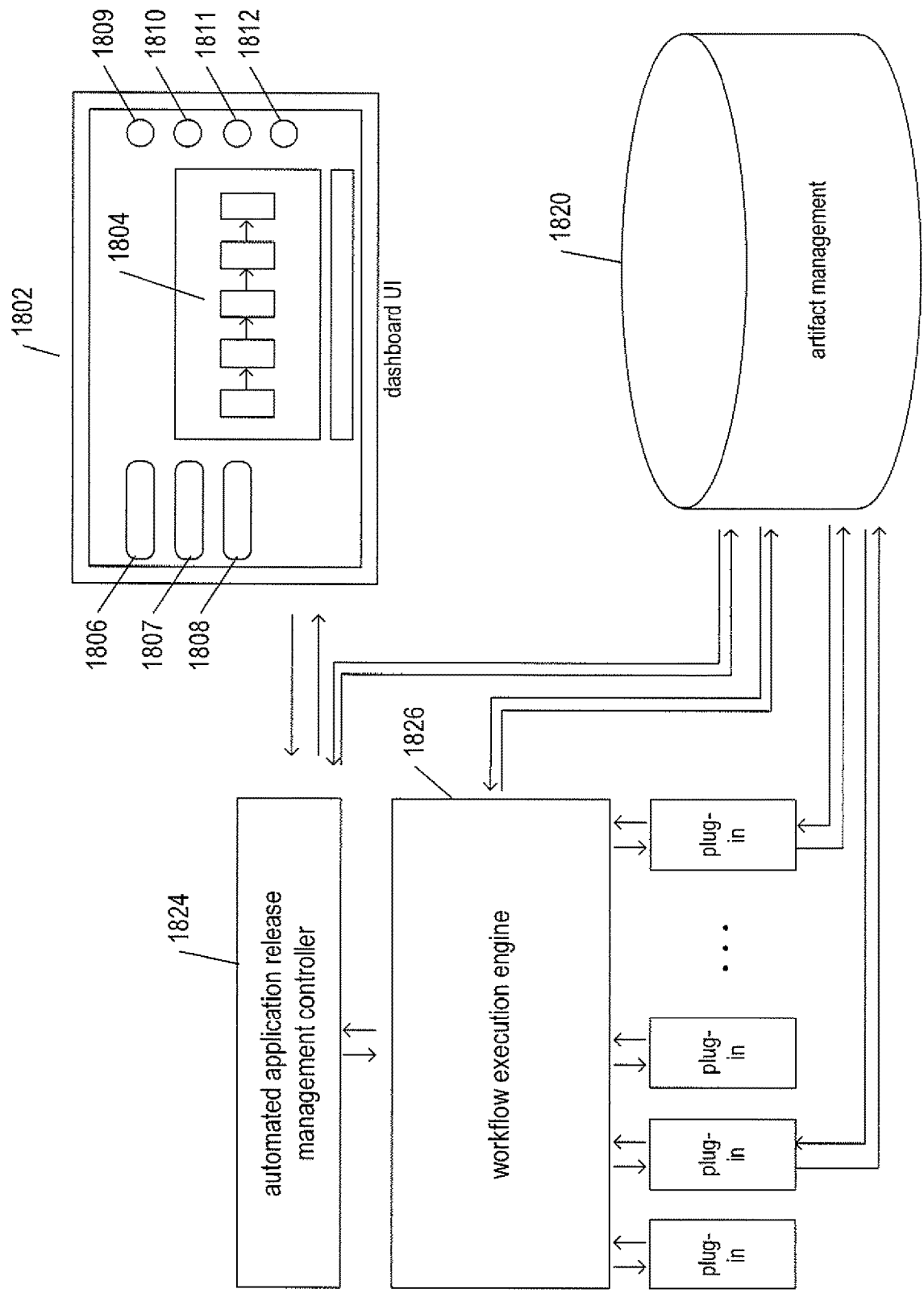
FIGS. 18-20B provide a high-level illustration of the architecture and operation of the automated-application-release-management facility of the WFMAD.

FIG. 18 shows main components of the automated-application-release-management facility (1116 in FIG. 11). The automated-application-release-management component provides a dashboard user interface 1802 to allow release managers and administrators to launch application-release-management pipelines ("release pipelines") and monitor their progress. The dashboard may visually display a graphically represented pipeline 1804 and provide various input features 1806-1812 to allow a release manager or administrator to view particular details about an executing pipeline, create and edit pipelines, launch pipelines, and generally manage and monitor the entire application-release process. The various binary files and other types of information needed to build and test applications are stored in an artifact-management component 1820. An automated-application-release-management controller 1824 sequentially initiates execution of various workflows that together implement a release pipeline and serves as an intermediary between the dashboard user interface 1802 and the workflow-execution engine 1826.

Figure 19:
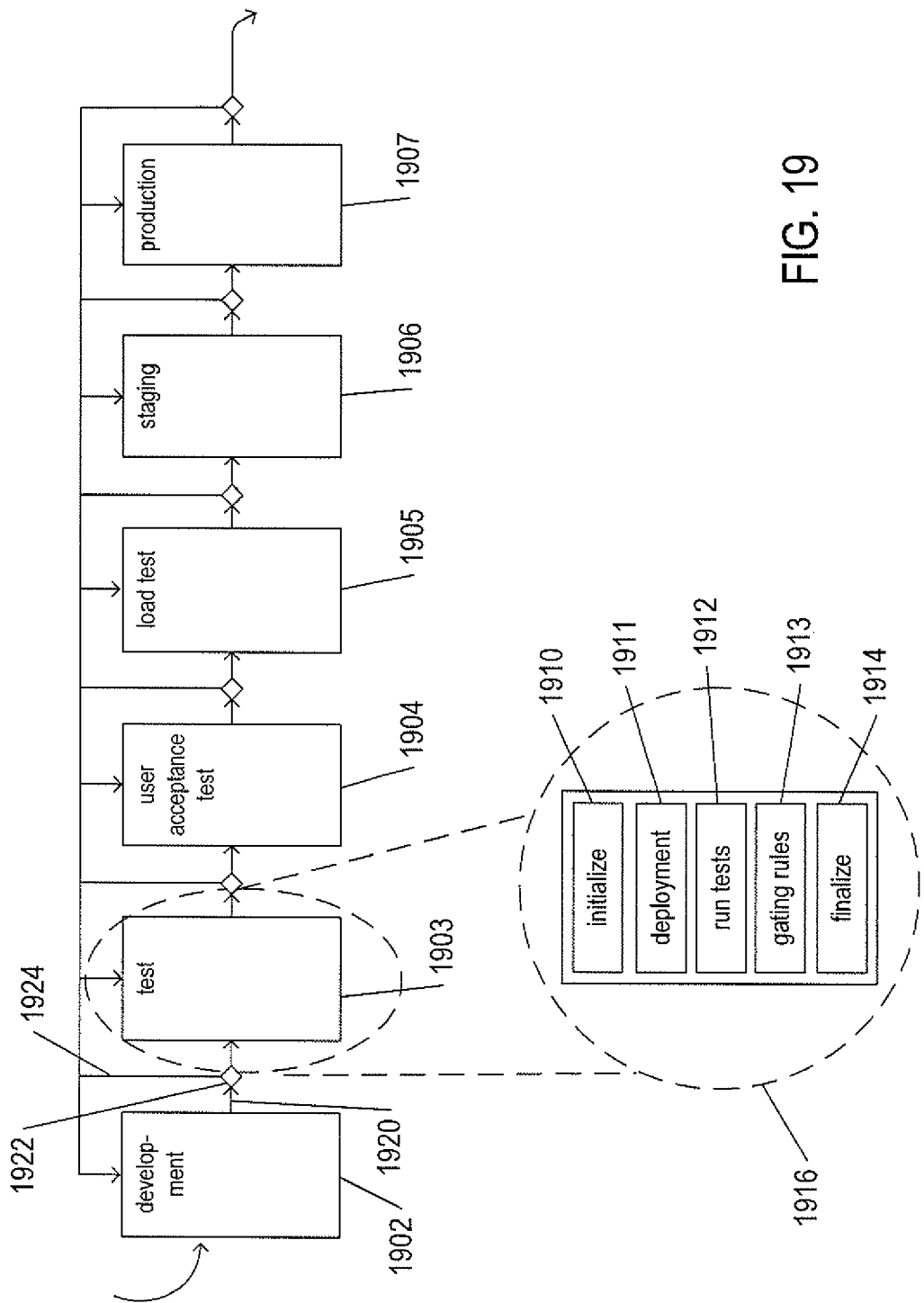

FIG. 19 illustrates a release pipeline. The release pipeline is a sequence of stages 1902-1907 that each comprises a number of sequentially executed tasks, such as the tasks 1910-1914 shown in inset 1916 that together compose stage 1903. In general, each stage is associated with gating rules that are executed to determine whether or not execution of the pipeline can advance to a next, successive stage. Thus, in FIG. 19, each stage is shown with an output arrow, such as output arrow 1920, that leads to a conditional step, such as conditional step 1922, representing the gating rules. When, as a result of execution of tasks within the stage, application of the gating rules to the results of the execution of the tasks indicates that execution should advance to a next stage, then any final tasks associated with the currently executing stage are completed and pipeline execution advances to a next stage. Otherwise, as indicated by the vertical lines emanating from the conditional steps, such as vertical line 1924 emanating from conditional step 1922, pipeline execution may return to re-execute the current stage or a previous stage, often after developers have supplied corrected binaries, missing data, or taken other steps to allow pipeline execution to advance.

Figure 20A:
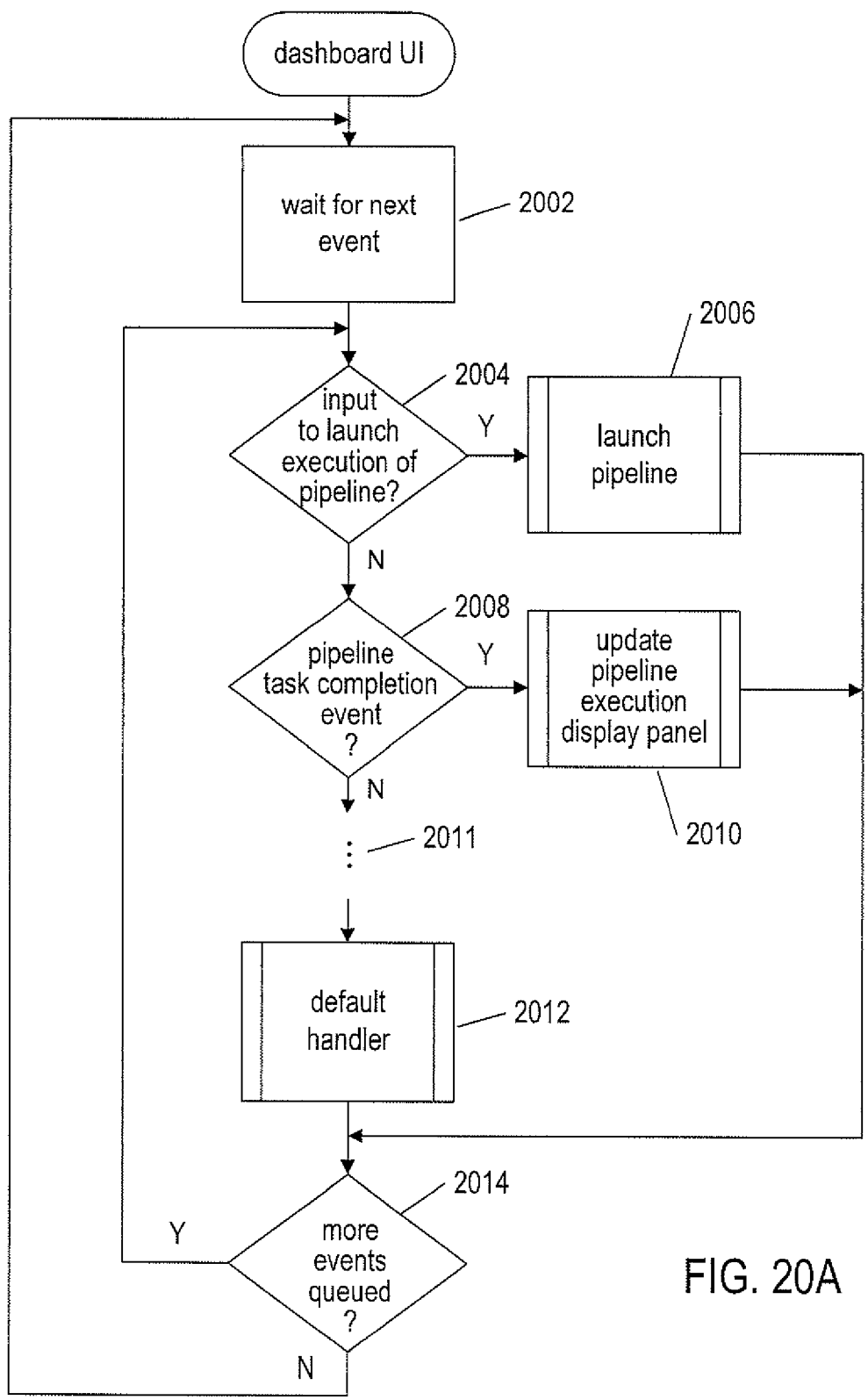
Figure 20B:
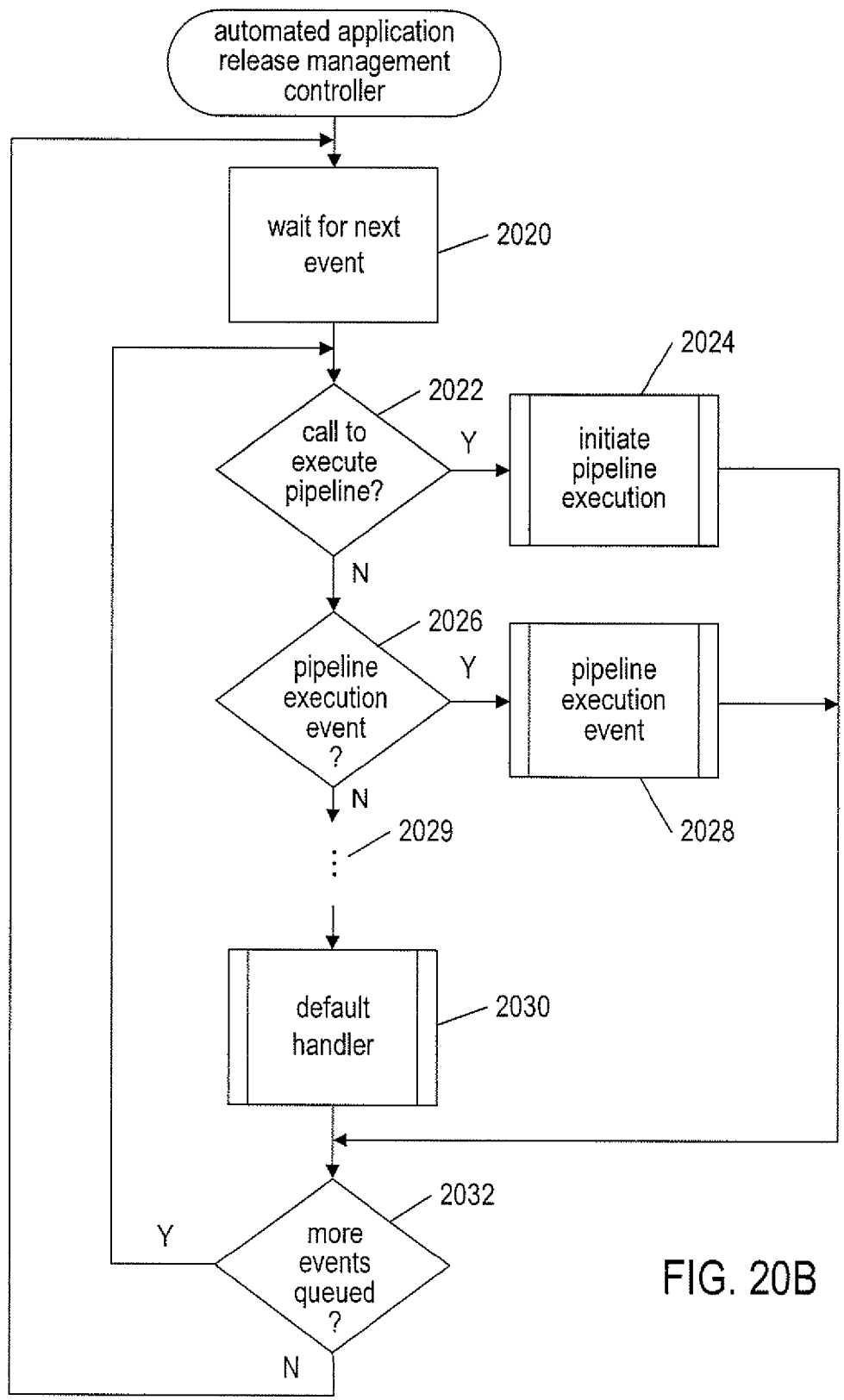

FIGS. 20A-B provide control-flow diagrams that indicate the general nature of dashboard and automated-application-release-management-controller operation. FIG. 20A shows a partial control-flow diagram for the dashboard user interface. In step 2002, the dashboard user interface waits for a next event to occur. When the next occurring event is input, by a release manager, to the dashboard to direct launching of an execution pipeline, as determined in step 2004, then the dashboard calls a launch-pipeline routine 2006 to interact with the automated-application-release-management controller to initiate pipeline execution. When the next-occurring event is reception of a pipeline task-completion event generated by the automated-application-release-management controller, as determined in step 2008, then the dashboard updates the pipeline-execution display panel within the user interface via a call to the routine "update pipeline execution display panel" in step 2010. There are many other events that the dashboard responds to, as represented by ellipses 2011, including many additional types of user input and many additional types of events generated by the automated-application-release-management controller that the dashboard responds to by altering the displayed user interface. A default handler 2012 handles rare or unexpected events. When there are more events queued for processing by the dashboard, as determined in step 2014, then control returns to step 2004. Otherwise, control returns to step 2002 where the dashboard waits for another event to occur.

FIG. 20B shows a partial control-flow diagram for the automated application-release-management controller. The control-flow diagram represents an event loop, similar to the event loop described above with reference to FIG. 20A. In step 2020, the automated application-release-management controller waits for a next event to occur. When the event is a call from the dashboard user interface to execute a pipeline, as determined in step 2022, then a routine is called, in step 2024, to initiate pipeline execution via the workflow-execution engine. When the next-occurring event is a pipeline-execution event generated by a workflow, as determined in step 2026, then a pipeline-execution-event routine is called in step 2028 to inform the dashboard of a status change in pipeline execution as well as to coordinate next steps for execution by the workflow-execution engine. Ellipses 2029 represent the many additional types of events that are handled by the event loop. A default handler 2030 handles rare and unexpected events. When there are more events queued for handling, as determined in step 2032, control returns to step 2022. Otherwise, control returns to step 2020 where the automated application-release-management controller waits for a next event to occur.

Figure 21:
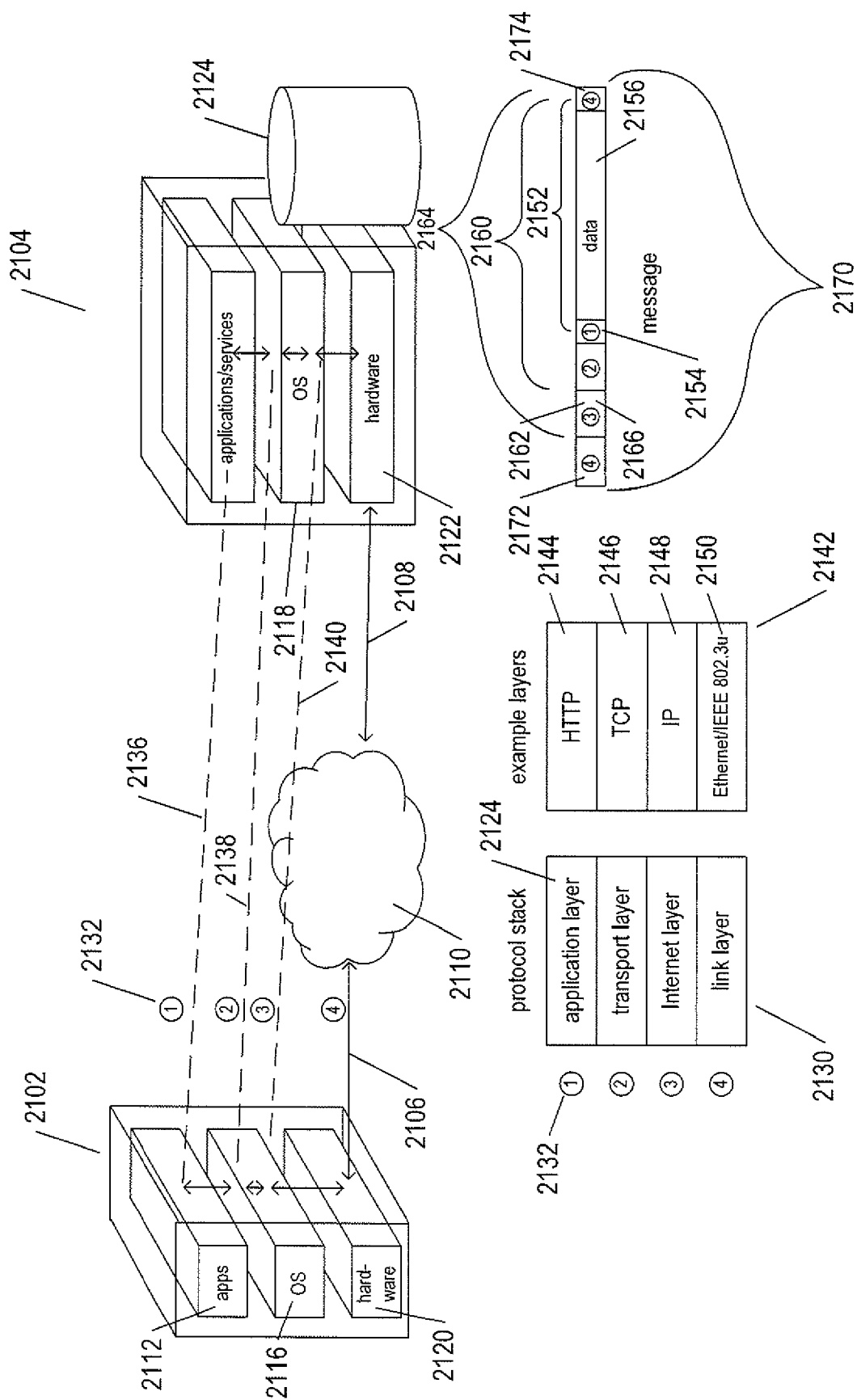
FIG. 21 shows a representation of a common protocol stack.

The REST Protocol and RESTful Applications and Use of Endpoints by Release Pipelines Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." FIG. 21 shows a representation of a common protocol stack. In FIG. 21, a representation of a common protocol stack 2130 is shown below the interconnected server and client computers 2104 and 2102. The layers are associated with layer numbers, such as layer number "I" 2132 associated with the application layer 2134. These same layer numbers are used in the depiction of the interconnection of the client computer 2102 with the server computer 2104, such as layer number "1" 2132 associated with a horizontal dashed line 2136 that represents interconnection of the application layer 2112 of the client computer with the applications/services layer 2114 of the server computer through an application-layer protocol. A dashed line 2136 represents interconnection via the application-layer protocol in FIG. 21, because this interconnection is logical, rather than physical. Dashed-line 2138 represents the logical interconnection of the operating-system layers of the client and server computers via a transport layer. Dashed line 2140 represents the logical interconnection of the operating systems of the two computer systems via an Internet-layer protocol. Finally, links 2106 and 2108 and cloud 2110 together represent the physical communications media and components that physically transfer data from the client computer to the server computer and from the server computer to the client computer. These physical communications components and media transfer data according to a link-layer protocol. In FIG. 21, a second table 2142 aligned with the table 2130 that illustrates the protocol stack includes example protocols that may be used for each of the different protocol layers. The hypertext transfer protocol ("HTTP") may be used as the application-layer protocol 2144, the transmission control protocol ("TCP") 2146 may be used as the transport-layer protocol, the Internet protocol 2148 ("IP") may be used as the Internet-layer protocol, and, in the case of a computer system interconnected through a local Ethernet to the Internet, the Ethernet/IEEE 802.3u protocol 2150 may be used for transmitting and receiving information from the computer system to the complex communications components of the Internet. Within cloud 2110, which represents the Internet, many additional types of protocols may be used for transferring the data between the client computer and server computer.

Consider the sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 2152. The datagram may generally include a header 2154 as well as the data 2156, encoded as a sequence of bytes within a block of memory. The header 2154 is generally a record composed of multiple byte-encoded fields. The call by the application program to an application-layer system call is represented in FIG. 21 by solid vertical arrow 2158. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 2160 includes a transport-layer-message header 2162 and an application-layer datagram 2152. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 2164, each including an Internet-layer header 2166 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a network-interface controller ("NIC") which embeds the Internet-layer datagram 2164 into a link-layer datagram 2170 that includes a link-layer header 2172 and generally includes a number of additional bytes 2174 appended to the end of the Internet-layer datagram. The link-layer header includes collision-control and error-control information as well as local-network addresses. The link-layer packet or datagram 2170 is a sequence of bytes that includes information introduced by each of the layers of the protocol stack as well as the actual data that is transferred from the source computer to the destination computer according to the application-layer protocol.

Figure 22:
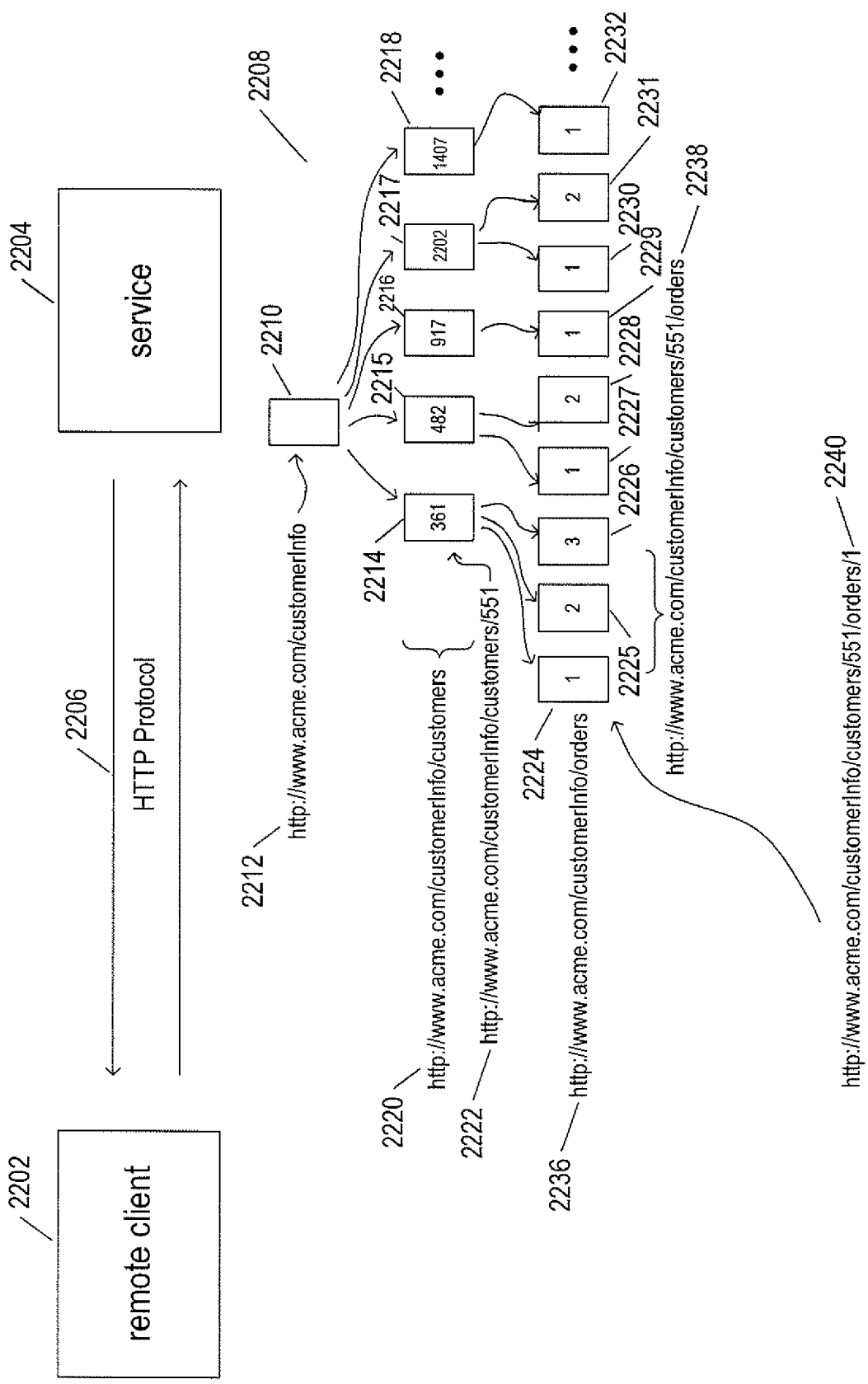
FIG. 22 illustrates the role of resources in RESTful APIs.

Next, the RESTful approach to web-service APIs is described, beginning with FIG. 22. FIG. 22 illustrates the role of resources in RESTful APIs. In FIG. 22, and in subsequent figures, a remote client 2202 is shown to be interconnected and communicating with a service provided by one or more service computers 2204 via the HTTP protocol 2206. Many RESTful APIs are based on the HTTP protocol. Thus, the focus is on the application layer in the following discussion. However, as discussed above with reference to FIG. 22, the remote client 2202 and service provided by one or more server computers 2204 are, in fact, physical systems with application, operating-system, and hardware layers that are interconnected with various types of communications media and communications subsystems, with the HTTP protocol the highest-level layer in a protocol stack implemented in the application, operating-system, and hardware layers of client computers and server computers. The service may be provided by one or more server computers, as discussed above in a preceding section. As one example, a number of servers may be hierarchically organized as various levels of intermediary servers and end-point servers. However, the entire collection of servers that together provide a service are addressed by a domain name included in a uniform resource identifier ("URI"), as further discussed below. A RESTful API is based on a small set of verbs, or operations, provided by the HTTP protocol and on resources, each uniquely identified by a corresponding URI. Resources are logical entities, information about which is stored on one or more servers that together comprise a domain. URIs are the unique names for resources. A resource about which information is stored on a server that is connected to the Internet has a unique URI that allows that information to be accessed by any client computer also connected to the Internet with proper authorization and privileges. URIs are thus globally unique identifiers, and can be used to specify resources on server computers throughout the world. A resource may be any logical entity, including people, digitally encoded documents, organizations, and other such entities that can be described and characterized by digitally encoded information. A resource is thus a logical entity. Digitally encoded information that describes the resource and that can be accessed by a client computer from a server computer is referred to as a "representation" of the corresponding resource. As one example, when a resource is a web page, the representation of the resource may be a hypertext markup language ("HTML") encoding of the resource. As another example, when the resource is an employee of a company, the representation of the resource may be one or more records, each containing one or more fields, that store information characterizing the employee, such as the employee's name, address, phone number, job title, employment history, and other such information.

In the example shown in FIG. 22, the web servers 2204 provides a RESTful API based on the HTTP protocol 2206 and a hierarchically organized set of resources 2208 that allow clients of the service to access information about the customers and orders placed by customers of the Acme Company. This service may be provided by the Acme Company itself or by a third-party information provider. All of the customer and order information is collectively represented by a customer information resource 2210 associated with the URI "http://www.acme.com/customerInfo" 2212. As discussed further, below, this single URI and the HTTP protocol together provide sufficient information for a remote client computer to access any of the particular types of customer and order information stored and distributed by the service 2204. A customer information resource 2210, referred to as an "endpoint," represents a large number of subordinate resources. These subordinate resources include, for each of the customers of the Acme Company, a customer resource, such as customer resource 2214. All of the customer resources 2214-2218 are collectively named or specified by the single URI "http://www.acme.com/customerInfo/customers" 2220. Individual customer resources, such as customer resource 2214, are associated with customer-identifier numbers and are each separately addressable by customer-resource-specific URIs, such as URI "http://www.acme.com/customerInfo/customers/361" 2222 which includes the customer identifier "361" for the customer represented by customer resource 2214. Each customer may be logically associated with one or more orders. For example, the customer represented by customer resource 2214 is associated with three different orders 2224-2226, each represented by an order resource. All of the orders are collectively specified or named by a single URI "http://www.acme.com/customerInfo/orders" 2236. All of the orders associated with the customer represented by resource 2214, orders represented by order resources 2224-2226, can be collectively specified by the URI "http://www.acne.com/customerInfo/ customers/361/orders" 2238. A particular order, such as the order represented by order resource 2224, may be specified by a unique URI associated with that order, such as URI "http://www.acme.com/customerInfocustomers/361/orders/" 2240, where the final "1" is an order number that specifies a particular order within the set of orders corresponding to the particular customer identified by the customer identifier "361."

In one sense, the URIs bear similarity to path names to files in file directories provided by computer operating systems. However, it should be appreciated that resources, unlike files, are logical entities rather than physical entities, such as the set of stored bytes that together compose a file within a computer system. When a file is accessed through a path name, a copy of a sequence of bytes that are stored in a memory or mass-storage device as a portion of that file are transferred to an accessing entity. By contrast, when a resource is accessed through a URI, a server computer returns a digitally encoded representation of the resource, rather than a copy of the resource. For example, when the resource is a human being, the service accessed via a URI specifying the human being may return alphanumeric encodings of various characteristics of the human being, a digitally encoded photograph or photographs, and other such information. Unlike the case of a file accessed through a path name, the representation of a resource is not a copy of the resource, but is instead some type of digitally encoded information with respect to the resource.

In the example RESTful API illustrated in FIG. 22, a client computer can use the verbs, or operations, of the HTTP protocol and the top-level URI 2212 to navigate the entire hierarchy of resources 2208 in order to obtain information about particular customers and about the orders that have been placed by particular customers.

FIGS. 23A-D illustrate four basic verbs, or operations, provided by the HTTP application-layer protocol used in RESTful applications. RESTful applications are client/server protocols in which a client issues an HTTP request message to a service or server and the service or server responds by returning a corresponding HTTP response message. FIGS. 23A-D use the illustration conventions discussed above with reference to FIG. 22 with regard to the client, service, and HTTP protocol. For simplicity and clarity of illustration, in each of these figures, a top portion illustrates the request and a lower portion illustrates the response. The remote client 2302 and service 2304 are shown as labeled rectangles, as in FIG. 22. A right-pointing solid arrow 2306 represents sending of an HTTP request message from a remote client to the service and a left-pointing solid arrow 2308 represents sending of a response message corresponding to the request message by the service to the remote client. For clarity and simplicity of illustration, the service 2304 is shown associated with a few resources 2310-2312.

Figure 23A:
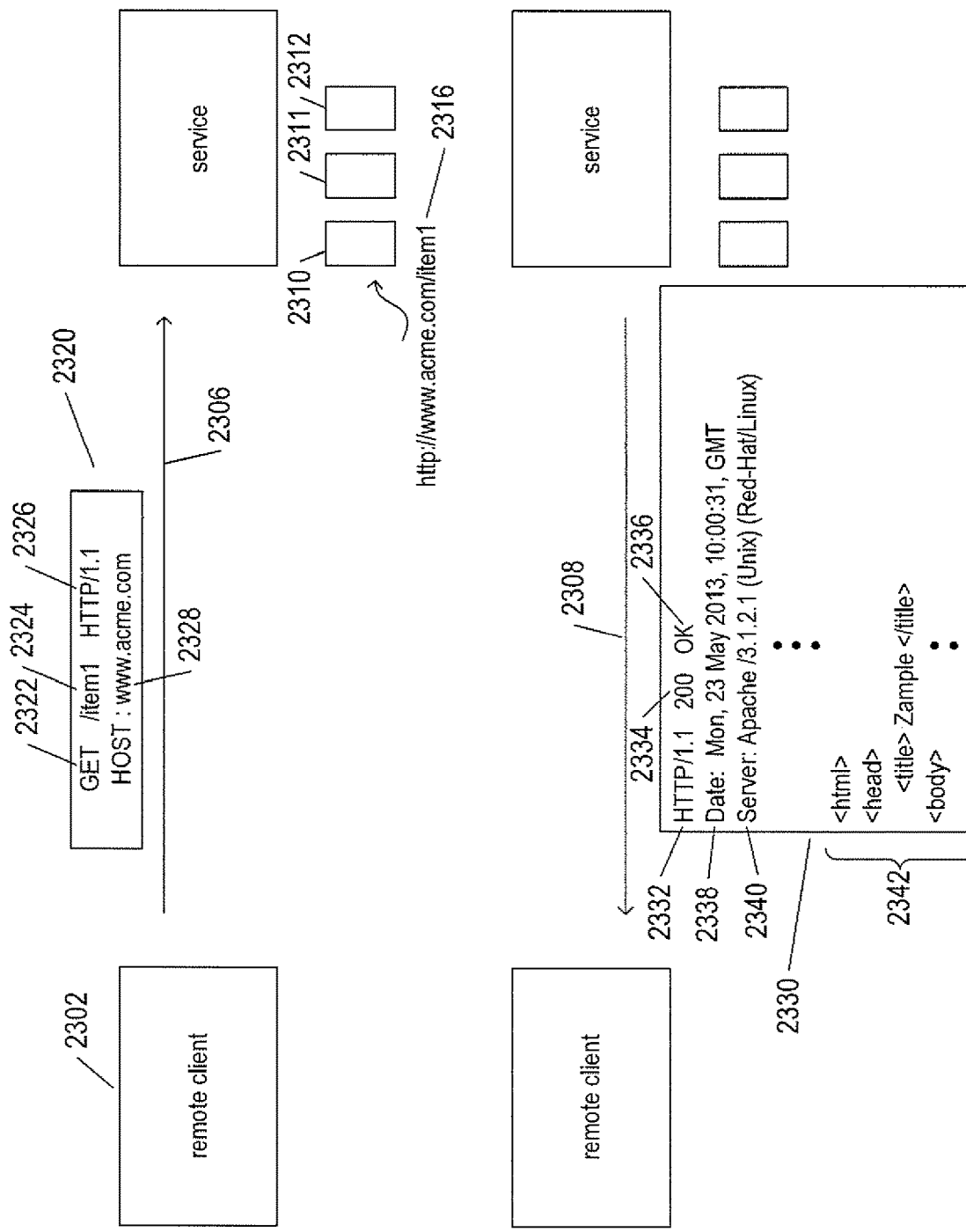
FIGS. 23A-D illustrate four basic verbs, or operations, provided by the HTTP application-layer protocol used in RESTful applications.

FIG. 23A illustrates the GET request and a typical response. The GET request requests the representation of a resource identified by a URI from a service. In the example shown in FIG. 23A, the resource 2310 is uniquely identified by the URI "http://www.acme.com/item1"2316. The initial substring "http://www.acme.com" is a domain name that identifies the service. Thus, URI 2316 can be thought of as specifying the resource "item1" that is located within and managed by the domain "www.acme.com." The GET request 2320 includes the command "GET" 2322, a relative resource identifier 2324 that, when appended to the domain name, generates the URI that uniquely identifies the resource, and in an indication of the particular underlying application-layer protocol 2326. A request message may include one or more headers, or key/value pairs, such as the host header 2328 "Host:www.acme.com" that indicates the domain to which the request is directed. There are many different headers that may be included. In addition, a request message may also include a request-message body. The body may be encoded in any of various different self-describing encoding languages, often JSON, XML, or HTML. In the current example, there is no request-message body. The service receives the request message containing the GET command, processes the message, and returns a corresponding response message 2330. The response message includes an indication of the application-layer protocol 2332, a numeric status 2334, a textual status 2336, various headers 2338 and 2340, and, in the current example, a body 2342 that includes the HTML encoding of a web page. Again, however, the body may contain any of many different types of information, such as a JSON object that encodes a personnel file, customer description, or order description. GET is the most fundamental and generally most often used verb, or function, of the HTTP protocol.

Figure 23B:
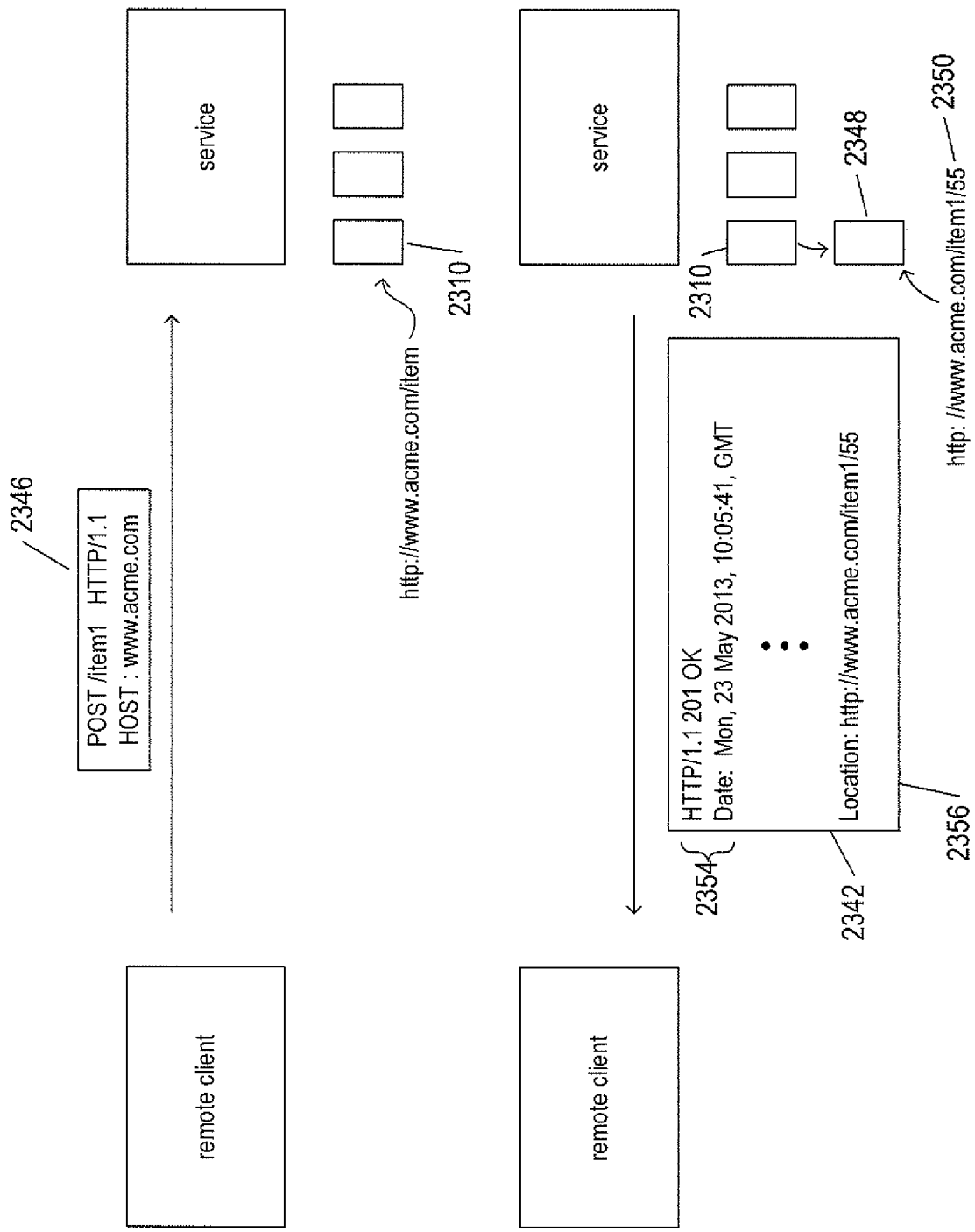

FIG. 23B illustrates the POST HTTP verb. In FIG. 23B, the client sends a POST request 2346 to the service that is associated with the URI "http://www.acme.com/item1." In many RESTful APIs, a POST request message requests that the service create a new resource subordinate to the URI associated with the POST request and provide a name and corresponding URI for the newly created resource. Thus, as shown in FIG. 238, the service creates a new resource 2348 subordinate to resource 2310 specified by URI "http://www.acme.com/item1," and assigns an identifier "36" to this new resource, creating for the new resource the unique URI "http://www.acme.com/item1/36" 2350. The service then transmits a response message 2352 corresponding to the POST request back to the remote client. In addition to the application-layer protocol, status, and headers 2354, the response message includes a location header 2356 with the URI of the newly created resource. According to the HTTP protocol, the POST verb may also be used to update existing resources by including a body with update information. However. RESTful APIs generally use POST for creation of new resources when the names for the new resources are determined by the service. The POST request 2346 may include a body containing a representation or partial representation of the resource that may be incorporated into stored information for the resource by the service.

Figure 23C:
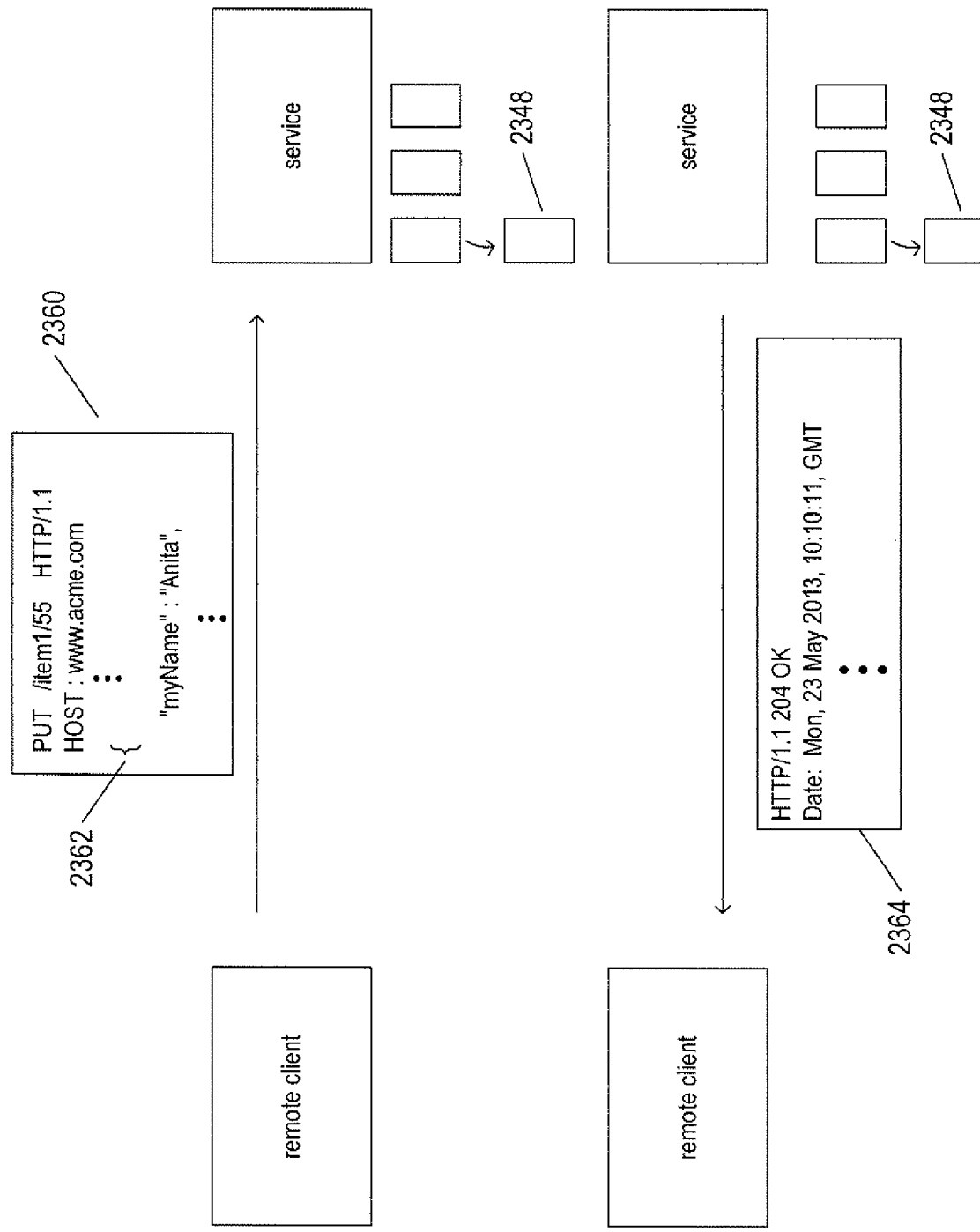

FIG. 23C illustrates the PUT HTTP verb. In RESTful APIs, the PUT HTTP verb is generally used for updating existing resources or for creating new resources when the name for the new resources is determined by the client, rather than the service. In the example shown in FIG. 23C, the remote client issues a PUT HTTP request 2360 with respect to the URI "http://www.acme.com/item1/36" that names the newly created resource 2348. The PUT request message includes a body with a JSON encoding of a representation or partial representation of the resource 2362. In response to receiving this request, the service updates resource 2348 to include the information 2362 transmitted in the PUT request and then returns a response corresponding to the PUT request 2364 to the remote client.

Figure 23D:
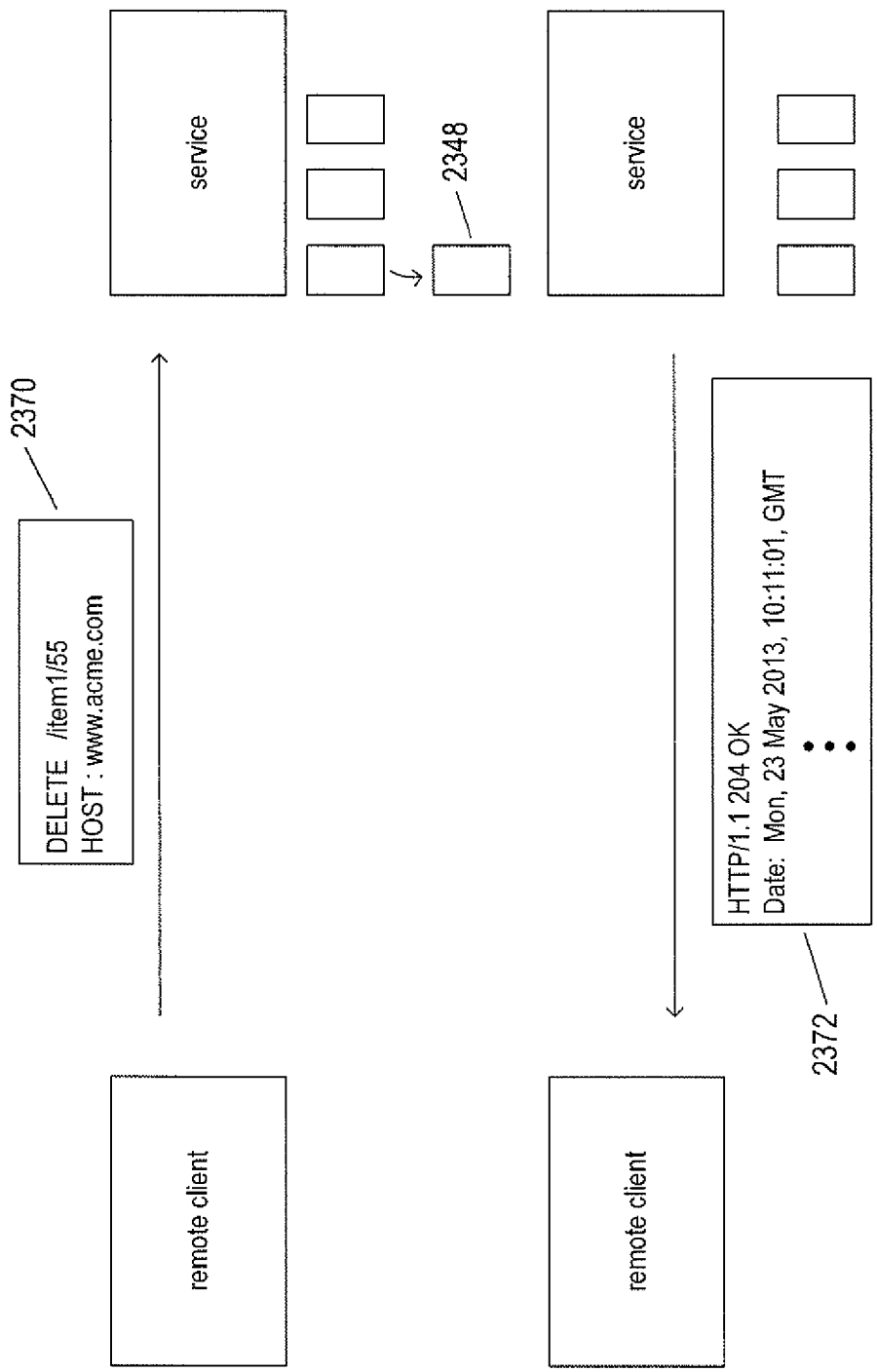

FIG. 23D illustrates the DELETE HTTP verb. In the example shown in FIG. 23D, the remote client transmits a DELETE HTTP request 2370 with respect to URI "http://www.acme.com/item1/36" that uniquely specifies newly created resource 2348 to the service. In response, the service deletes the resource associated with the URL and returns a response message 2372.

As further discussed below, and as mentioned above, a service may return, in response messages, various different links, or URIs, in addition to a resource representation. These links may indicate, to the client, additional resources related in various different ways to the resource specified by the URI associated with the corresponding request message. As one example, when the information returned to a client in response to a request is too large for a single HTTP response message, it may be divided into pages, with the first page returned along with additional links, or URIs, that allow the client to retrieve the remaining pages using additional GET requests. As another example, in response to an initial GET request for the customer info resource (2210 in FIG. 22), the service may provide URIs 2220 and 2236 in addition to a requested representation to the client, using which the client may begin to traverse the hierarchical resource organization in subsequent GET requests.

Figure 24:
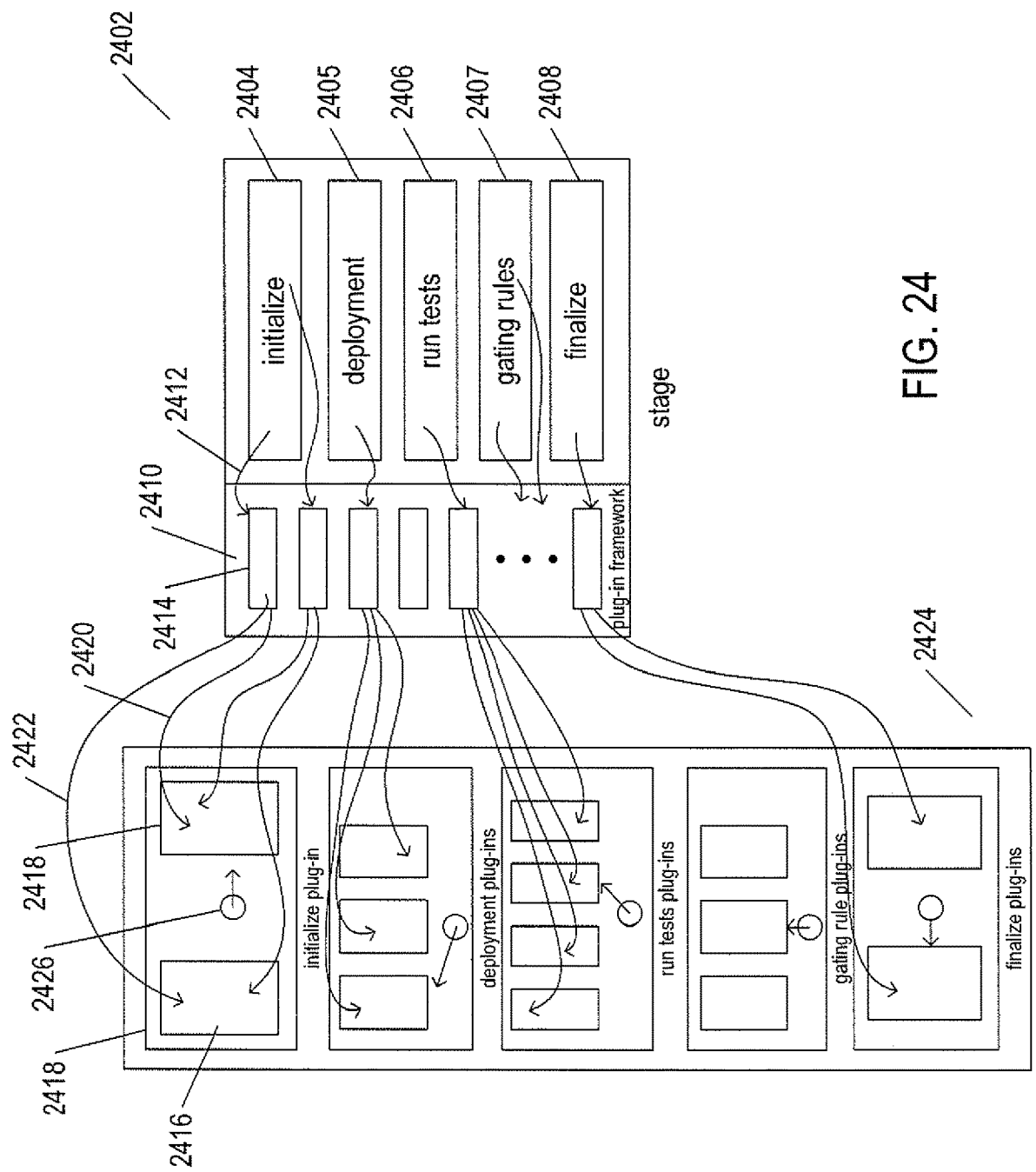
FIG. 24 illustrates additional details with respect to particular type of application-release-management-pipeline stage that is used in pipelines executed by a particular class of implementations of the automated application-release-management subsystem.

FIG. 24 illustrates additional details with respect to particular type of application-release-management-pipeline stage that is used in pipelines executed by a particular class of implementations of the automated application-release-management subsystem. The application-release-management-pipeline stage 2402 shown in FIG. 24 includes the initialize 2404, deployment 2405, run tests 2406, gating rules 2407, and finalize 2408 tasks discussed above with respect to the application-release-management-pipeline stage shown in inset 1916 of FIG. 19. In addition, the application-release-management-pipeline stage 2402 includes a plug-in framework 2410 that represents one component of a highly modularized implementation of an automated application-release-management subsystem.

The various tasks 2407-2408 in the pipeline stage 2402 are specified as workflows that are executed by a work-flow execution engine, as discussed above with reference to FIGS. 18-20B. These tasks include REST entrypoints which represent positions within the workflows at each of which the workflow execution engine makes a callback to the automated application-release-management subsystem. The callbacks are mapped to function and routine calls represented by entries in the plug-in framework 2410. For example, the initialized task 2404 includes a REST entrypoint that is mapped, as indicated by curved arrow 2412, to entry 2414 in the plug-in framework, which represents a particular function or routine that is implemented by one or more external modules or subsystems interconnected with the automated application-release-management subsystem via plug-in technology. These plug-in-framework entries, such as entry 2414, are mapped to corresponding routine and function calls supported by each of one or more plugged-in modules or subsystems. In the example shown in FIG. 24, entry 2414 within the plug-in framework that represents a particular function or routine called within the initialized task is mapped to a corresponding routine or function in each of two plugged-in modules or subsystems 2416 and 2418 within a set of plugged-in modules or subsystems 2418 that support REST entrypoints in the initialized task, as represented in FIG. 24 by curved arrows 2420 and 2422. During pipeline execution, callbacks to REST entrypoints in tasks within application-release-management pipelines are processed by calling the external routines and functions to which the REST entrypoints are mapped.

Each stage in an application-release-management pipeline includes a stage-specific plug-in framework, such as the plug-in framework 2410 for stage 2402. The automated application-release-management subsystem within which the stages and pipelines are created and executed is associated with a set of sets of plugged-in modules and subsystems, such as the set of sets of plugged-in modules and subsystems 2424 shown in FIG. 24. A cloud-computing facility administrator or manager, when installing a workflow-based cloud-management system that incorporates the automated application-release-management subsystem or reconfiguring the workflow-based cloud-management system may, during the installation or reconfiguration process, choose which of the various plugged-in modules and subsystems should be used for executing application-release-management pipelines. Thus, the small selection features, such as selection feature 2426 shown within the set of sets of plugged-in modules and subsystems 2424, indicates that, in many cases, one of the multiple different plugged-in modules or subsystems may be selected for executing application-release-management-pipeline tasks. This architecture enables a cloud-computing-facility administrator or manager to select particular external modules to carry out tasks within pipeline stages and to easily change out, and substitute for, particular plugged-in modules and subsystems without reinstalling the workflow-based cloud-management system or the automated application-release-management subsystem. Furthermore, the automated application-release-management subsystem is implemented to interface to both any currently available external modules and subsystems as well as to external modules and subsystems that may become available at future points in time.

Figure 25:
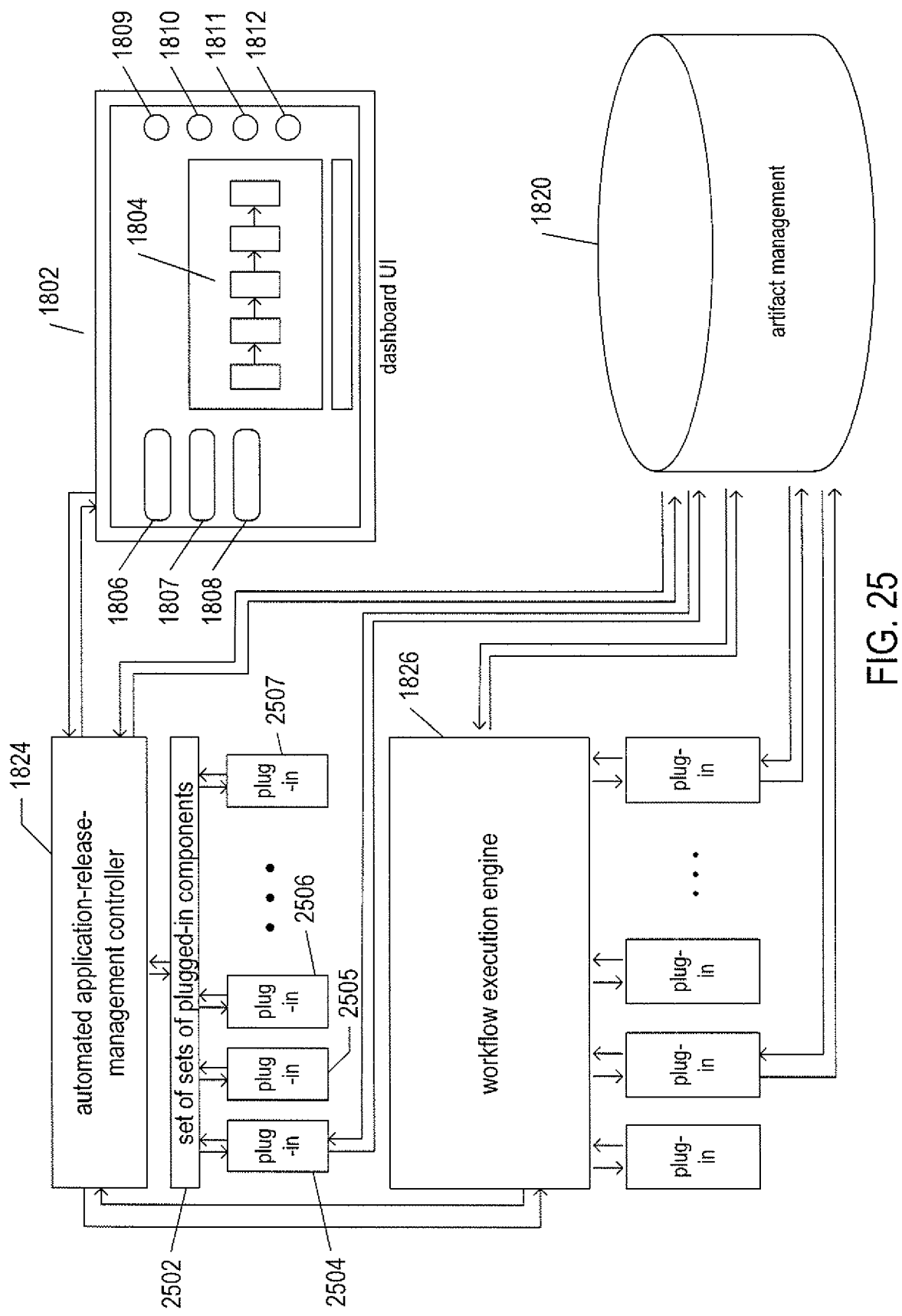
FIG. 25 illustrates a highly modularized automated application-release-management subsystem using illustration conventions similar to those used in FIG. 18.

FIG. 25 illustrates a highly modularized automated application-release-management subsystem using illustration conventions similar to those used in FIG. 18. The components previously shown in FIG. 18 are labeled with the same numeric labels in FIG. 25 as in FIG. 18. As shown in FIG. 25, the automated application-release-management controller 1824 includes or interfaces to the set of sets of plugged-in modules and subsystems 2502, discussed above as set of sets 2424 in FIG. 24. This set of sets of plugged-in modules and subsystems provides a flexible interface between the automated application-release-management controller 1824 and the various plugged-in modules and subsystems 2504-2507 that provide implementations of a variety of the REST entrypoints included in task workflows within pipeline stages. The highly modularized automated application-release-management subsystem thus provides significantly greater flexibility with respect to external modules and subsystems that can be plugged in to the automated application-release-management subsystem in order to implement automated application-release-management-subsystem functionality.

Figure 26A:
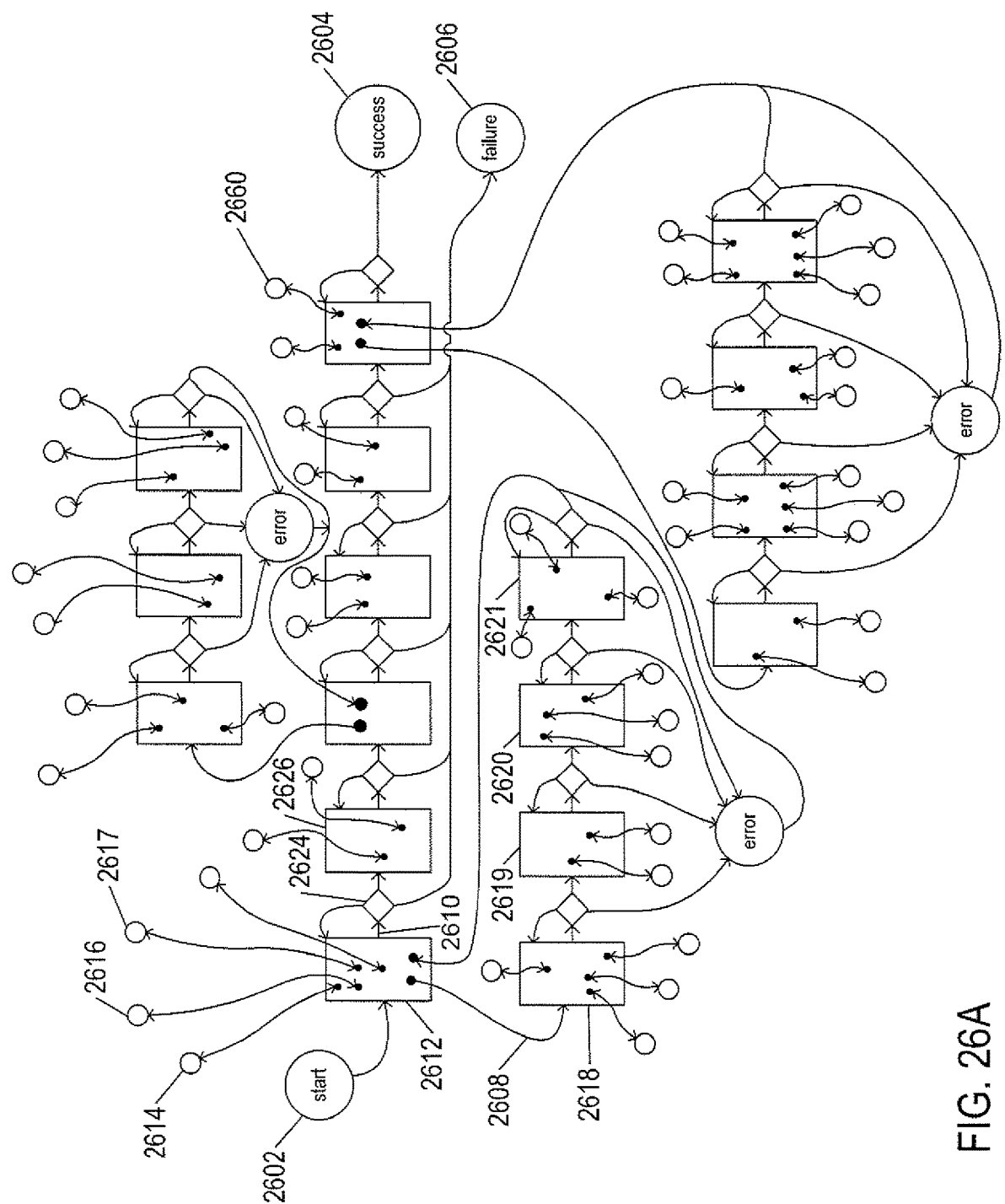
FIGS. 26A-B illustrates execution paths of a release pipeline.
Figure 26B:
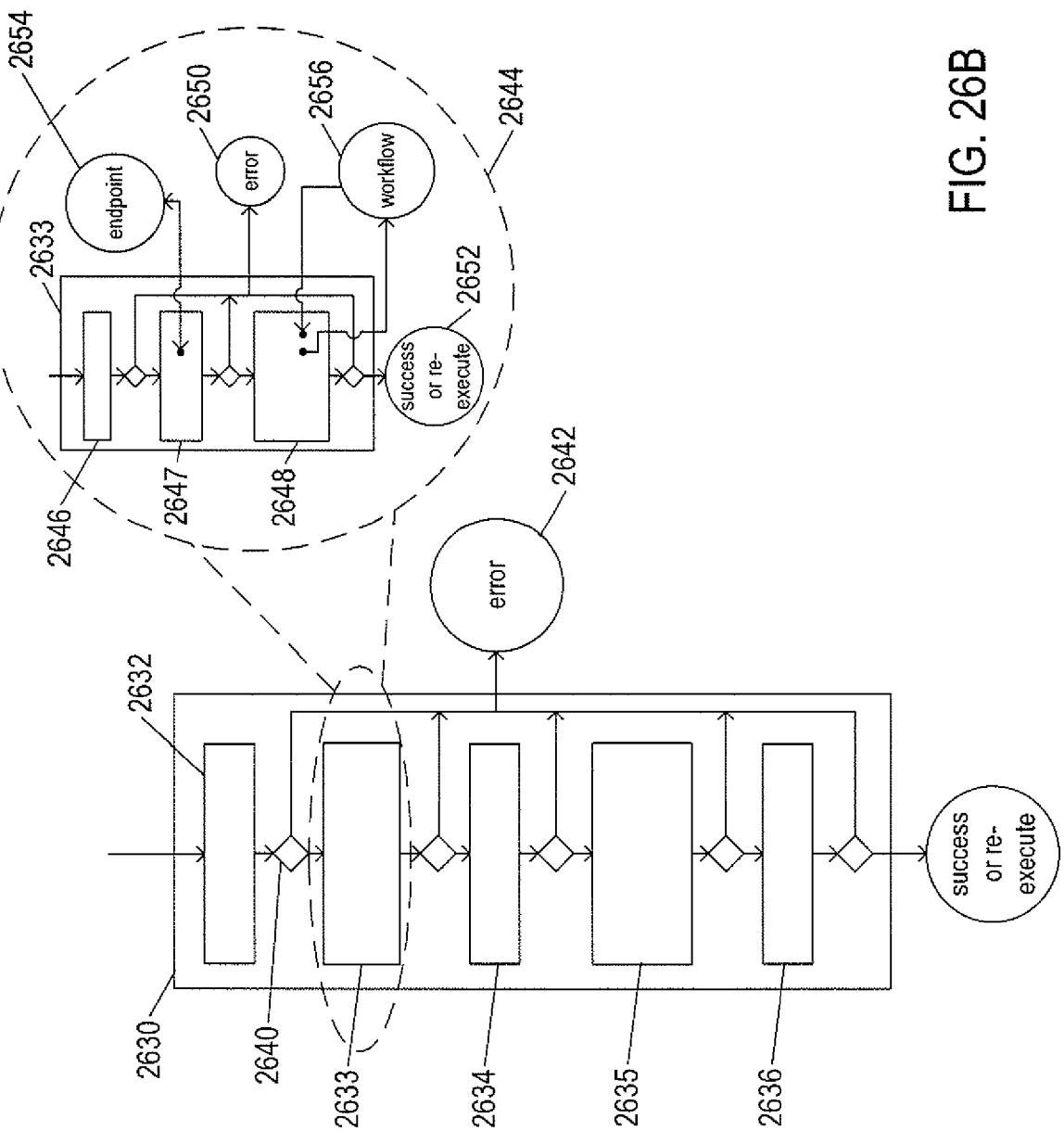

Currently Disclosed Methods and Systems that Verify Endpoint Reachability Prior to Release-Pipeline Execution FIGS. 26A-B illustrates execution paths of a release pipeline. Execution begins with disk 2602 labeled "start." Execution terminates either successfully, represented in FIG. 26A by the disk 2604, labeled "success," or unsuccessfully, represented in FIG. 26A by the disk 2606, labeled "failure." The execution paths are shown in FIG. 26A by curved arrows, such as curved arrow 2608 as well as by straight arrows, including straight arrow 2610. Execution of a release pipeline begins with a first stage 2612 of a main release pipeline. Execution of a first task within the first stage results in a call to an endpoint 2614. Execution of a second task within the first stage results in calls to two additional endpoints 2616-2617. Execution of a final task within the first stage results in execution of a second release pipeline comprising stages 2618-2621. When execution of the second pipeline finishes, the first task within the first stage 2612 of the main pipeline completes, and execution flows to the conditional step 2624 from which execution either returns to the first stage 2612 of the main pipeline, when execution of one or more tasks within the first stage need to be repeated, proceeds to the next stage 2626 of the main pipeline, when the first stage has successfully completed, or results in an unsuccessful early termination of the main release pipeline 2606, when an unrecoverable error, such as a failure to successfully call an endpoint entrypoint, has occurred.

FIG. 26B illustrates additional execution-Path detail within a stage of a release pipeline. In FIG. 26B, a release-pipeline stage 2630 is shown to contain multiple tasks 2632-2636. Conditional steps, such as conditional step 2640, follow execution of each task. When an error occurs during execution of a task, the following conditional results in return of an error indication, represented in FIG. 26B as disk 2642. Otherwise, execution proceeds to the next task or to a conditional step separating stage 2630 from a following stage or from successful release-pipeline termination. Inset 2644 shows additional details with regard to execution paths within task 2633. The task can be viewed as a sequence of execution blocks 2646-2648. An execution block can either generate an error, in which case task execution prematurely terminates 2650, or can succeed, in which case execution proceeds to a next execution block or, in the case of the final execution block, terminates with an indication of success or an indication of the need to re-execute that task or the stage containing the task 2652. An execution block may prematurely terminate with an error condition when, for example, the execution block calls an endpoint entrypoint, but the endpoint cannot be reached due to network problems, system overload, failure of the server or servers that implement the endpoint, and/or other problems. An execution block may prematurely terminate with an error condition when a different workflow launched within the execution block fails or when a non-endpoint external task is invoked, but the invocation fails, for a variety of reasons. Thus, for example, execution block 2647 may prematurely terminate with error indication should the call to entrypoints of endpoints 2654 fail and execution block 2648 may prematurely terminate with an error indication when an attempt to execute a different workflow 2656 fails or the workflow prematurely terminates with an error condition.

Returning to FIG. 26A, with the release pipeline illustrated in FIG. 26A may fail at many different locations, including at calls to entrypoints of any of the many endpoints represented by small disks, such as small disk 2614, at attempts to execute of external tasks, and during execution of various ancillary workflows called from the main release pipeline. Failure of the execution of the release pipeline due to a failure in a call to an entrypoint of an endpoint 2614 may be annoying and may deleteriously impact the application-release process, but can generally be ameliorated without severe consequences. However, were the release pipeline to fail due to failure of a late-stage call to an entrypoint of endpoint 2660, the consequences can be significant to severe. At this point in release-pipeline execution, large amounts of computational resources have been expended. Moreover, many asynchronously executing processes and tasks invoked by the release pipeline may end up in unrecoverable states, as a result of which complex processes may need to be deployed to clean up stranded processes and tasks and to deallocate computational resources that, due to premature termination of the release pipeline, failed to be deallocated by normal release-pipeline-completion clean-up tasks. Testing stages in a release pipeline may execute for many hours, days, and even longer periods of time. The expenditures in time, power, and consumed computational resources during these long periods of time can be completely lost, without providing utility or benefit, in the case that a late-stage call to an endpoint entrypoint fails.

The current document is directed to an automated-application-release-management system that verifies the reachability and responsiveness of endpoints and external task-execution resources invoked by a release pipeline prior to initiating execution of the release pipeline. By verifying reachability and responsiveness of endpoints and external task-execution resources prior to release-pipeline execution, the losses and wastage associated with late-stage and even mid-stage endpoint failures are largely prevented. Although verification of the reachability and responsiveness of endpoints and external task-execution resources does not provide an absolute guarantee that a release pipeline will successfully terminate, since network failures and remote-system failures may occur at any time, pre-execution verification forestalls many endpoint and external-task failures that lead to premature release-pipeline termination. The currently disclosed methods and subsystems provide for both manual and automatic reachability-and-responsiveness verification. When endpoint checking is periodically automatically initiated, the currently disclosed methods and subsystems attempt to schedule endpoint checking during periods in which the workflow-execution-engine component of the automated-release-pipeline-management system is idle in order to avoid negatively impacting release-pipeline execution.

Figure 27A:
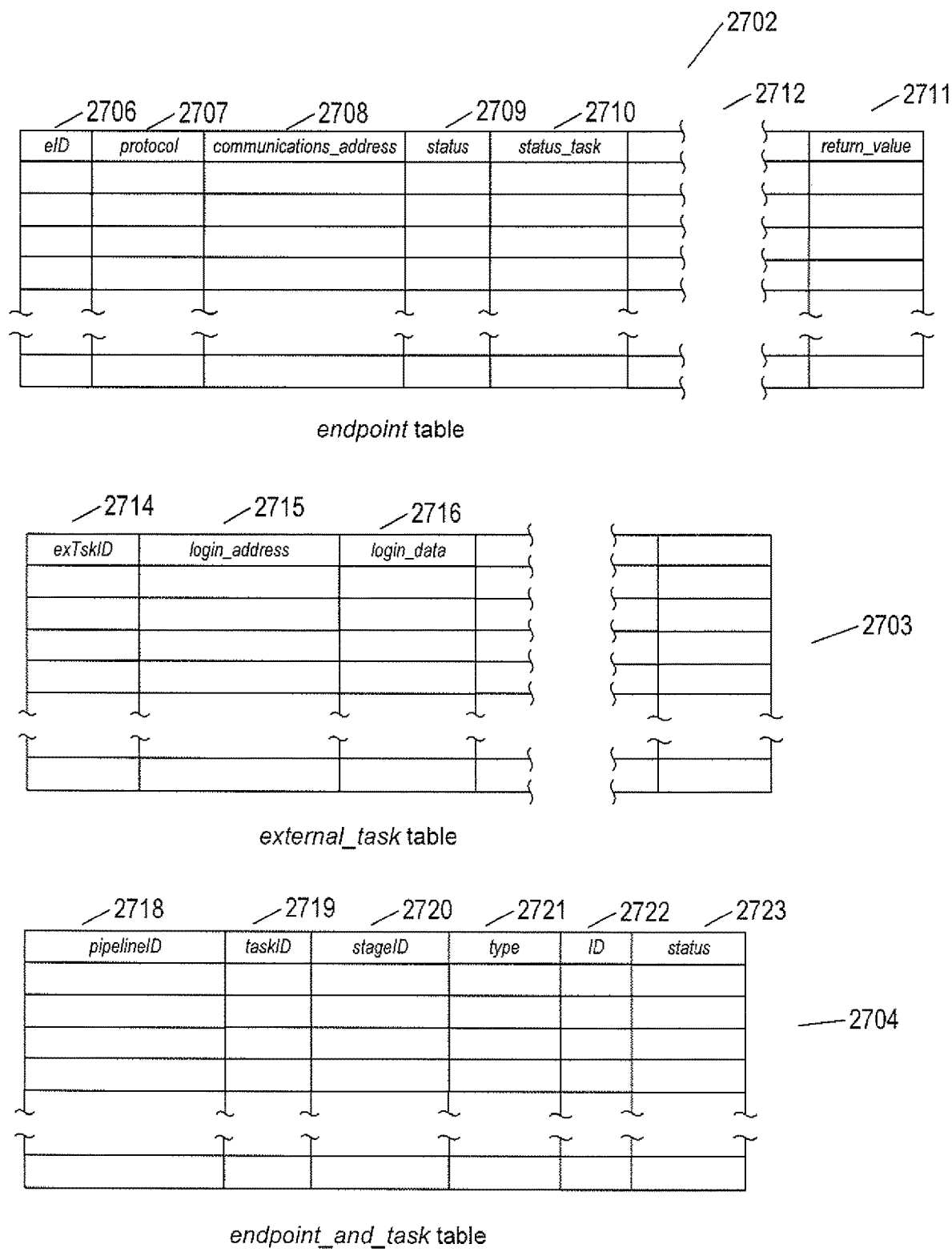
FIGS. 27A-C illustrate data structures used by one implementation of the currently disclosed endpoint-checking methods and subsystems within an automated-application-release-management system.
Figure 27B:
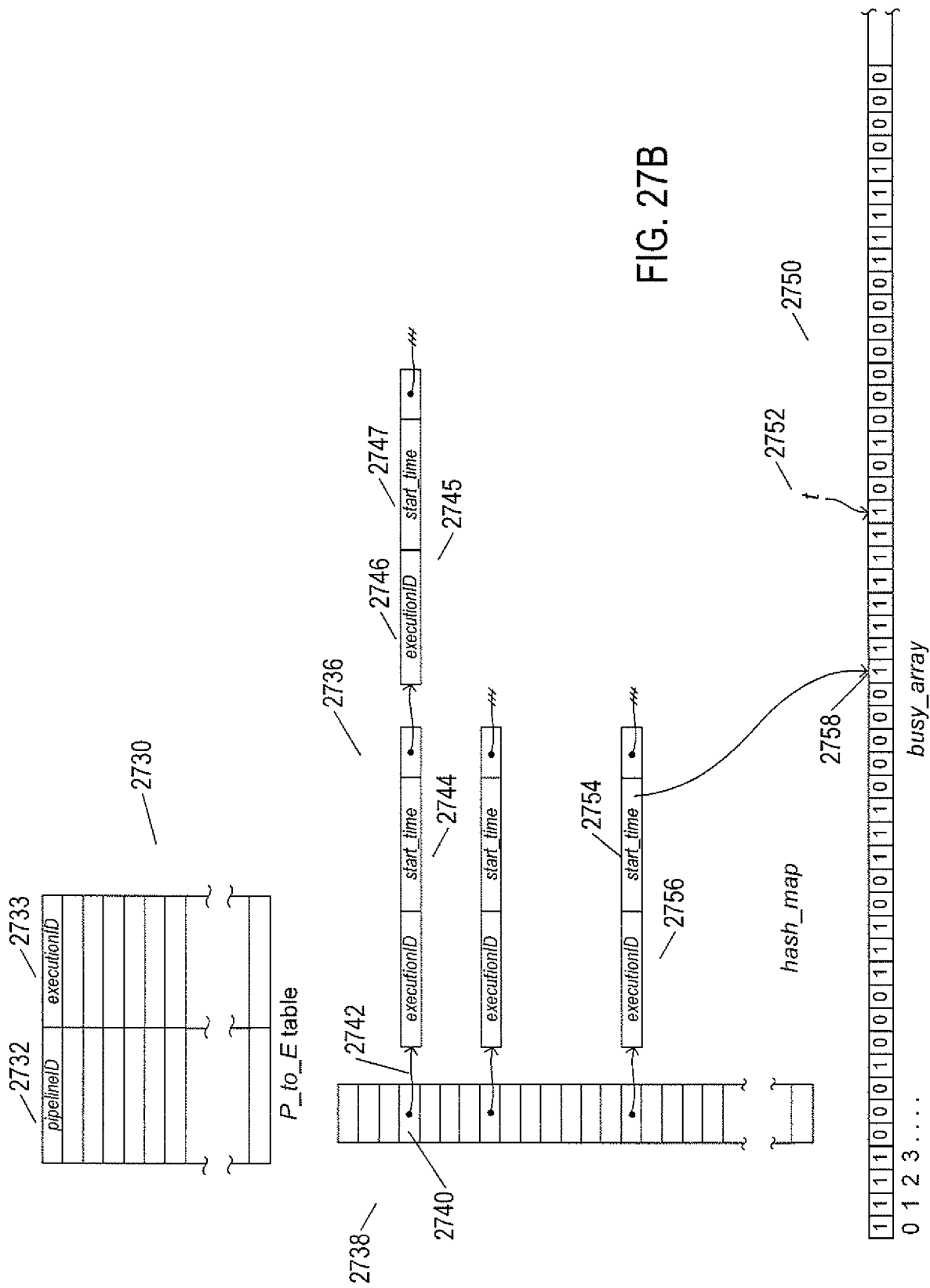
Figure 27C:
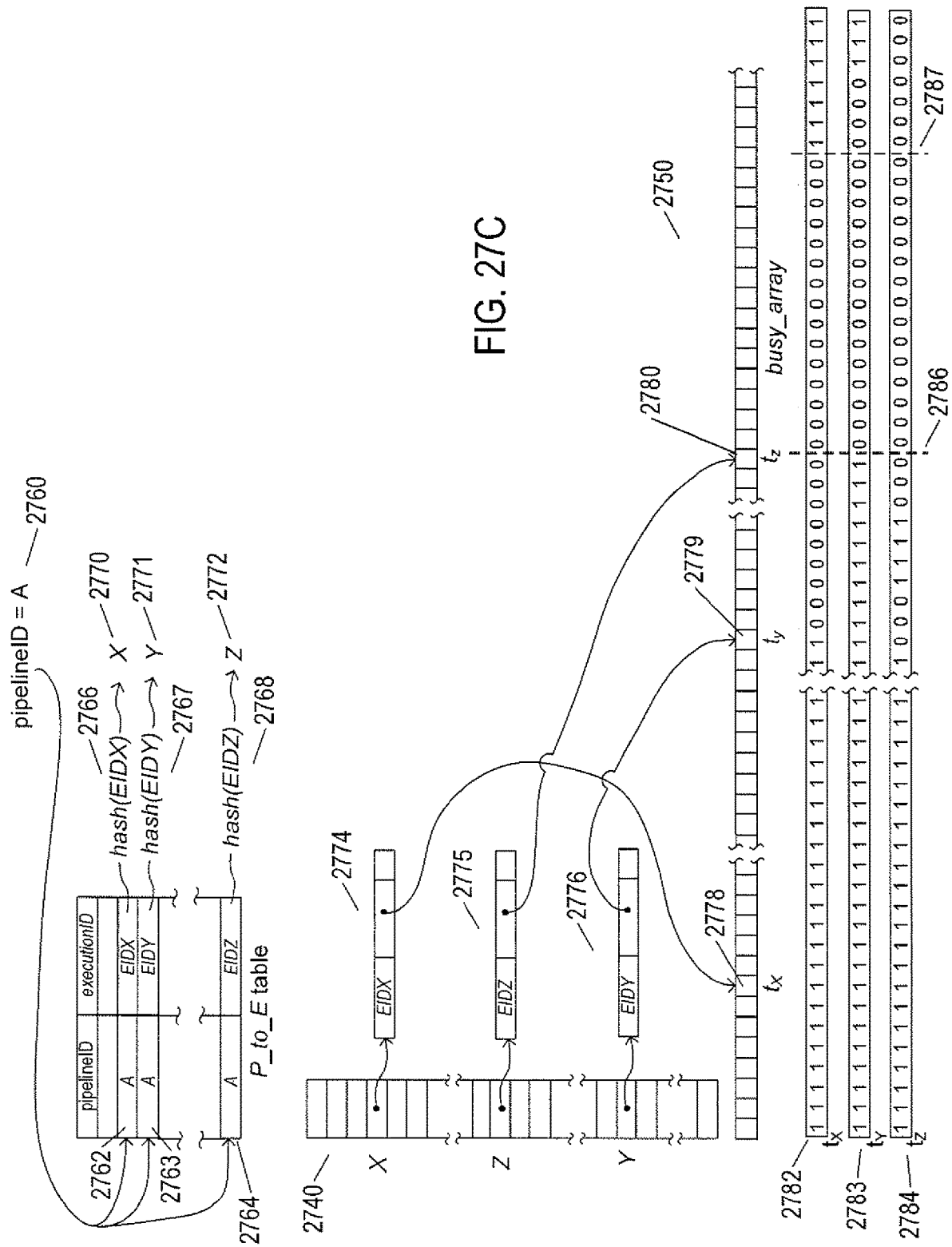

FIGS. 27A-C illustrate data structures used by one implementation of the currently disclosed endpoint-checking methods and subsystems within an automated-application-release-management system, FIG. 27A shows three table data structures 2702-2704 that may be implemented, in certain implementations, as relational-database tables. In other implementations, these tables may be implemented by in-memory lists or arrays that are backed by formatted files or in many other ways.

The endpoint table 2702 stores information that allows the endpoint-checking methods and subsystems to attempt to access endpoints for reachability-and-responsiveness verification. Each row in the endpoint table represents a different endpoint. The columns of the endpoint table 2706-2711 represent fields for which each row contains values. In the example endpoint table 2702 shown in FIG. 27A, the columns include: (1) eID 2706, an identifier for an endpoint; (2) protocol 2707, the type of communications protocol used to access the endpoint; (3) communications_address 2708, a communications address, such as a URL or IP address, used to access the endpoint: (4) status 2709, an indication of a status entrypoint that can be accessed through the endpoint to obtain status information regarding the endpoint; (5) status_task 2710, information that can be used to generate a stub task, or a reference to an already generated stub task, that accesses the endpoint when no status entrypoint is available; and (6) return_value 2711, the type of value returned by the status entrypoint. The broken field 2712 shown within the endpoint table in FIG. 27A indicates that additional fields may be included in the endpoint table.

The external_task table 2703 stores similar information for non-endpoint external tasks similar to the information stored in the endpoint table for endpoints. The external_task table 2703 includes columns: (1) exTskID 2714, an identifier for an external task; (2) login_address 2715, information that can be used to login into a remote system that executes the external task; and (3) login_data 2716, data that can be supplied to a login prompt in order to log into the system that executes the external task. The endpoint-checking methods and subsystems disclosed in the current document attempt to login to the system supporting the external task in order to verify the reachability and responsiveness of the external task.

Each row of the endpoint_and_task table represents a task within a release pipeline. The endpoint_and_task table 2704 includes information about the endpoints and external tasks invoked by each task in each stage of a pipeline as well as, in one embodiment, status information regarding the reachability and responsiveness of the endpoints and external tasks. The columns shown in FIG. 27A within the endpoint_and_task table include: (1) pipelineID 2718, an identifier for a release pipeline; (2) taskID 2719, an identifier for task within the release pipeline; (3) stageID 2720, an identifier for a stage within a release pipeline; (4) type 2721, an indication of whether a row of the endpoint_and_task table represents an endpoint or an external task; (5) ID 2722, an endpoint identifier or an external_task identifier, depending on the value of the type field; and (6) status, an indication of the reachability and responsiveness of the endpoint.

FIG. 27B illustrates an additional table data structure as well as a hash_map data structure and a busy_array data structure used in a disclosed implementation of the methods and subsystems that check endpoints prior to execution of release pipelines. The P_to_E table 2730 maps execution identifiers to pipeline identifiers. Execution identifiers are created by the workflow-execution-engine component of an automated-application-release-management system when the workflow-execution-engine component begins to execute a workflow, such as a release pipeline. The P_to_E table includes two columns: (1) pipelineID 2732, the identifier for a release pipeline; and (2) executionID 2733, an execution identifier generated by the workflow-execution-engine component for a particular execution of a release pipeline. The P_to_E table may include many rows with the same value for the pipelineID field but with different values in the executionID field. This is because the workflow-execution-engine component generates a new execution identifier each time a release pipeline is executed.

The hash_map data structure 2736 includes a pointer array 2738, each element of which contains either a null pointer or a pointer to a linked list of hash_map entries. For example, element 2740 of the pointer array 2738 contains a pointer 2742 that points to a linked list containing two hash_map entries 2744-2745. Each hash_map entry includes an executionID field 2746 and a start_time field 2747. The busy_array data structure 2750 is a bit array, each element of which indicates whether or not the workflow-execution-engine component was executing a pipeline during a short period of time represented by the element. For example, the currently-executing status of the workflow-execution-engine component may be sampled every 5 seconds, in which case each bit element of the busy_array represents a time period of 5 seconds. A 1 bit indicates that the workflow-execution-engine was executing a pipeline when sampled during the time period represented by the busy_array element containing the 1 bit and a 0 bit indicates that the workflow-execution-engine component was not executing a pipeline when sampled during the time period represented by the busy_array element containing the 0 bit. The busy_array data structure is, in the disclosed embodiment, treated as a circular buffer. When the last element in the busy_array data structure is written, the next data value is written to the first element in the busy_array data structure, with successive next data values written to successive next elements following the first element in the busy_array data structure. Thus, once the busy_array data structure is initially filled with data, the busy_array data structure is continuously overwritten as more data is received. The value in each start_time field of a hash_map entry represents a starting point in time for an execution of a pipeline identified by the execution-identifier value in the hash_map entry and indirectly references a particular element of the busy_array data structure when the value in the start_time field represents a time within a time window preceding the current system time that is equal, in duration, to the time represented by the entire busy_array data structure. For example, if the busy_array data structure contains 1,209,600 elements, the busy_array data structure represents a time period of two weeks. The busy_array data structure is associated with a pointer t 2750 that points to the next element of the busy_array data structure into which a next data value will be entered at the next monitoring time point. The value stored in the start_time field 2754 of the hash_map entry 2756 stores a time value for a time 35 seconds prior to the current time and thus indirectly references element 2758 in the busy_array data structure.

FIG. 27C illustrates how the data stored in the data structures discussed above with reference to FIG. 27B is used to identify an idle interval preceding execution of a particular release pipeline. The currently disclosed methods and subsystems attempt to schedule automatic endpoint checks within such idle intervals. A pipeline identifier with the value A 2760 is furnished to indicate the pipeline for which an idle interval is desired. This pipeline identifier is used to identify all rows in the P_to_E table 2762-2764 containing execution identifiers generated for different executions of the release pipeline identified by the furnished pipeline identifier. The identified execution identifiers are each hashed by a hash function 2766-2768 to generate pointer-array indices 2770-2772 corresponding to the execution identifiers. These indices are used to index the pointer array 2740 in order to find the hash_map entries 2774-2776 corresponding to the various different executions of the pipeline identified by the supplied pipeline identifier. The hash_map entries contain starting times that represent the first elements in a series of segments of the busy_array data structure representing successive executions of the pipeline identified by the pipeline identifier. In the example shown in FIG. 27C, there are three hash_map entries 2774-2776 representing three different executions of the release pipeline. One execution begins at the point in time represented by the busy_array element tX 2778, a second execution begins at the point in time represented by the busy_array element tY 2779, and a third execution begins at the time point represented by busy_array element tZ 2780. These three segments of the busy_array data structure 2782-2784 can be computationally aligned with one another, as shown in the lower portion of FIG. 27C, so that an element representing a point in time following the beginning of execution of the pipeline, in segment 2782, is vertically aligned with elements representing the same point in time of the remaining segments. An interval within the aligned segments for which all the elements have the bit value 0, such as the interval starting with vertical dashed line 2786 and ending with vertical dashed line 2787, represents a time interval, or time period, during which the workflow-execution-engine component was idle. When a particular release pipeline executes at relatively regular intervals, idle sub intervals can be used to select a time for scheduling and point checking for the release pipeline. By carrying out the endpoint-checking process during idle intervals, the computational overheads associated with endpoint checking do not interfere with release-pipeline execution.

The method for identifying idle intervals in which to schedule endpoint checking, illustrated in FIG. 27C, is but one of many different possible idle-interval-identifying methods. Sophisticated machine-learning methods may alternatively be employed, as one example. The currently disclosed method has the advantage of using the most recent workflow-execution-engine-monitoring data to identify idle intervals so that, as the execution frequency and execution duration of a release pipeline varies over time, the idle-interval-identifying method responds to changes in pipeline-execution frequency and pipeline-execution duration.

Figure 28A:
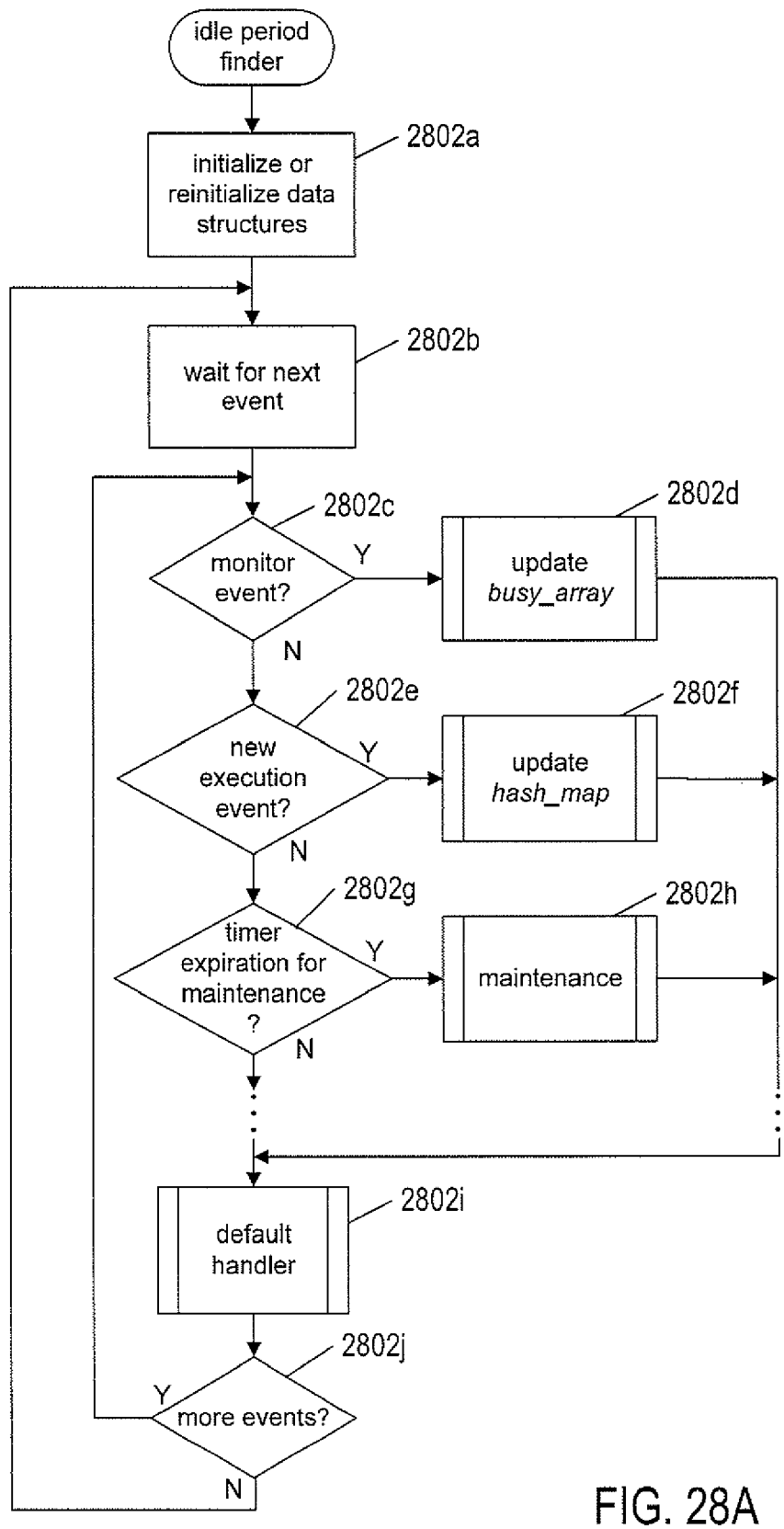
FIGS. 28A-O provide control-flow diagrams that describe one possible implementation of the endpoint-checking methods and subsystems within an automated-application-release-management system to which the current document is directed.
Figure 28B:
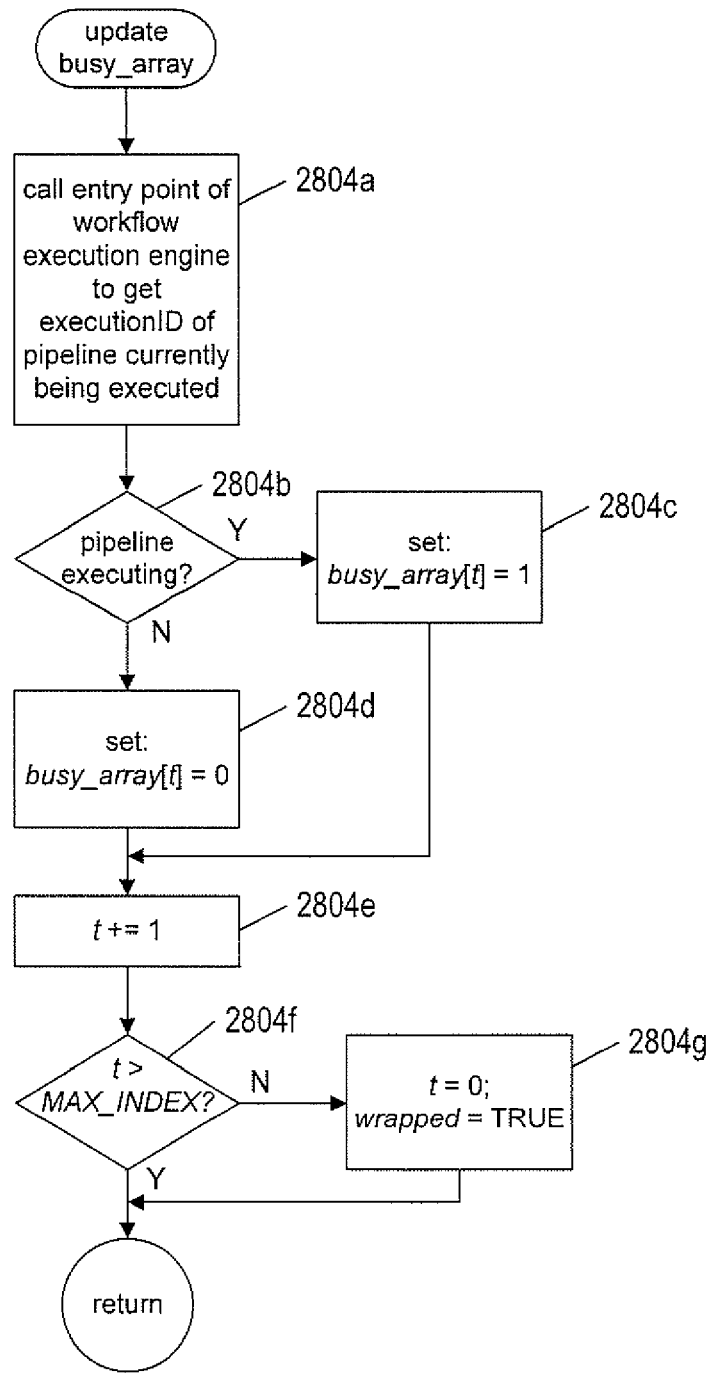
Figure 28C:
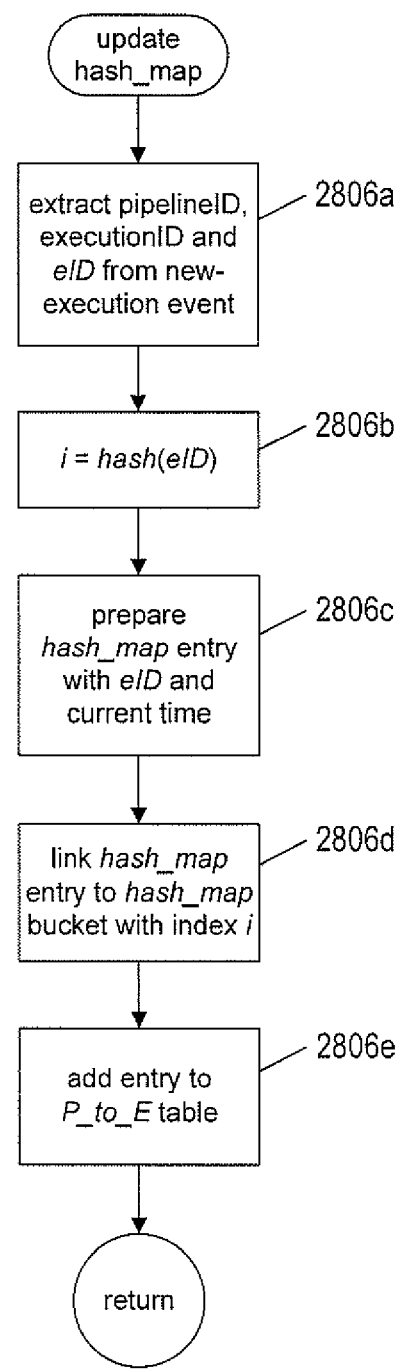
Figure 28D:
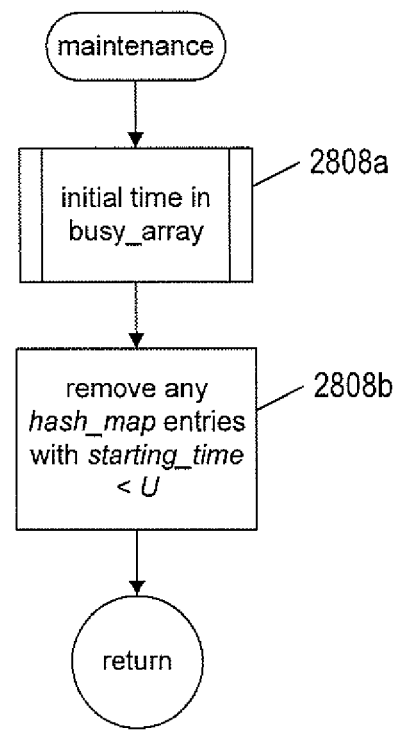
Figure 28E:
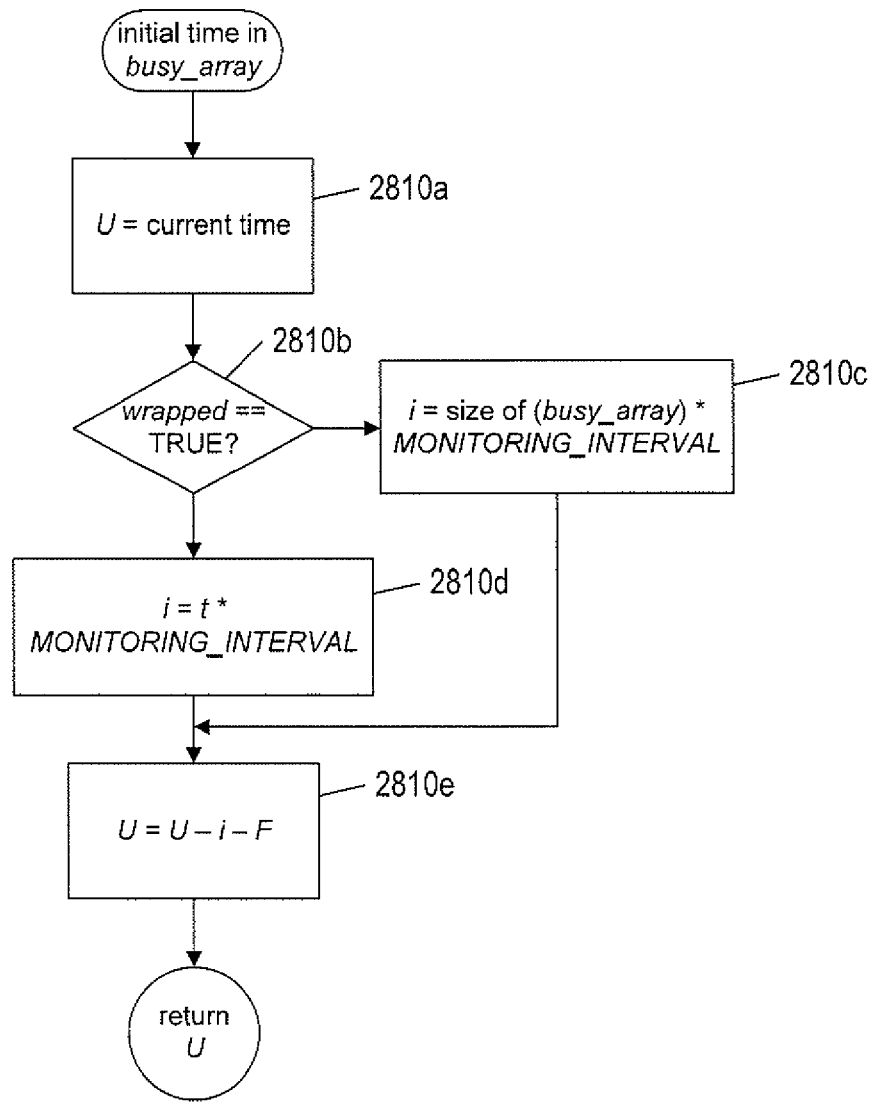
Figure 28F:
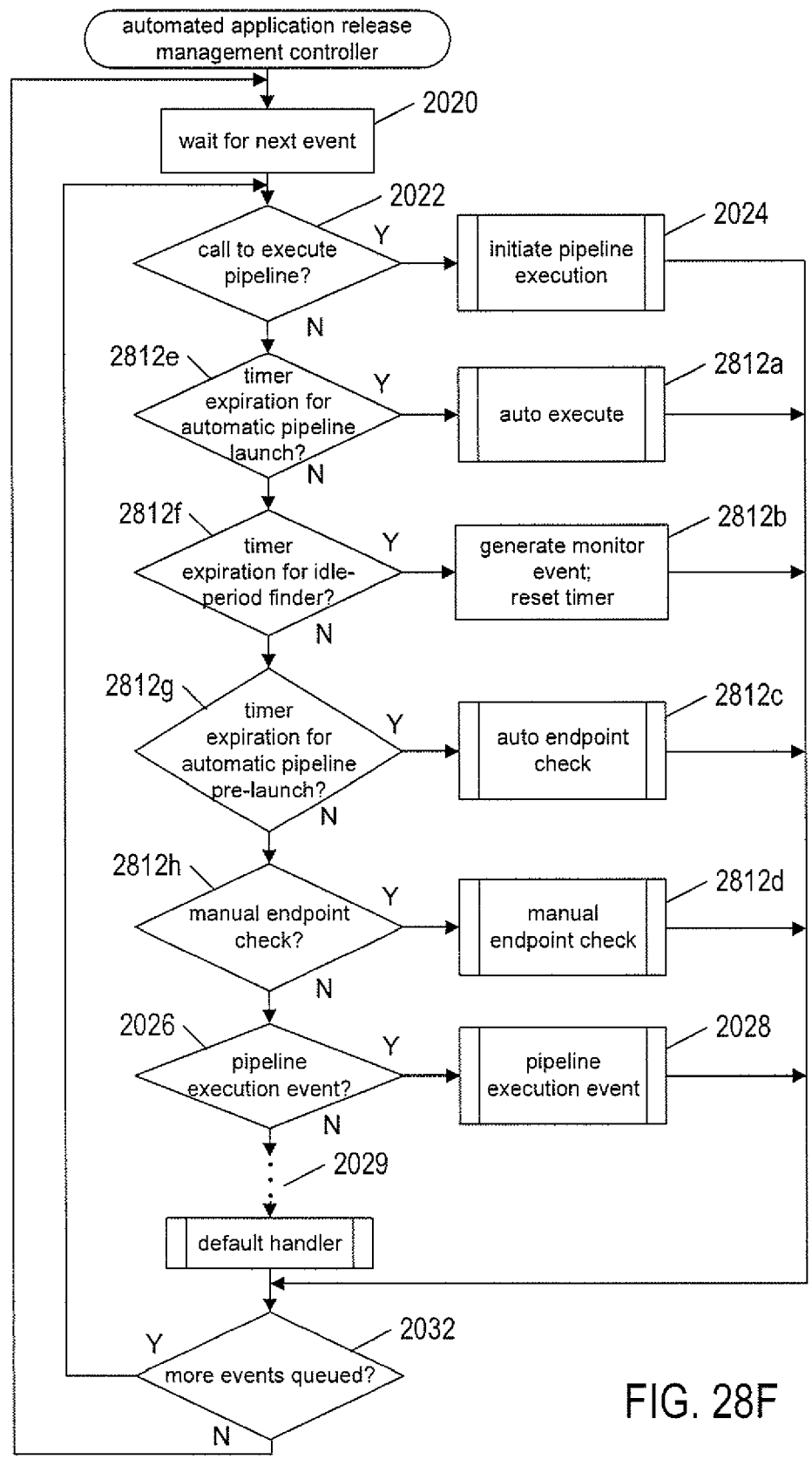
Figure 28G:
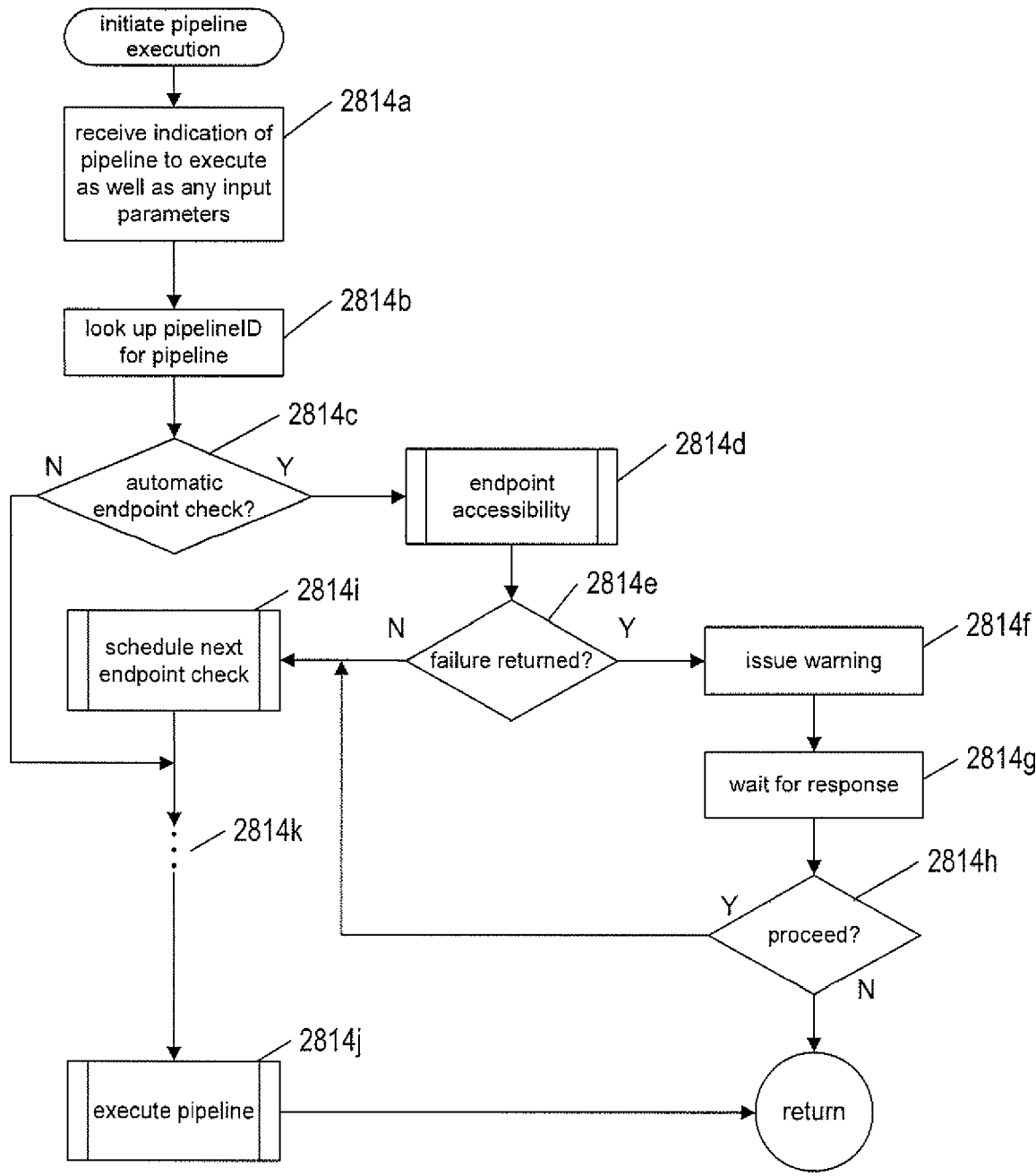
Figure 28H:
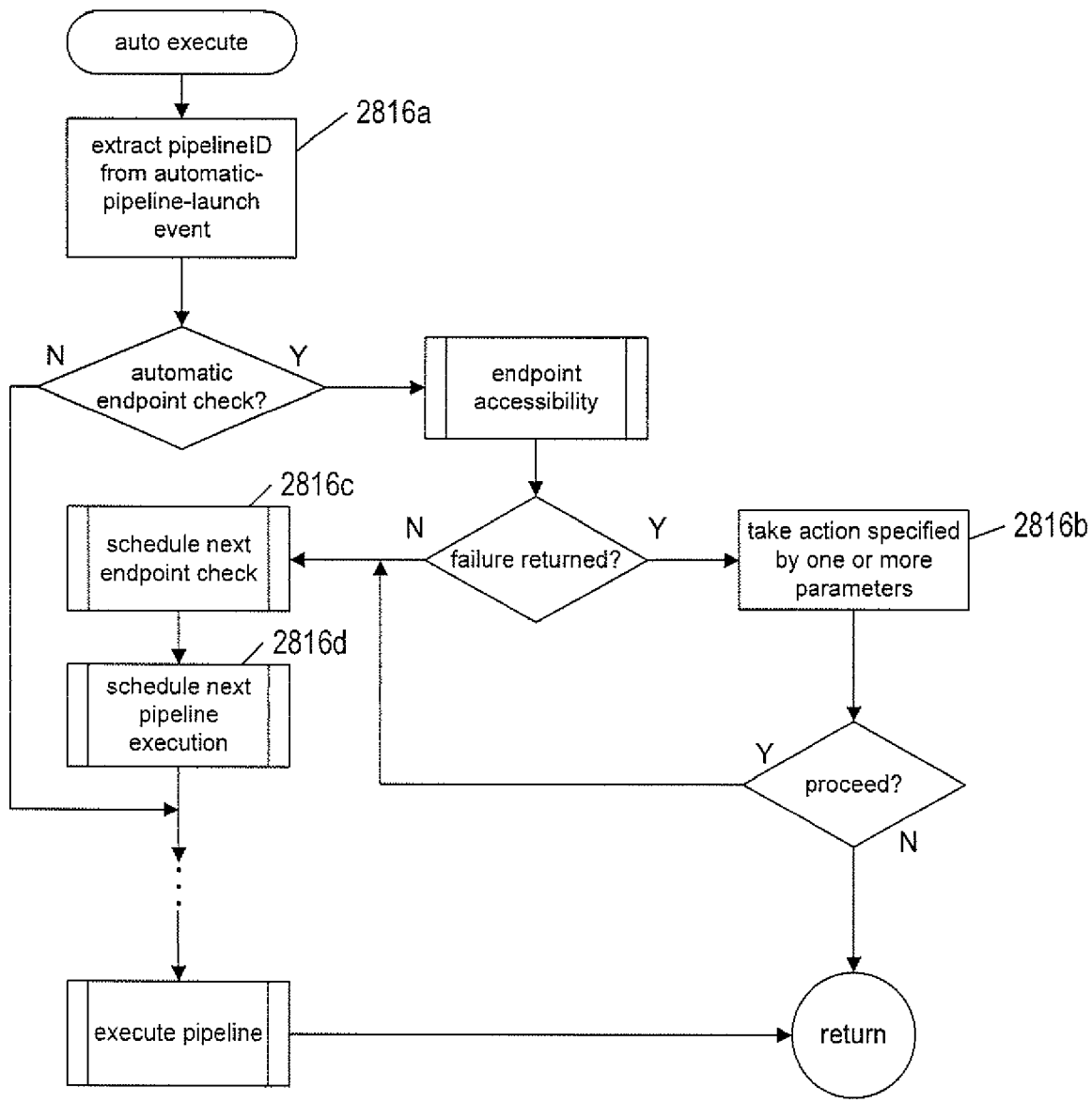
Figure 28L:
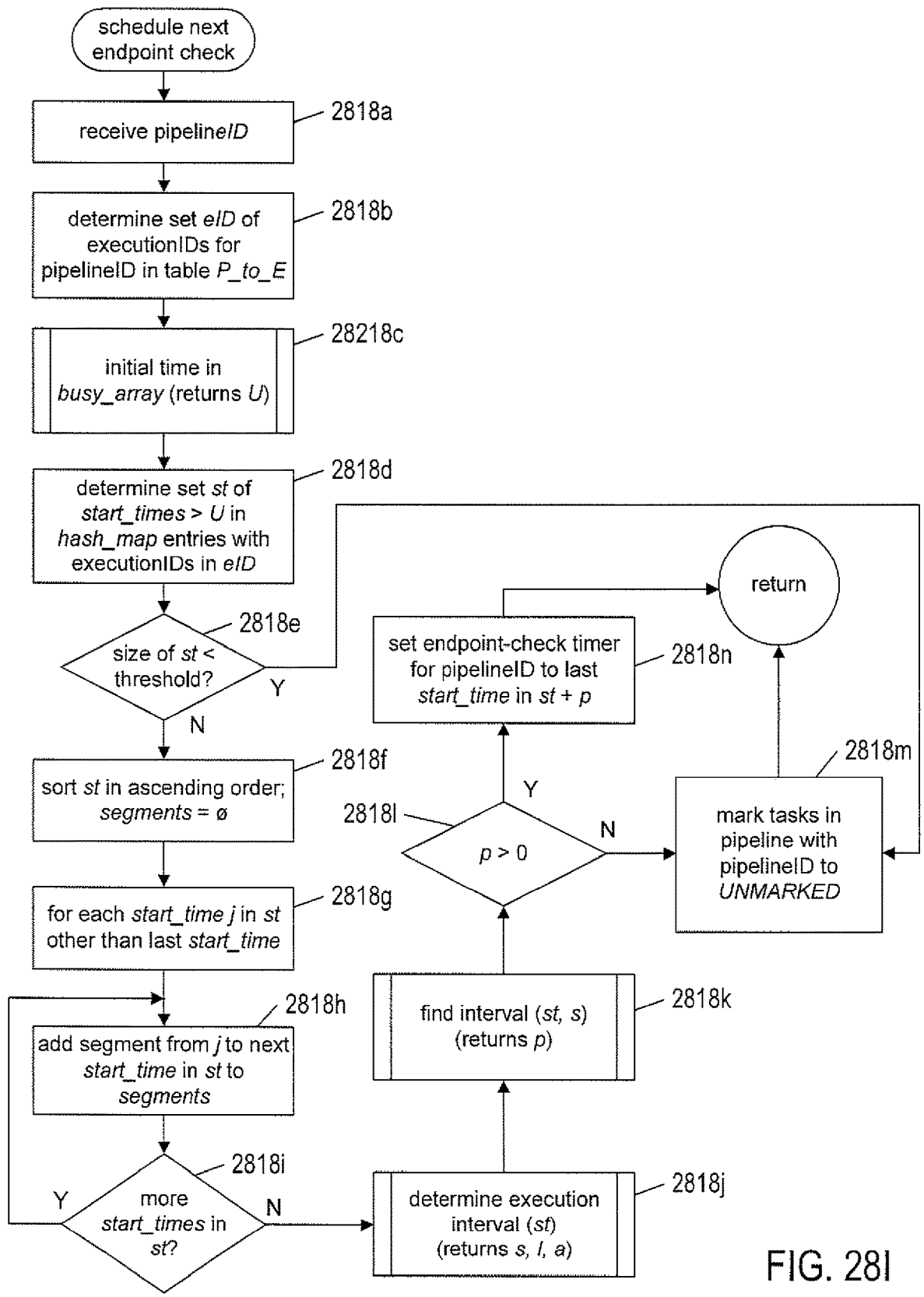
Figure 28J:
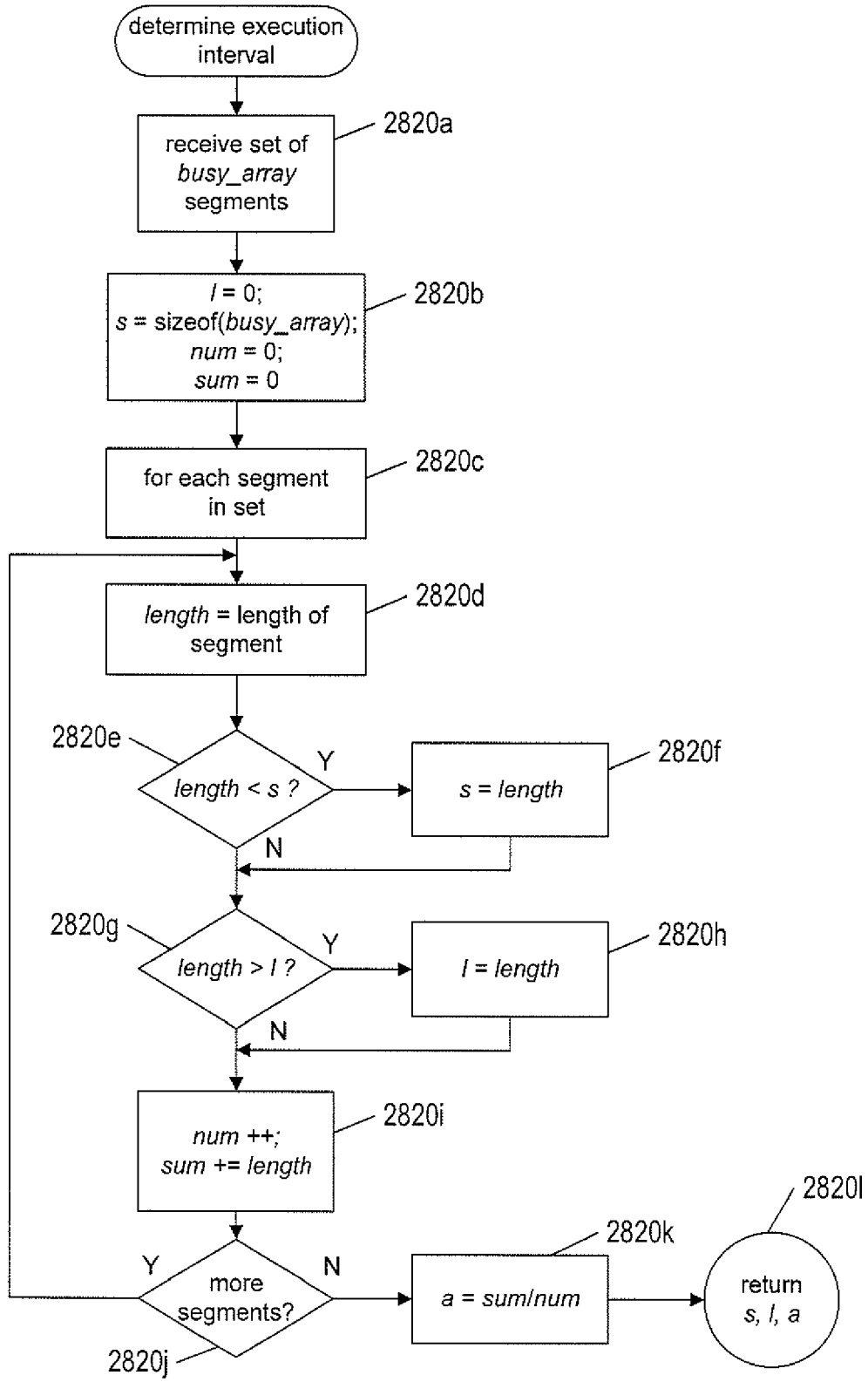
Figure 28K:
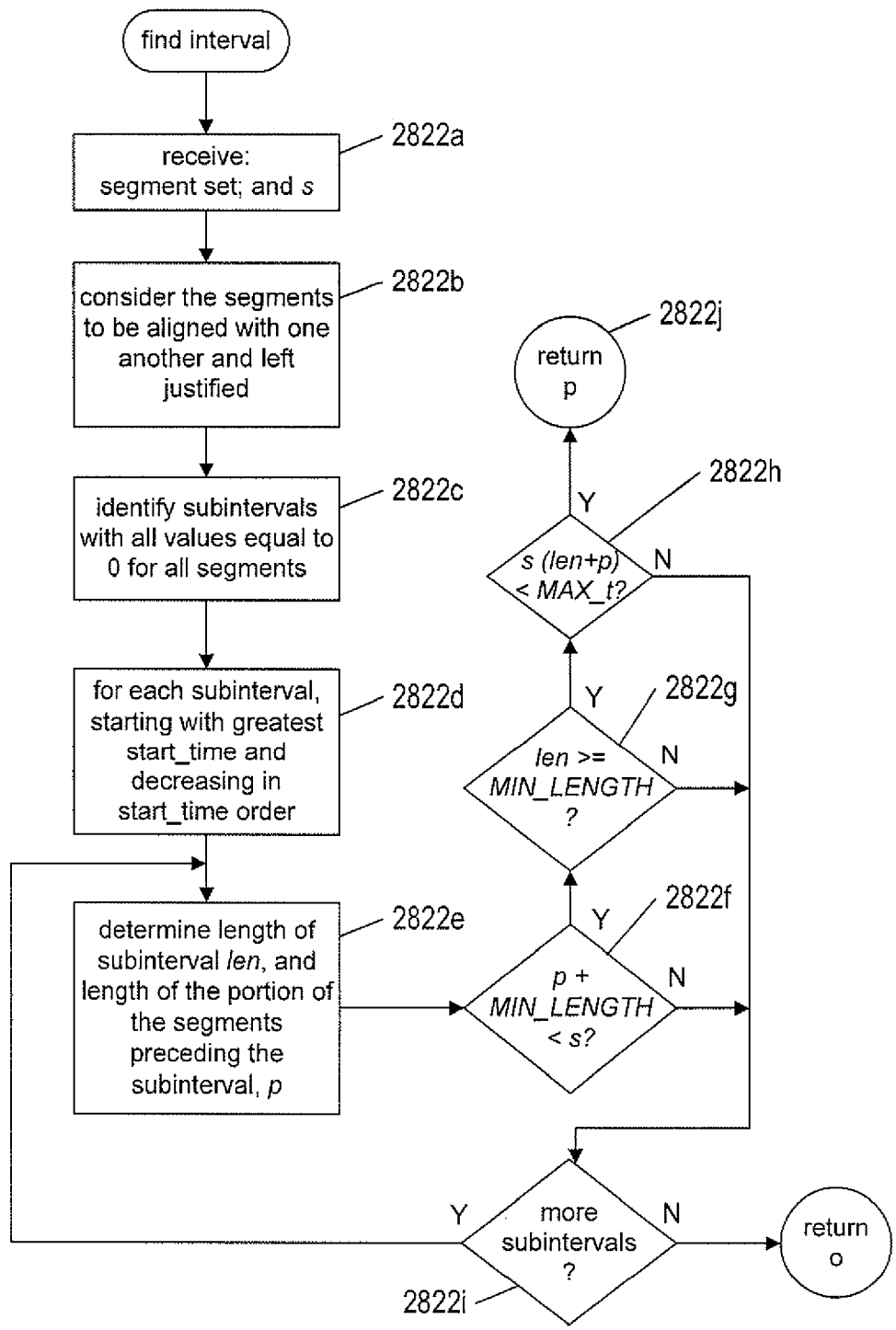
Figure 28L:
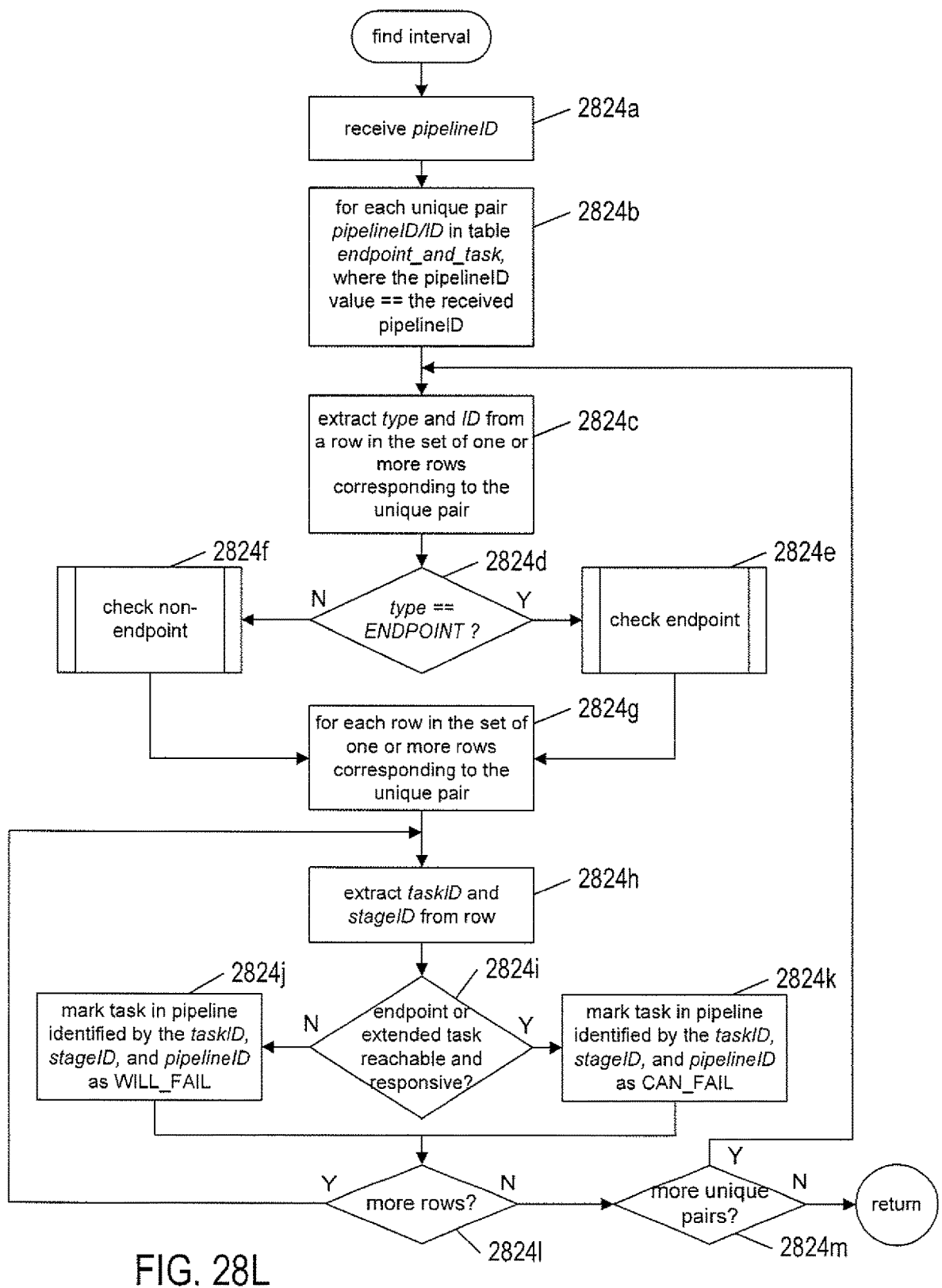
Figure 28M:
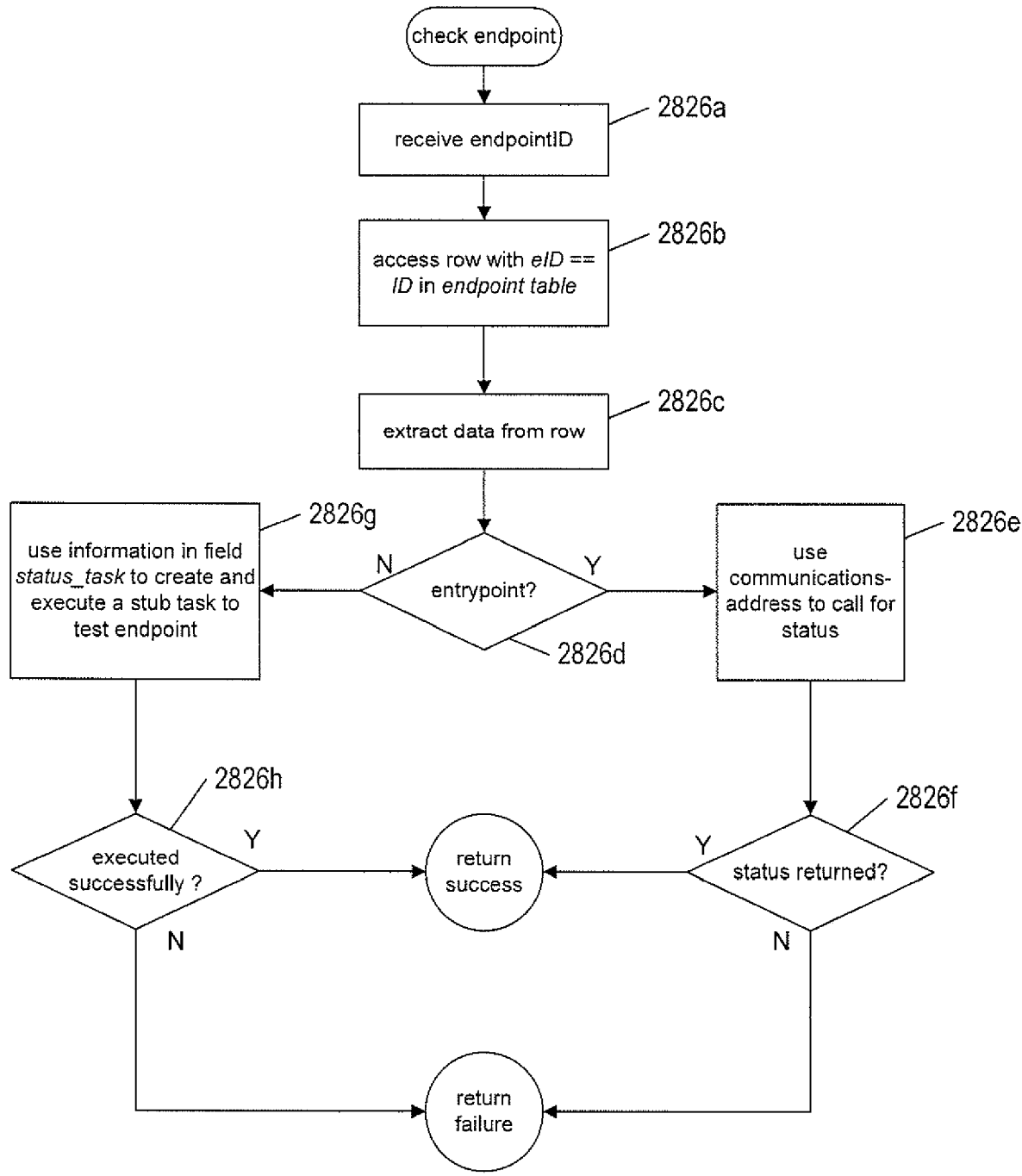
Figure 28N:
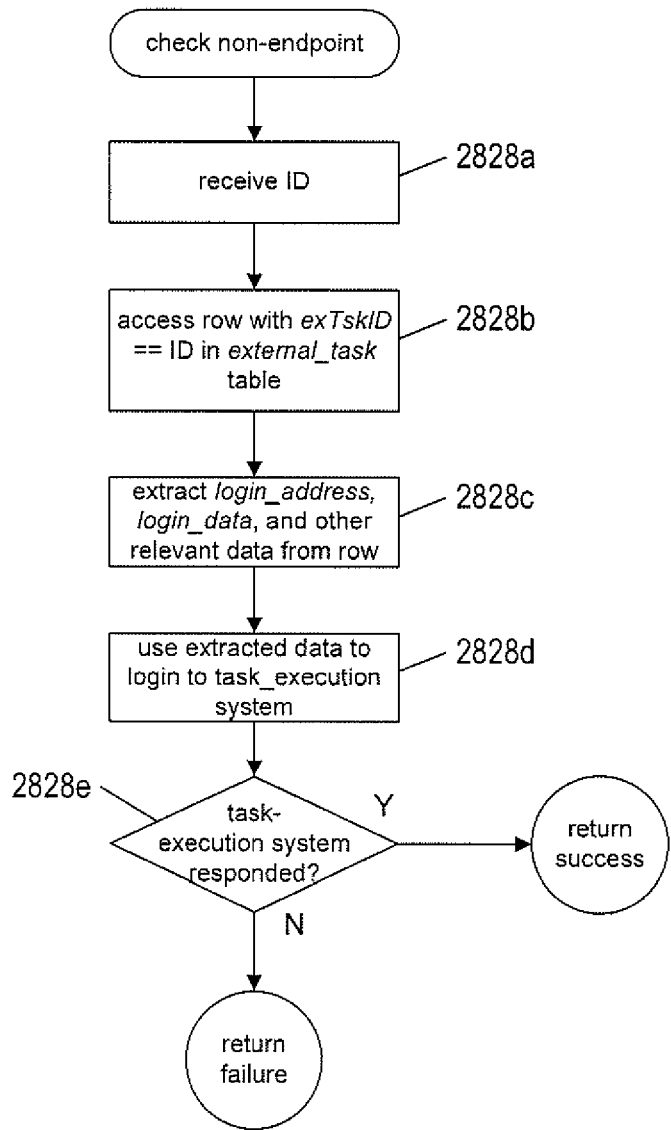
Figure 28O:
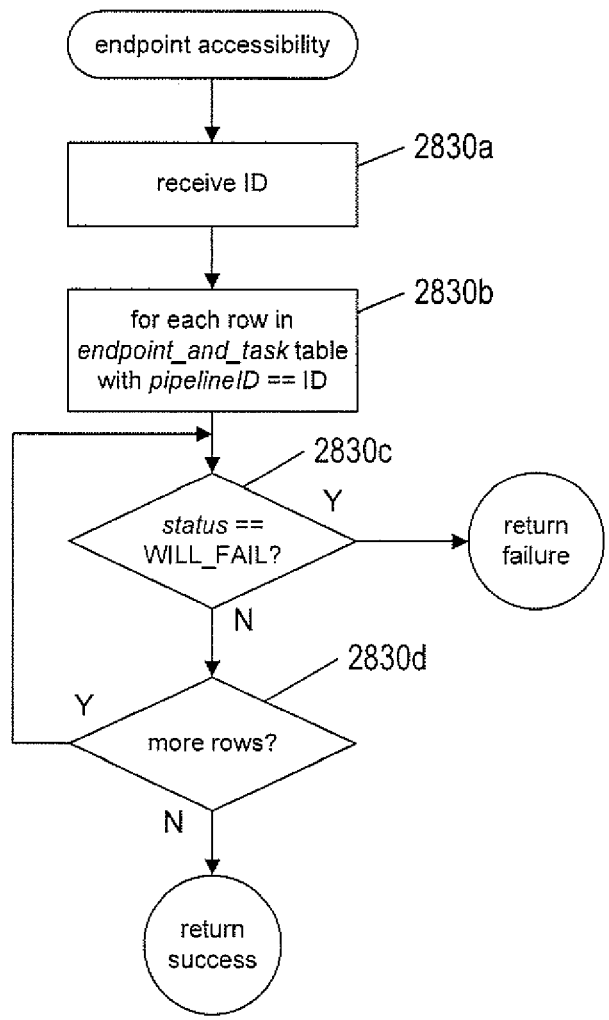

FIGS. 28A-O provide control-flow diagrams that describe one possible implementation of the endpoint-checking methods and subsystems within an automated-application-release-management system to which the current document is directed. This implementation uses the data structures described above with reference to FIGS. 27A-C. The control-flow diagrams provided by FIGS. 28A-C extend the flow diagrams discussed above with reference to FIGS. 20 a-B.

FIG. 28A provides a control-flow diagram for an asynchronously executing routine "idle period finder" that continuously updates the hash_map, busy_array, and P_to_E table data structures described above with reference to FIG. 27B. In step 2802a, the routine "idle period finder" initializes or re-initializes the above-mentioned data structures, including setting a Boolean variable wrapped to FALSE to indicate that the busy-array data structure has not yet begun to be overwritten and setting the busy-array data-structure index t to 0. The routine "idle period finder" then continuously executes the event-handling loop of steps 2802b-2802j. In step 2802b, the routine "idle period finder" waits for a next event to occur. When the next occurring event is a monitor event, as determined in step 2802c, the routine "idle period finder" calls the handler "update busy_array," in step 2802d, to add a next data value to the busy_array data structure. Monitor events are raised, as described below, by timer-expiration events. These timer-expiration events occur at a monitoring frequency that determines the period of time represented by each element of the busy_array data structure. In one implementation, the monitoring frequency is 5 seconds. The monitor events control periodic monitoring of the execution status of the workflow-execution-engine component of the automated-application-release-management system. When the next occurring event is a new-execution event, as determined in step 2802e, then, in step 2802f, the "idle period finder" routine calls an "update hash_map" handler to update the hash_map data structure. New-execution events are generated by the workflow-execution-engine component when the workflow-execution-engine component initiates execution of a release pipeline. When the next occurring event is a maintenance timer expiration event, as determined in step 2802g, the routine "idle period finder" calls the handler "maintenance," in step 2802h, in order to prune no-longer-needed hash_map entries from the hash_map data structure. Ellipses 2802k indicate that additional events may be handled in the event loop of steps 2802b-2802j. A default handler handles any unexpected or rare events, in step 2802i. When there are more events queued for handling, as determined in step 2802j, control returns to step 2802c. Otherwise, control returns to step 2802b, where the routine "idle period finder" waits for a next event to occur.

FIG. 28B provides a control-flow diagram for the "update busy_array" handler called in step 2802d of FIG. 28A. In step 2804a, the handler calls an entry point of the workflow-execution-engine component to get the execution ID of the release pipeline currently being executed by the workflow-execution-engine component. When the workflow-execution-engine component returns a value other than 0, as determined in step 2804b, the handler sets the next entry in the busy_array data structure, with index t, to 1, in step 2804c. Otherwise, in step 2804d, the next entry in the busy_array data structure is set to the value 0. In step 2804e, the index stored in variable t is incremented. When the value stored in the index t is greater than or equal to the value MAX_INDEX, as determined in step 2804f, the index t is set to the value 0 and the Boolean variable wrapped is set to the value TRUE, in step 2804g.

FIG. 28C provides a control-flow diagram for the handler "update hash, map," called in step 2802f of FIG. 28A. In step 2806a, the handler extracts a pipeline identifier and an execution identifier from the new-execution event. As discussed above, the new-execution event is generated by the workflow-execution-engine component of the automated-application-release-management system. In step 286b, the variable i is set to the hash value generated by a hash function operating on the extracted execution identifier. In step 2806c, the handler "update hash_map" prepares a new hash_map entry containing the execution identifier and the current system time, in step 2806d, the handler "update hash_map" links the new hash_map entry to the hash_map bucket with index i. In other words, when the element of the pointer array indexed by the index i is 0, a pointer to the new hash_map entry is stored in the pointer-array element with index i. Otherwise, the new hash_map entry is linked to the end of the linked list pointed to by a pointer stored in the pointer-array element indexed by index i. Finally, in step 2806e, the handler "update hash nap" adds a new entry to the P_to_E table (2730 in FIG. 27B) containing the pipeline identifier and execution identifier extracted in step 2806a. Thus, the handler "update hash_map" creates and places a new hash_map entry into the hash_map data structure each time execution of a release pipeline commences.

FIG. 28D provides a control-flow diagram for the handler "maintenance," called in step 2802h of FIG. 28A. In step 2808a, the handler "maintenance" calls the routine "initial time in busy_array" to obtain the time for the beginning of the time window represented by the busy_array data structure. The routine "initial time in busy_array" returns a time value u. Then, in step 2808b, the handler "maintenance" removes any hash_map entries from the hash_map data structure with starting times less than u, since complete segments for these entries are no longer available due to overwriting of the circular busy-array data structure.

FIG. 28E provides a control-flow diagram for the routine "initial time in busy_array," called in step 2808a of FIG. 28D. In Step 2810a, the return value u is set to the current system time. When the busy_array data structure has already begun to be overwritten, as determined in step 2810b, the local variable i is set to a time-duration value corresponding to the period of time represented by the busy_array data structure, in step 2810c. Otherwise, in step 2810d, the local variable i is set to the index of the next element to receive data in the busy_array data structure, t, times the monitoring interval. Finally, in step 2810e, the time period stored in the local variable i is subtracted from the time-duration value u along with an additional time-duration value F, to allow for processing overhead prior to use of the returned value u by a calling routine.

FIG. 28F provides an extended control-flow diagram for the routine "automated application release management controller," previously illustrated in FIG. 20B. Those steps in FIG. 28F common to steps already described in The FIG. 2B are not further described, below. The extended version of the routine includes new handlers 2812a-2812d corresponding to four new events 2812e-2012h. Event 2812e is a timer expiration for an automatic-pipeline-launch timer. This event is handled by the "auto execute" handler, called in step 2812a. Event 2012f is a timer expiration for the idle-period-finder asynchronous routine and is handled by generating a monitor event and resetting the timer, in step 2812b. Event 2012g is a timer expiration for an automatic-pipeline pre-launch time point, the time for a next endpoint check. This event is handled by the "auto endpoint check" handler, called in step 2812c. Event 2812h is generated by the user interface when a manual endpoint check is invoked by a user. This event is handled by the "manual endpoint check" handler, called in step 2812d.

FIG. 28G provides a control-flow diagram for the routine "initiate pipeline execution," called in step 2024 of FIG. 28F. In step 2814a, the routine receives an indication of the pipeline to execute as well as any input parameters for the execution. In step 2814b, the routine "initiate pipeline execution" looks up the pipeline identifier for the indicated pipeline. In step 2814c, the routine "initiate pipeline execution" determines whether or not automatic endpoint check-ing is enabled for the pipeline. When automatic endpoint checking is enabled, the routine "initiate pipeline execution" calls a routine "endpoint accessibility," in step 2814d, to check the reachability and responsiveness status for each task of each stage of the pipeline. When the routine "end-point accessibility" returns a failure indication, as deter-mined in step 2814e, a warning is issued to the user in step 2814f, after which the routine "initiate pipeline execution" waits, in step 2814g, for a response. When the response indicates that execution should proceed, as determined in step 2014h, control flows to step 2814i, in which a next endpoint check is scheduled by a call to a routine "schedule next endpoint check," Otherwise, the routine "initiate pipe-line execution" terminates. When automatic endpoint check-ing is not enabled, or when execution has proceeded to step 2814, either because an indication to proceed was received or because the routine "endpoint accessibility" returns an indication of success, additional preparatory steps may be carried out, as indicated by ellipses 2814k, after which execution of the pipeline is invoked by a call to the routine "execute pipeline" in step 2814j. Thus, the routine "initiate pipeline execution" carries out a manual request to execute a release pipeline via the user interface.

In some cases, release pipelines may be automatically executed by the automated-application-release-management system. In this case, when an automatic-pipeline-pre-launch-timer-expiration event has occurred, as determined in step 2812g of FIG. 28F, the routine "auto execute" is called, in step 2812a of FIG. 28F. FIG. 28H provides a control-flow diagram for the routine "auto execute." This routine is similar to the routine "initiate pipeline execution," discussed above with reference to FIG. 28G. However, in step 2816a, the pipeline identifier for the pipeline to execute is extracted from the automatic-pipeline-launch-timer-expi-ration event. Rather than issuing a warning and waiting for a response when the routine "endpoint accessibility" returns a failure indication, the routine "auto execute" takes an action specified by one or more parameters, in step 2816b. In addition to scheduling a next endpoint check in step 2816c, the routine "auto execute" also schedules a next pipeline execution, in step 2816d, by calling a "schedule next pipeline execution" routine.

FIG. 28I provides a control-flow diagram for the routine "schedule next endpoint check," called in step 2814i of FIG. 28G and in step 2816c of FIG. 28H. In step 2818a, the routine receives and identifier for a release pipeline. In step 2818b, the routine "schedule next endpoint check" generates a set of execution identifiers for the release pipeline by accessing the P_to_E table (2730 in FIG. 27B). In step 2818c, the routine "schedule next endpoint check" calls the routine "initial time in busy_array," discussed above with reference to FIG. 28E. In step 2818d, the routine generates a set of start times greater than the initial start time u returned by the routine "initial time in busy_array" from hash_map data structure entries having execution identifiers in the set of execution identifiers determined in step 2818b. When the number of start times identified in step 2818d is less than a threshold number, as determined in step 281e, control flows to step 2818m, discussed below, before return-ing. When the number of start times is less than the threshold value, there is insufficient data for predicting an idle interval in which to schedule a next endpoint check. Otherwise, in step 2818f, the routine "schedule next endpoint check" sorts the start times identified in step 2818d in ascending order and allocates an empty set of segments, segments. In the for-loop of steps 2818g-2818i, segments corresponding to all but the last start time in the set of start times identified in step 2818d are added to the set segments, in step 2818h. Each segment begins with a data value corresponding to the start time of an execution of the release pipeline and ends with a data value prior to the data value corresponding to a next start time of execution of the release pipeline. In step 2818j, the routine "schedule next endpoint check" calls a routine "determine execution interval" to determine param-eters describing the frequency at which the release pipeline is executed. Then, in step 2818k, the routine "schedule next endpoint check" calls the routine "find interval" to find an idle interval in which to schedule the next endpoint check. This routine returns a relative time p from the start of pipeline execution. When the routine returns a value 0 for p, as determined in step 2818l, no suitable idle interval was identified, in which case all of the tasks in the pipeline are marked with the reachability-and-responsiveness status UNMARKED, in step 2818m. This indicates that there is no basis for determining the accessibility of endpoints and external tasks, generally forcing a system administrator or application-release manager to carry out a manual endpoint check prior to initiating execution of the release pipeline, when an endpoint check is desired. Otherwise, in step 2818n, the endpoint-check timer for the release pipeline is set to the last start time in the set of start times identified in step 2818d plus the relative time p returned by the routine "find interval."

FIG. 28J provides a control-flow diagram for the routine "determine execution interval," called in step 2818j of FIG. 28I. In step 2820a, the routine "determine execution inter-val" receives the set of busy_array segments accumulated in the for-loop of steps 2818g-2818i in FIG. 28I. In step 2820b, the routine "determine execution interval" initializes four local variables l, s, num, and sum. The variable l is initialized to 0 and stores the length of the longest segment so far observed. The variable s is initialized to the size of the busy_array data structure and stores the length of the small-est segment so far observed. The variable num is initialized to 0, and stores the number of segments observed. The variable sum is initialized to 0 and stores the sum of the lengths of the observed segments. In the for-loop of steps 2820c-2820j, each segment in the set segments is consid-ered. In step 2820d, the length of the currently considered segment is determined and stored in the local variable length. When the length of the currently considered segment is less than the value in local variable s, as determined in step 2820e, local variable s is set to the value stored in local variable length, in step 2820f. When the length of the currently considered segment is greater than the value stored in local variable 1, as determined in step 2820g, local variable l is set to the value stored in local variable length, in step 2820h. In step 2820i, local variable num is incremented and the value stored in variable length is added to the value stored in local variable sum. Following termination of the for-loop of steps 2820c-2820j, the average segment length a is computed, in step 2820k. The length of the shortest segment s, the length of the longest segment 1, and the average segment length a are returned in step 28201. While the flow diagrams shown in FIGS. 28A-O do not illustrate use of the longest segment 1 and the average segment length a, these values may be used in implementations of the routine "schedule next pipeline execution," called in step 2816d of FIG. 28H.

FIG. 28K provides a control-flow diagram for the routine "find interval," called in step 2818k of FIG. 28I. In step 2822a, the routine "find interval" receives the segment set segments and the length of the shortest segment s. In step 2822b, the segments in the set segments are considered to be aligned with one another and left justified, as shown at the bottom of FIG. 27C. In this alignment, intervals in which all values of the elements of the aligned segments are 0 are identified, as discussed above with reference to FIG. 27C, in step 2822c. In the for-loop of steps 2822d-2822i, the identified intervals are considered, beginning with the intervals with the greatest relative start time and iterating through intervals with decreasing relative start times, in order to find a suitable interval for scheduling an endpoint check. In step 2822e, the length of the currently considered interval, len, is determined along with the length of the portion of the line segment preceding the interval, p. If the sum of p and a value MIN_LENGTH is less than the shortest segment length s, as determined in step 2822f, if the length of the currently considered segment len is greater than or equal to the value MIN_LENGTH, as determined in step 2822g, and if the length of the shortest segment s minus the sum of len and p is less than the value MAX_T, as determined in step 2822h, the currently considered segment represents an acceptable idle interval for scheduling an endpoint check. In this case, the length of the portion of the aligned the segments preceding the interval, p, is returned in step 2822j. However, when any of the tests of steps 2822f-2822h fails, the currently considered interval is inadequate for scheduling an endpoint check. In that case, when there are more intervals to consider, as determined in step 2822i, control returns to step 2822e. Otherwise, the routine "find interval" returns a value 0. The first test of step 2822f ensures that an interval of at least a threshold length precedes the soonest possible initiation of execution of the release pipeline. The second test of step 2822g ensures that the length of the idle interval is sufficient for carrying out an endpoint check. The third test of step 2822h ensures that the endpoint check will be completed at a time close enough to the soonest possible initiation of execution of the release pipeline.

FIG. 28L provides a control-flow diagram for the routine "endpoint check." Two versions of this routine are called in steps 2012e and 2012d of FIG. 28F. These two versions differ in that the "auto endpoint check" routine, called in step 2812c of FIG. 28F, obtains the pipeline identifier from a timer-expiration event while the "manual endpoint check" routine, called in step 2812d of FIG. 28F, is passed the pipeline identifier through a user-interface-call-generated event. These two versions reflect the fact that the routine "endpoint check" can be invoked either automatically or manually.

In step 2824a, the routine "endpoint check" receives the pipeline identifier. In the for-loop of steps 2824b-2824m, each unique pair of the received pipeline identifier and an identifier value for the ID field in the endpoint_and_task table (2704 in FIG. 27A) that occurs in at least one of the rows of the endpoint_and_task table is considered. Each of these unique pipelineID/ID pairs corresponds to a set of one or more rows of the endpoint_and_task table. For example, the ID value in a unique pipelineID/ID pair may be an endpoint identifier and the set of one or more rows of the endpoint_and_task table containing the pipelineID/ID pair represents the one of more tasks within stages of the pipeline identified by the pipelineID value that call entrypoints of the endpoint identified by the ID value. In step 2824c, the value of the field type corresponding to the value of the ID field in a row of the set of one or more rows corresponding to the currently considered unique pipelineID/ID pair is extracted. When the value of the field type indicates that the ID value is an endpoint identifier, as determined in step 2824d, the routine "check endpoint" is called, in step 2824e. Otherwise, the routine "check non-endpoint" is called, in step 2824f. Both of the routines "check endpoint" and "check non-endpoint" return a value indicating whether or not an endpoint or an external task is reachable and responsive. The returned value is used in conditional step 2824i, discussed below. The inner for-loop of steps 2824g-28241 considers each row in the set of one or more rows corresponding to the unique pipelineID/ID pair currently considered in the outer for-loop of steps 2824b-2824m. In step 2824h, the value of the field taskID and the value of the field stageID in the currently considered row are extracted from the row. When the endpoint or external task is reachable and responsive, as determined in step 2824i, the task in the pipeline identified by the taskID value and the stageID value is marked as CAN_FAIL, in step 2824k. Otherwise, the task in the pipeline identified by the taskID value and the stageID value is marked as WILL_FAIL, in step 2824j. In one implementation, marking a task comprises setting the value of the status field in the row of the endpoint_and_task table representing the stage to one of the three values: CAN_FAIL, WILL_FAIL, and UNMARKED. In other implementations, a task may be marked by setting values in other data structures that represent the task within the automated-application-release-management system. Thus, the routine "endpoint check" marks each task of each stage in a release pipeline with one of the two values WILL_FAIL and CAN_FAIL. The value WILL_FAIL indicates that at least one endpoint or external task invoked within the task has been found to be unreachable and/or unresponsive. The value CAN_FAIL indicates that a recent endpoint check found that all endpoints and external tasks invoked within the pipeline task to be reachable and responsive. However, there is no guarantee that at least one of the endpoints or external tasks invoked within the pipeline task will not turn out to be unreachable and/or unresponsive when the release pipeline is executed, as discussed above.

FIG. 28 M provides a control-flow diagram for the routine "check endpoint," called in step 2824e of FIG. 28L. In step 2826a, the routine "check endpoint" receives an endpoint identifier. In step 2826b, the routine "check endpoint" accesses a row in the endpoint table in which the field eID is equal to the received endpoint identifier. In step 2826c, the routine "check endpoint" extracts data from the other fields of the row of the endpoint table accessed in step 2826b. When the value of the field status in the row provides information for calling an entrypoint of the endpoint identified by the endpoint identifier, as determined in step 2826d, other data extracted from the row is used to call the status entrypoint, in step 2826e. When a status value is returned by the status entrypoint, as determined in step 2826f, the routine "check endpoint" returns a success indication. Otherwise, the routine "check endpoint" returns a failure indication. When the status field in the accessed row does not provide data for calling an entrypoint, the routine "check endpoint" uses information in the field status_task within the accessed row to either create and execute or execute an already existing stub task to test the endpoint. When the test successfully executes, as determined in step 2826h, the routine "check endpoint" returns a success indication. Otherwise, the routine "check endpoint" returns a failure indication.

FIG. 28N provides a control-flow diagram for the routine "check non-endpoint" called in step 2824f of FIG. 28L. In step 2828a, the routine "check non-endpoint" receives an external-task identifier. In step 2828b, the routine "check non-endpoint" accesses a row in the external_task table (2703 in FIG. 27A) in which the field exTskID has a value equal to the received external-task identifier. In step 2828c, the routine "check non-endpoint" extracts values from the login_address and login_data fields of the accessed row as well as any other data from relevant fields in the accessed row. In step 2828d, the routine "check non-endpoint" uses the extracted data to login to the system that executes the external task. When the system responds to the login request, as determined in step 2828d, the routine "check non-endpoint" returns a success indication. Otherwise, the routine "check non-endpoint" routine returns a failure indication.

FIG. 28O provides a control-diagram for the routine "endpoint accessibility," called in step 2014 of FIG. 28G as well as in FIG. 28H. In step 2030a, the routine "endpoint accessibility" receives a pipeline identifier. In the for-loop of steps 2830b-2830d, the routine "endpoint accessibility" accesses each row in the endpoint_and_task table having a value for the pipelineID field equal to the received pipeline identifier. If the value for the field status in the currently considered row is WILL_FAIL, as determined in step 2830c, the routine "endpoint accessibility" returns a failure indication. When the for-loop of steps 2830b-2830d successfully terminates after processing each row in the endpoint_ and_task table having the received pipeline identifier as the value of the pipelineID field, the routine "endpoint accessibility" returns a success indication.

Although the present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed automated-application-release-management subsystem and management controller. As mentioned above, a variety of additional or different data structures to be used, in alternative implementations, rather than the data structures described above with reference to FIGS. 27A-C. In alternative implementations, various additional or different methods for checking the reachability and responsiveness of endpoints and external tasks may be used. The currently disclosed methods and subsystems for endpoint checking employ the method discussed with reference to FIG. 27C to determine a time for scheduling a next automatic endpoint check, but, as mentioned above, any of many different alternative methods may be employed, and including more complex machine-learning techniques and more complex statistical-prediction techniques.

What is claimed is:

1. An automated-application-release-management subsystem ("subsystem") configured to be incorporated within an aggregation of multiple servers, data-storage devices, and one or more internal networks, the subsystem comprising:
 a dashboard user interface;
 an automated-application-release-management controller ("controller") that controls execution of multiple, interdependent application-release-management pipelines ("multiple pipelines"), each of the multiple pipelines representing a sequence of tasks carried out by the subsystem;
 an interface to a workflow-execution engine ("engine"), the engine executing a first application-release-management pipeline ("first pipeline") of the multiple pipelines; and
 an endpoint-checking subcomponent ("subcomponent") of the controller that is invoked, prior to execution of the first pipeline, to determine whether or not endpoints and external tasks invoked by the first pipeline are reachable by and responsive to respective invocations by the first pipeline;
 wherein the subcomponent determines idle intervals for executing endpoint checking for the first pipeline by:
  storing first indications for multiple sequential time points preceding a current time, the first indications representing a status of the engine as being idle or not idle;
  computationally selecting segments of the first indications for multiple executions of the first pipeline, each segment representing a group of first indications over a series of sequential time points for a respective one of the multiple executions;
  computationally aligning the segments relative to beginnings of the multiple executions; and
  identifying the idle intervals from the segments as aligned, the idle intervals corresponding to time intervals within the segments during which the engine is idle for more than one of the multiple executions; and
 wherein the subcomponent schedules endpoint checking to execute based on a prediction by the subcomponent for a next execution of the first pipeline and a first time interval selected from the idle intervals.

2. The subsystem of claim 1, wherein the subcomponent schedules endpoint checking to execute based on the first time interval beginning before a start time of the next execution and being of sufficient duration for an execution of the endpoint checking.

3. The subsystem of claim 1, wherein the subcomponent determines the idle intervals further by:
 storing second indications for starting times of the multiple executions; and
 identifying a set of recent execution starting times from the second indications,
 wherein computationally selecting the segments includes the subcomponent selecting the segments based on the segments corresponding to executions of the first pipeline for the set of recent execution starting times.

4. The subsystem of claim 3, wherein the subcomponent computationally selecting the segments includes the subcomponent determining a number of the second indications is greater than a threshold number.

5. The subsystem of claim 3, wherein the subcomponent stores the second indications in a hash map.

6. The subsystem of claim 4, wherein the subcomponent continuously removes second indications from the hash map that correspond to starting times that are less than a threshold time.

7. The subsystem of claim 1, wherein each of the multiple pipelines includes one or more tasks that invokes one or more external services, and wherein the one or more external services is selected from endpoints provided by external systems or external tasks executed by the external systems.

8. A method carried out in an automated-application-release-management subsystem ("subsystem") that is configured to be incorporated within an aggregation of multiple servers, data-storage devices, and one or more internal networks, the subsystem including:
an automated-application-release-management controller ("controller") that controls execution of multiple, interdependent application-release-management pipelines ("multiple pipelines"), each of the multiple pipelines representing a sequence of tasks carried out by the subsystem,
an interface to a workflow-execution engine ("engine") that executes a first application-release-management pipeline ("first pipeline") of the multiple pipelines, and
an endpoint-checking subcomponent ("subcomponent") of the controller that is invoked, prior to execution of the first pipeline, to determine whether or not endpoints and external tasks invoked by the first pipeline are reachable by and responsive to respective invocations by the first pipeline,
the method comprising:
determining, with the subcomponent, idle intervals for executing endpoint checking for the first pipeline by:
storing first indications for multiple sequential time points preceding a current time, the first indications representing a status of the engine as being idle or not idle;
computationally selecting segments of the first indications for multiple executions of the first pipeline, each segment representing a group of first indications over a series of sequential time points for a respective one of the multiple executions;
computationally aligning the segments relative to beginnings of the multiple executions; and identifying the idle intervals from the segments as aligned, the idle intervals corresponding to time intervals within the segments during which the engine is idle for more than one of the multiple executions; and
scheduling, with the subcomponent, endpoint checking to execute based on a prediction by the subcomponent for a next execution of the first pipeline and a first time interval selected from the idle intervals.

9. The method of claim 8, wherein scheduling the endpoint checking includes determining the first time interval can begin before a start time of the next execution, and is of sufficient duration for an execution of the endpoint checking.

10. The method of claim 8, further comprising:
storing second indications for starting times of the multiple executions; and
identifying a set of recent execution starting times from the second indications,
wherein computationally selecting the segments includes selecting the segments based on the segments corresponding to executions of the first pipeline for the set of recent execution starting times.

11. The method of claim 10, wherein computationally selecting the segments includes determining a number of the second indications is greater than a threshold number.

12. The method of claim 11, further comprising storing the second indications in a hash map.

13. The method of claim 8, further comprising continuously removing second indications from the hash map that correspond to starting times that are less than a threshold time.

14. The method of claim 8, wherein each of the multiple pipelines includes one or more tasks that invokes one or more external services, and wherein the one or more external services is selected from endpoints provided by external systems or external tasks executed by the external systems.

15. A physical data-storage device that stores a sequence of instructions that can be executed by one or more processors within an automated-application-release-management subsystem ("subsystem") that can be incorporated with an aggregation of multiple servers, data-storage devices, and one or more internal networks,
the subsystem including:
an automated-application-release-management controller ("controller") that controls execution of multiple, interdependent application-release-management pipelines ("multiple pipelines"), each of the multiple pipelines representing a sequence of tasks carried out by the subsystem,
an interface to a workflow-execution engine ("engine") that executes a first application-release-management pipeline ("first pipeline") of the multiple pipelines, and
an endpoint-checking subcomponent ("subcomponent") of the controller configured to be invoked, prior to execution of the first pipeline, to determine whether or not endpoints and external tasks invoked by the first pipeline are reachable by and responsive to respective invocations by the first pipeline, and
the sequence of instructions, when executed by the one or more processors, control the subsystem to:
determine, with the subcomponent, idle intervals for executing endpoint checking for the first pipeline by:
storing first indications for multiple sequential time points preceding a current time, the first indications representing a status of the engine as being idle or not idle;
computationally selecting segments of the first indications for multiple executions of the first pipeline, each segment representing a group of first indications over a series of sequential time points for a respective one of the multiple executions;
computationally aligning the segments relative to beginnings of the multiple executions; and
identifying the idle intervals from the segments as aligned, the idle intervals corresponding to time intervals within the segments during which the engine is idle for more than one of the multiple executions; and
schedule, with the subcomponent, endpoint checking to execute based on a prediction by the subcomponent for a next execution of the first pipeline and a first time interval selected from the idle intervals.

16. The physical data-storage device of claim 15, wherein the subcomponent schedules endpoint checking to execute based on the first time interval beginning before a start time of the next execution and being of sufficient duration for an execution of the endpoint checking.

17. The physical data-storage device of claim 15, wherein the subcomponent determines the idle intervals further by:
   storing second indications for starting times of the multiple executions; and
   identifying a set of recent execution starting times from the second indications,
   wherein computationally selecting the segments includes selecting the segments based on the segments corresponding to executions of the first pipeline for the set of recent execution starting times.

18. The physical data-storage device of claim 17, wherein the subcomponent computationally selecting the segments includes the subcomponent determining a number of the second indications is greater than a threshold number.

19. The physical data-storage device of claim 17, wherein the subcomponent stores the second indications in a hash map.

20. The physical data-storage device of claim 15, wherein the subcomponent continuously removes second indications from the hash map that correspond to starting times that are less than a threshold time.

\* \* \* \* \*